(12) United States Patent
Walker et al.

(10) Patent No.: US 8,306,293 B2
(45) Date of Patent: Nov. 6, 2012

(54) REDUCTION OF ECHO DECORRELATION FACILITATING MOTION ESTIMATION

(75) Inventors: William F. Walker, Barboursville, VA (US); Francesco Viola, Charlottesville, VA (US); William F. Mauldin, Jr., Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 581 days.

(21) Appl. No.: 12/467,216

(22) Filed: May 15, 2009

(65) Prior Publication Data
US 2009/0304246 A1  Dec. 10, 2009

Related U.S. Application Data

(60) Provisional application No. 61/053,418, filed on May 15, 2008.

(51) Int. Cl.
*G06K 9/00* (2006.01)
*G06K 9/40* (2006.01)
(52) U.S. Cl. .......................................... 382/128; 382/260
(58) Field of Classification Search .................. 382/128, 382/260
See application file for complete search history.

(56) References Cited

U.S. PATENT DOCUMENTS

| | | | |
|---|---|---|---|
| 5,655,535 A | 8/1997 | Friemel et al. |
| 5,673,699 A | 10/1997 | Trahey et al. |
| 5,899,861 A | 5/1999 | Friemel et al. |
| 6,117,081 A | 9/2000 | Jago et al. |
| 6,213,950 B1 | 4/2001 | Cespedes et al. |
| 6,270,459 B1 | 8/2001 | Konofagou et al. |
| 6,277,074 B1 | 8/2001 | Chaturvedi et al. |
| 6,283,917 B1 | 9/2001 | Jago et al. |
| 6,454,714 B1 | 9/2002 | Ng et al. |
| 6,494,834 B2 | 12/2002 | Konofagou et al. |
| 6,508,768 B1 | 1/2003 | Hall et al. |
| 6,514,204 B2 | 2/2003 | Alam et al. |
| 6,535,835 B1 | 3/2003 | Rubin et al. |

(Continued)

OTHER PUBLICATIONS

Anderson. Multi-Dimensinal Velocity Estimation with Ultrasound Using Spatial Quadrature, 1998, vol. 45, No. 3, pp. 852-861.

(Continued)

*Primary Examiner* — Joseph Chang
(74) *Attorney, Agent, or Firm* — Schwegman Lundberg & Woesner, P.A.

(57) ABSTRACT

Methods systems and computer readable media are provided for extracting information pertaining to at least one moving target. A set of signal data are inputted to a principal components processor, wherein the set of signal data comprise signal data corresponding to at least one waveform acquired from the at least one moving target. A complex representation of the set of signal data is formed and, using a principal components processor, at least one complex principal component of the complex representation is calculated. At least one of the calculated complex principal components is automatically selected and each of the at least one automatically selected complex principal component is applied to extract information about the at least one moving target. Methods systems and computer readable media are provided extracting information pertaining to at least one moving target. A set of signal data comprising signal data corresponding to at least one waveform acquired from the at least one moving target are inputted to a principal components processor. A complex representation of the set of signal data is formed, and at least one complex principal component of the complex representation is calculated. An estimated value of a physical characteristic of the at least one moving, target is then calculated, using a phase of at least one of the at least one complex principal components.

38 Claims, 76 Drawing Sheets

U.S. PATENT DOCUMENTS

| | | | |
|---|---|---|---|
| 6,685,646 | B2 | 2/2004 | Cespedes et al. |
| 6,687,625 | B2 | 2/2004 | Srinivasan et al. |
| 6,726,629 | B1 | 4/2004 | Frinking et al. |
| 7,972,271 | B2 * | 7/2011 | Johnson et al. ............... 600/459 |
| 2002/0013530 | A1 | 1/2002 | Cespedes et al. |
| 2002/0040187 | A1 | 4/2002 | Alam et al. |
| 2005/0053305 | A1 | 3/2005 | Li et al. |
| 2007/0276236 | A1 | 11/2007 | Jong |

OTHER PUBLICATIONS

Bercoff et al., Supersonic Shear Imaging. 2004; vol. 51, No. 4, pp. 396-409.

Bohs et al. A Real Time System for Quantifying and Displaying Two-Dimensional Velocities using Ultrasound. vol. 19, No. 9, Jul. 1993, pp. 751-761.

Bonnefous et al., Time Domain Formulation of Pulse-Doppler Ultrasound and Blood Velocity Estimation by Cross Correlation. Ultrasonic Imaging 8, 1986, pp. 73-85.

Carter G., Coherence and time delay estimation. Proc IEEE, 1987, vol. 75, No. 2, pp. 236-255.

Embree et al., Volumetric Blood Flow via Tme-Domain Correlation: Experimental Verification. vol. 37, No. 2. May 1990, pp. 176-189.

Fatemi et al., Application of radiation force in noncontact . . . , 1999, vol. 21, pp. 147-154.

Flax et al., Phase-Aberration Correction Using Signals From Point Reflectors and Diffuse Scatterers: Basic Principles. vol. 35, No. 6, Nov. 1988, pp. 758-767.

Gallippi et al., Adaptive clutter filltering via blind source . . . , 2002, vol. 24, No. 4, pp. 193-214.

Gallippi et al., BSS-based filtering of physiological . . . , 2003, vol. 29, No. 11, pp. 1583-1592.

Gallippi et al., Complex blind source separation for acoustic radiation . . . , 2004, (1), pp. 596-601.

Giunta et al., Estimation of Global Motion Parameters by Complex Linear Regression, vol. 8, No. 11, 1999, pp. 1652-1657.

Jacovitti et al., Discrete Time Techniques for Time Delay Estimation. vol. 41, No. 2, Feb. 1993, vol. 41, No. 5, pp. 525-533.

Jensen., Estimation of Blood Velocities Using Ultrsound. 1996, pp. 195-225.

Jensen., A New Method for Estimation of Velocity Vectors. 1998, vol. 45, No. 3, pp. 837-851.

Jolliffe IT., Principal Component Analysis, Springer Series in Statistics, 2nd ed., Springer, NY, 2002, pp. 1-8.

Kadi et al., On the performance of regression and step-initialized IIR Clutter Filters . . . , 1995, vol. 42, 5, pp. 827-837.

Kasai et al., Real-time two-dimensional blood flow imaging . . . , 1985, vol. 32, No. 3, pp. 458-464.

Kruse et al., A new high resolution color flow system . . . , 2002, vol. 49, No. 10, pp. 1384-1399.

Ledoux et al., Reduction of the clutter component in Doppler ultrasound . . . , 1997, vol. 19, No. 1. pp. 1-18.

Loupes et al., An axial Velocity Estimator of Ultrasound Blood flow imaging, by means of a two-dimensional autocorreclation approach., 1995, vol. 42, No. 4, pp. 672-688.

Mauldin et al., Robust pricipal component analysis . . . , 2008, vol. 34, 2, pp. 309-325.

McAleavey et al. "Estimates of echo correlation and measurement bias in acoustic radiation force impulse imaging," IEEE Transactions on Ultrasonics Ferroelectrics & Frequency Control, 2003, vol. 50, No. 6, pp. 631-641.

Ng et al., A Comparative Evaluation of Several Algorithms for Phase Aberration Correction. vol. 41, No. 5, Sep. 1994. pp. 631-643.

Nightingale et al. "Acoustic Radiation Force Impulse Imaging: In Vivo Demonstration of Clinical Feasibility," Ultrasound in Medicine & Biology, 2002, vol. 28, No. 2, pp. 227-235.

Ophir et al., Elastography: A Quantitative Method for Imaging the Elasticity of Biological Tissues. Ultrasonic Imaging vol. 13, 1991, pp, 111-134.

O'Donnell et al. "Internal Displacement and Strain Imaging using Ultrasonic Speckle Tracking," IEEE Transactions on Ultrasonics, Ferroelectrics and Frequency Control, 1994, vol. 41, No. 3, pp. 314-325.

Palmeri at al., Nightingale KR. Ultrasonic tracking of acoustic radiation force-induced displacements in homogeneous media. 2006, vol. 53, No, 7, pp. 1300-1313.

Patil et al., 3D prostate elastography: algorithm, simulations and experiments . . . , 2007, vol. 52, No. 12, pp. 3643-3663.

Riou et al., Fast adaptive eigenvalue decomposition: a maximum likelihood approach. 1997, vol. 5, pp. 3565-3568.

Sumino et al., Measurements of ultrasonic pulse arrival time differences produced by abdominal wall specimens. 1991, vol. 90, No. 6, pp. 2924-2930.

Srinivasan et al. Elastographic imaging using staggered strain estimates. Ultrsonic imaging., 2002, vol. 24, pp. 229-245.

Skovorada et al., Tissue elaticity reconstruction based on ultrasonic displacement and strain images. 1995, vol. 42, No. 4, pp. 747-765.

Strobach P., Low-rank adaptive filters, IEEE Trans Signal Process, 1996, vol. 44, No. 12, pp. 2932-2947.

Trahey et al., Synthetic receive aperture imaging with correction for motion and for tissue inhomogeneities—Part II . . . , 1992, vol. 39, No. 4, pp. 496-501.

Viola et al. Sonorheometry: A new Method for Assessing coagulation potential. 2007, vol. 1 pp. 1001-1004.

Viola et al. "Radiation Force Imaging of Viscoelastic Properties with Reduce Artifacts," 2003, vol. 50, No. 6, pp. 736-742.

Viola et al. "Sonorheometry: A Noncontact Method for the Dynamic Assessment of Thrombosis," The Annals of Biomedical Engineering, 2004, vol. 32, No. 5, pp. 696-705.

Viola et al. "Ultrasound echo decorrelation due to acoustic radiation force," 2002, vol. 2, pp. 1903-1906.

Viola et al. A spline-based algorithm for continuous time-delay estimation using sampled data. 2005, vol. 52, No. 1, pp. 80-93.

Viola et al. A Comparison between spline-based and phase-domain time-delay estimators. 2006, vol. 53, No. 3, pp. 515-517.

Walker et al., The significance of correlation in ultrasound signal processing. 2000, pp. 1437-1447.

Walker et al., A Fundamental Limit on Delay Estimation Using Partially Correlated Speckle Signals. IEEE Transactions on Ultrasonics, Ferroelectrics and Frequency Control, 1995, vol. 42, No. 2, pp. 301-308.

Walker et al., A Method of Imaging Viscoelastic Parameters with Acoustic Radiation Force. 2000, vol. 45, pp. 1437-1447.

Yu et al., Single-Ensemble-Based Eigen-Processing Methods for Color Flow Imaging. 2008, vol. 55, No. 3, pp. 573-587.

* cited by examiner

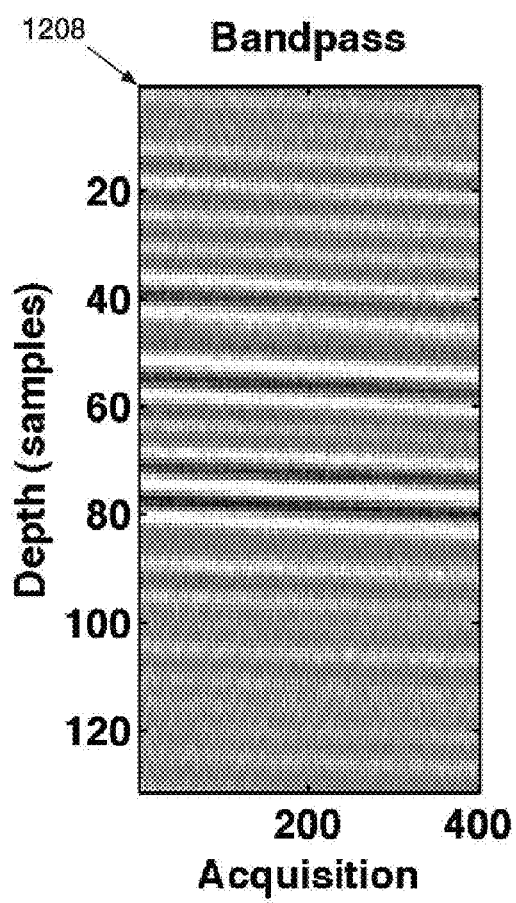
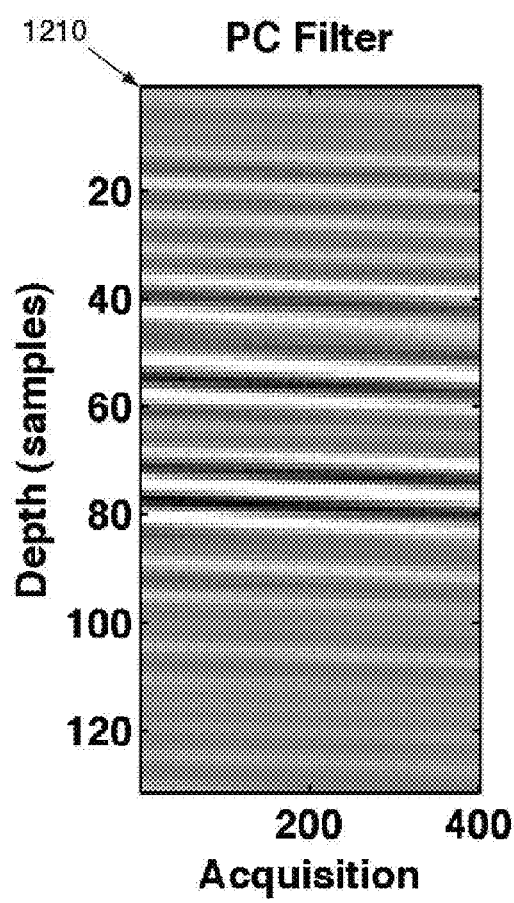
Fig. 12B
Fig. 12C

REDUCTION OF ECHO DECORRELATION FACILITATING MOTION ESTIMATION

CROSS-REFERENCE

This application claims the benefit of U.S. Provisional Application No. 61/053,418, filed May 15, 2008, which application is incorporated herein, in its entirety, by reference thereto.

GOVERNMENT RIGHTS

This invention was made with government support under Federal grant no. R01 EB005433-01 awarded by the National Institutes of Health. The United States Government has certain rights in this invention.

FIELD OF THE INVENTION

The present invention relates to the field of array-based imaging and sensing, and more particularly to reducing echo decorrelation effects during motion estimation.

BACKGROUND OF THE INVENTION

The determination of the time delay between two signals, one reference and one shifted is performed in many fields of practice including, but not limited to: medical imaging, RADAR, SONAR and speech processing. Such determinations are referred to as time delay estimation (TDE), and, among medical imaging fields includes use in many medical ultrasound modalities, including, but not limited to: blood flow estimation, phase aberration correction, elastography, tissue elasticity estimation, and acoustic radiation force imaging.

Because of its broad application, many algorithms for TDE have been devised. These methods aim to optimize accuracy, precision, computational efficiency, delay range, and noise performance, among other criteria.

In general, TDE algorithms employ pattern-matching functions to estimate the optimal delay between two or more discretely sampled signals, e.g., see Giunta G., "Fine estimators of two-dimensional parameters and application to spatial shift estimation", IEEE Trans Signal Processing 1999; 47(12):3201-3207; and Jacovitti et al., "Discrete time techniques for time delay estimation", IEEE Trans Signal Processing 1993; 41(2):525-533, both of which are hereby incorporated herein, in their entireties, by reference thereto. Regardless of the particular pattern-matching function used, all TDE algorithms exhibit an intrinsic bias and variance.

The bias of an estimator is defined as the difference between the expected value of that estimator and the tale value of the variable that is being estimated.

The estimator variance is a function of two types of errors—false peak errors and jitter errors. False peak errors occur at integer multiples of the signal period and generally occur with low probability under reasonable imaging parameters and conditions. Because they occur with low probability and are easily distinguishable, these errors may be readily identified and removed. In contrast, jitter errors are generally small in magnitude and represent a fundamental limit on performance for a given set of imaging parameters, signal-to-noise ratio (SNR), and signal correlation.

While both electronic noise and signal decorrelation degrade TDE performance, they result from different physical phenomenon and generally possess different frequency spectra. Electronic noise, which is generally considered to be a random process, originates from thermal noise in resistors, quantization noise in A/D converters, and intrinsic amplifier noise. Because electronic noise is considered to be random, it is typically modeled as additive noise with a uniform power spectrum. In contrast, echo decorrelation results from the varying echo contributions from different scatterers between different signal acquisitions. In radiation force imaging for example, a gradient of deformations across the point spread function (PSF) causes signal decorrelation, which in turn leads to corruption of TDE estimates and an underestimation of peak displacement, e.g., see McAleavey et al., "Estimates of echo correlation and measurement bias in acoustic radiation force impulse imaging", IEEE Trans Ultrason Ferroelect Freq Contr 2003; 50(6):631-641; Palmeri et al., "Ultrasonic tracking of acoustic radiation force-induced displacements in homogeneous media", IEEE Trans Ultrason Ferroelect Freq Contr 2006; 53(7): 1300-1313; and Viola et al., "Ultrasound echo decorrelation due to acoustic radiation force", IEEE Ultrason Symp 2002; 2:1903-1906, each of which is incorporated herein, in its entirety, by reference thereto, respectively.

Along with fixed imaging parameters such as the center frequency and bandwidth of signals that are transmitted to an object to be measured as to motion, and signals (echo signals) that are received as reflected from the object, the performance of motion estimation is reliant upon its imaging environment. In particular, the correlation of the translated echo signals and the signal-to-noise ratio (SNR) are especially important factors.

To reduce the effects of noise and decorrelation, and therefore improve TDE performance, signal separation techniques may be employed prior to TDE. Finite impulse response (FIR) and infinite impulse response (IIR) filters have been used to improve SNR. However, these frequency domain-based techniques are unable to separate signals with overlapping spectra, and therefore, are generally ineffective in reducing signal decorrelation.

In contrast, regression filters offer an alternative approach that assumes that signals are the summation of polynomials in the time domain, e.g., see Kadi et al., "On the performance of regression and step-initialized iir clutter filters for color Doppler systems in diagnostic medical ultrasound", IEEE Trans Ultrason Ferroelec Freq Control 1995; 45(3):837-851, which is hereby incorporated herein, in its entirety, by reference thereto. The utility of regression depends heavily upon the selection of the polynomial constituents forming the signal basis. While the polynomial basis for regression filtering can be formed from an a priori model of previous data examples, this strategy is typically not feasible in medical ultrasound where different tissue structures and imaging parameters dramatically change the statistical structure of received data. Instead, adaptively forming the polynomial signal basis is a more appropriate approach.

In the field of medical ultrasound, adaptive regression filtering has been demonstrated via blind source separation (BSS) techniques applied to clutter rejection, e.g., see Gallippi et al., "Complex blind source separation for acoustic radiation force impulse imaging in the peripheral vasculature, in vivo", IEEE Ultrasonics Symposium 2004; 1:596-601, which is incorporated herein, in its entirety, by reference thereto. However, the method of Gallippi et. al. addresses motion-independent clutter (i.e., clutter/noise that is not generated by the act of motion itself). Further, the method of Gallippi et al. requires comparison of signal components to identify spatial variations that correspond to relative spatial locations of the different types of target being monitored (e.g., vessel walls vs. blood) and therefore requires user input and is not an automatic process. Further BSS techniques are described in Gallippi et al., "Adaptive clutter filtering via blind source separation for two-dimensional ultrasonic blood velocity measurement", Ultrason Imag 2002; 24(4):193-214; and in; Gallippi et al., "BSS-based filtering of physiological and ARFI-induced tissue and blood motion", Ultrasound Med Biol 2003; 29(11):1583, both of which are hereby incorporated herein, in their entireties, by reference thereto. In these applications of BSS that are described by Gallippi et al, the principal component basis functions are calculated only for the purposes of filtering the input data matrix. Parameters are never extracted from the principal components themselves. Further, these techniques require manual inspection of the time and depth projections of the basis functions onto the input signals. Moreover, the methods described by Gallippi et al using complex data in the aforementioned reference, Gallippi et al 2002 do not estimate parameters directly from the principal components. Rather, the phases of the principal components are only used for visual inspection in order to manually determine which principal components to retain. The method used for filtering by Gallippi do not window the echo data such that the input signal is approximately stationary through range. Stationarity is used here as a statistical term meaning that the first and second order statistics of a signal are approximately constant through range. Thus, by not limiting the extent through range over which BSS operated on the input signal, the estimation of the covariance matrix and computed principal components were inaccurate in the Gallipi et al. methods.

Kruse et al. "A new high resolution color flow system using an eigendecomposition-based adaptive filter for clutter rejection", IEEE Trans Ultrason Ferroelect Freq Contr 2002; 49(10):1384-1399(which is hereby incorporated herein, in its entirety, by reference thereto) discloses a method in which phase information is not used and signal components are not differentiated based on motion indicated by the phase of one or more principal components. Velocity cannot be estimated directly from the eigenvectors calculated in the method of Kruse et al. Rather, the technique selects a variable number of eigenvectors to retain, based on a priori knowledge of the imaging environment. This technique necessitates the calculation of all principal components, which limits computational efficiency.

Ledoux et al., "A. Reduction of the clutter component in Doppler ultrasound signals based on singular value decomposition: a simulation study", Ultrason Imaging 1997; 19(1):1-18, (which is hereby incorporated herein, in its entirety, by reference thereto) discloses a method where phase information is not used and signal components are not differentiated based on motion indicated by the phase of one or more principal components. Furthermore, performance was not improved over other methods at low blood velocities unless ensemble lengths were increased to approximately 100 RF signals which, in practice, is not realistic. The number of basis functions corresponding to the signal of interest is not automatically obtained.

Yu et al., in "Single-ensemble-based eigen-processing methods for color flow imaging—part II. The matrix pencil estimator" IEEE Trans Ultrason Ferroelect Freq Contr 2008; 55(3):573-587 (which is hereby incorporated herein, in its entirety, by reference thereto), applies eigen-based decomposition techniques to estimate flow using a technique called the Pencil Matrix. This technique is limited to applications of color flow imaging and solves a generalized eigenvalue problem rather than finding principal components. Additional steps required for this method include the formation of a hankel matrix and matrix pencils, which reduce computational efficiency. In this method, phase information is not used and signal components are not differentiated based on motion indicated by the phase of one or more principal components.

Mauldin et al., in "Robust principal component analysis and clustering methods for automated classification of tissue response to arfi excitation" Ultrasound Med Biol 2008; 34(2):309-325 (which is hereby incorporated herein, in its entirety, by reference thereto), employs BSS with data mining techniques to automate the identification of tissue structures exhibiting similar displacement responses to acoustic radiation force excitation. This method does not improve displacement calculations but instead, operates on displacements that have already been computed using standard methods. Displacement estimation errors are therefore not reduced by use of this method.

Motion estimators are commonly classified based upon the domain in which they operate. The most common phase domain techniques are Kasai's 1D autocorrelator, see Kasai et al., "Real-time two-dimensional blood flow imaging using autocorrelation technique", IEEE Trans Sonics Ultrason. 32:458-463, 1985, which is hereby incorporated herein, in its entirety, by reference thereto, and Loupas' 2D autocorrelator, see Loupas et al., "Experimental evaluation of velocity and power estimation for ultrasound blood flow imaging, by means of a two-dimensional autocorrelation approach", IEEE Trans Ultrason Ferroelect Freq Contr. 42:689-699, 1995, which is hereby incorporated herein, in its entirety, by reference thereto. Both techniques were developed to measure a single velocity estimate from an entire ensemble of echo data. However, they may also be used to estimate individual displacements to form displacement profiles. The Loupas algorithm improved upon Kasai's by taking into account the local variations in the center frequency of the echo signal.

While generally requiring a greater computational load, several time-domain displacement estimators have been developed with superior performance to the technique of Loupas under certain conditions. A common time domain technique developed by Viola and Walker, e.g., see Viola et al, "A spline-based algorithm for continuous time-delay estimation using sampled data", IEEE Trans Ultrason Ferroelect Freq Contr. 52(1):80-93, 2005, which is hereby incorporated herein, in its entirety, by reference thereto. This technique is termed spline time-delay estimation (sTDE), and operates by forming a spline representation of the echo signal. The delay between a splined, reference signal and a discrete, shifted signal can then be located by minimizing the mean squared error function.

There is a continuing need for methods and systems for estimating motion, from echo signals relevant to reference signals, that decrease the amount of echo decorrelation, relevant to existing techniques and systems, and that do not require an overly burdensome computational load. The present invention meets these needs.

SUMMARY OF THE INVENTION

The present invention provides methods, systems and computer readable media for extracting information pertaining to at least one moving target, including: inputting to a principal components processor, a set of signal data comprising signal data corresponding to at least one waveform acquired from the at least one moving target, forming a complex representation of the set of signal data, calculating, using a principal components processor, at least one complex principal component of the complex representation; automatically selecting at least one of the at least one complex principal components; and applying each of the at least one automatically selected complex principal component to extract information about the at least one moving target.

In at least one embodiment, only one complex principal component is calculated by the calculating step.

In at least one embodiment, the automatically selecting selects one complex principal component, wherein the one complex principal component is a most energetic principal component of all of the at least one complex principal components.

In at least one embodiment, a single complex principal component is automatically selected, the single complex principal component being a second most energetic principal component of all of the at least one complex principal components.

In at least one embodiment, a single complex principal component is automatically selected based on a phase shift property.

In at least one embodiment, the forming of a complex representation is performed prior to the inputting a set of signal data, and wherein the inputting a set of signal data comprises inputting the set of signal data as the complex representation of the set of signal data.

In at least one embodiment, the automatically selecting and the applying reduce echo decorrelation for motion estimation.

In at least one embodiment, the applying comprises calculating time delay estimation values based on the at least one selected principal component, relative to reference signals; and outputting motion estimation results based on the time delay estimation values.

In at least one embodiment, the signal data comprises signal data from echoes reflected off the moving target from a plurality of different depths measured along a beam axis along which the waves are emitted from a transducer, and wherein the calculating principal components and the calculating time delay estimation values are performed for the signal data at a first depth of the plurality of depths, the method further comprising: repeating the calculating principal components and the calculating time delay estimation values for signal data at another depth different from the first depth.

In at least one embodiment, the signal data is transduced from ultrasonic waves.

In at least one embodiment, the motion estimation is used in performing sonorheometery.

In at least one embodiment, the method comprises estimating blood velocity in a patient.

In at least one embodiment, the method is used in performing ultrasonic elastography.

In at least one embodiment, the inputting signal data is performed in real time using signal data transduced from waves reflected off or emitted from a moving target, and the method is performed in real time.

In at least one embodiment, the signal data is inputted from a computer memory storing the signal data generated from waves reflected off or emitted from a moving target.

Methods, systems and computer readable media are provided for extracting information pertaining to at least one moving target, by: inputting to a principal components processor, a set of signal data comprising signal data corresponding to at least one waveform acquired from the at least one moving target; forming a complex representation of the set of signal data; calculating, using a principal components processor, at least one complex principal component of the complex representation; and calculating an estimated value of a physical characteristic of the at least one moving target, using a phase of at least one of the at least one complex principal components.

In at least one embodiment, the physical characteristic is velocity.

In at least one embodiment, only a first complex principal component is calculated.

In at least one embodiment, estimated values of the physical characteristic are calculated, using a phase of at least two of the at least one complex principal components.

In at least one embodiment, at least one of the at least one complex principal components is automatically selected for use in the calculating an estimated value.

In at least one embodiment, a single complex principal component is automatically selected.

In at least one embodiment, the single complex principal component is automatically selected based on a phase shift property.

In at least one embodiment, the forming a complex representation is performed prior to the inputting a set of signal data, and wherein the inputting a set of signal data comprises inputting the set of signal data as the complex representation of the set of signal data.

In at least one embodiment, the signal data is transduced from ultrasonic waves.

In at least one embodiment, the estimated value is an estimated value used for motion estimation.

In at least one embodiment, the motion estimation is used in performing sonorheometry.

In at least one embodiment, the method comprises estimating blood velocity in a patient.

In at least one embodiment, the method is used in performing ultrasonic elastography.

In at least one embodiment, the inputting signal data is performed in real time using signal data transduced from waves reflected off or emitted from a moving target, and the method is performed in real time.

In at least one embodiment, the signal data is inputted from a computer memory storing the signal data generated from waves reflected off or emitted from a moving target.

A system for reducing echo decorrelation for a moving target is provided, including: a computer including an input device configured to input signal data to the computer, a processor configured to transform the signal data from real data to complex data having an imaginary component, to automatically calculate at least one principal component of the complex data, to automatically select at least one calculated principal component, and to extract parameters from the at least one automatically selected principal component to estimate a property of the target.

In at least one embodiment, the property comprises motion.

In at least one embodiment, an output device is configured to receive signals from the processor and to output property estimate results.

In at least one embodiment, the system includes an array of transducers configured to receive the input signal data and to input the input signal data to the computer.

In at least one embodiment, the array of transducers is further configured to emit signals toward an object, wherein the emitted signals reflect off the object and are received by the array of transducers.

In at least one embodiment, the transducers are configured to convert ultrasonic signals to electrical signals.

A computer readable medium that provides instructions, which when executed on a processor, cause the processor to perform a method comprising: accessing a set of signal data, wherein the signal data is generated from waves reflected off or emitted from a moving target; forming a complex representation of the set of signal data; calculating, using a principal components processor, at least one complex principal component of the complex representation; automatically selecting at least one of the at least one complex principal components; and applying each of the at least one automatically selected complex principal component to extract information about the at least one moving target.

A computer readable medium that provides instructions, which when executed on a processor, cause the processor to perform a method comprising: accessing a set of signal data, wherein the signal data is generated from waves reflected off or emitted from a moving target, forming a complex representation of the set of signal data, calculating, using a principal components processor, at least one complex principal component of the complex representation; and calculating an estimated value of a physical characteristic of the at least one moving target, using a phase of at least one of the at least one complex principal components.

These and other features of the present invention will become apparent to those persons skilled in the art upon reading the details of the methods, systems and computer readable media as more fully described below.

BRIEF DESCRIPTION OF THE DRAWINGS

FIGS. 12A-12F show sample PCs and simulated RF from the variable SNR simulations referenced in FIGS. 11A-11C.

DETAILED DESCRIPTION OF THE INVENTION

Figure 1:
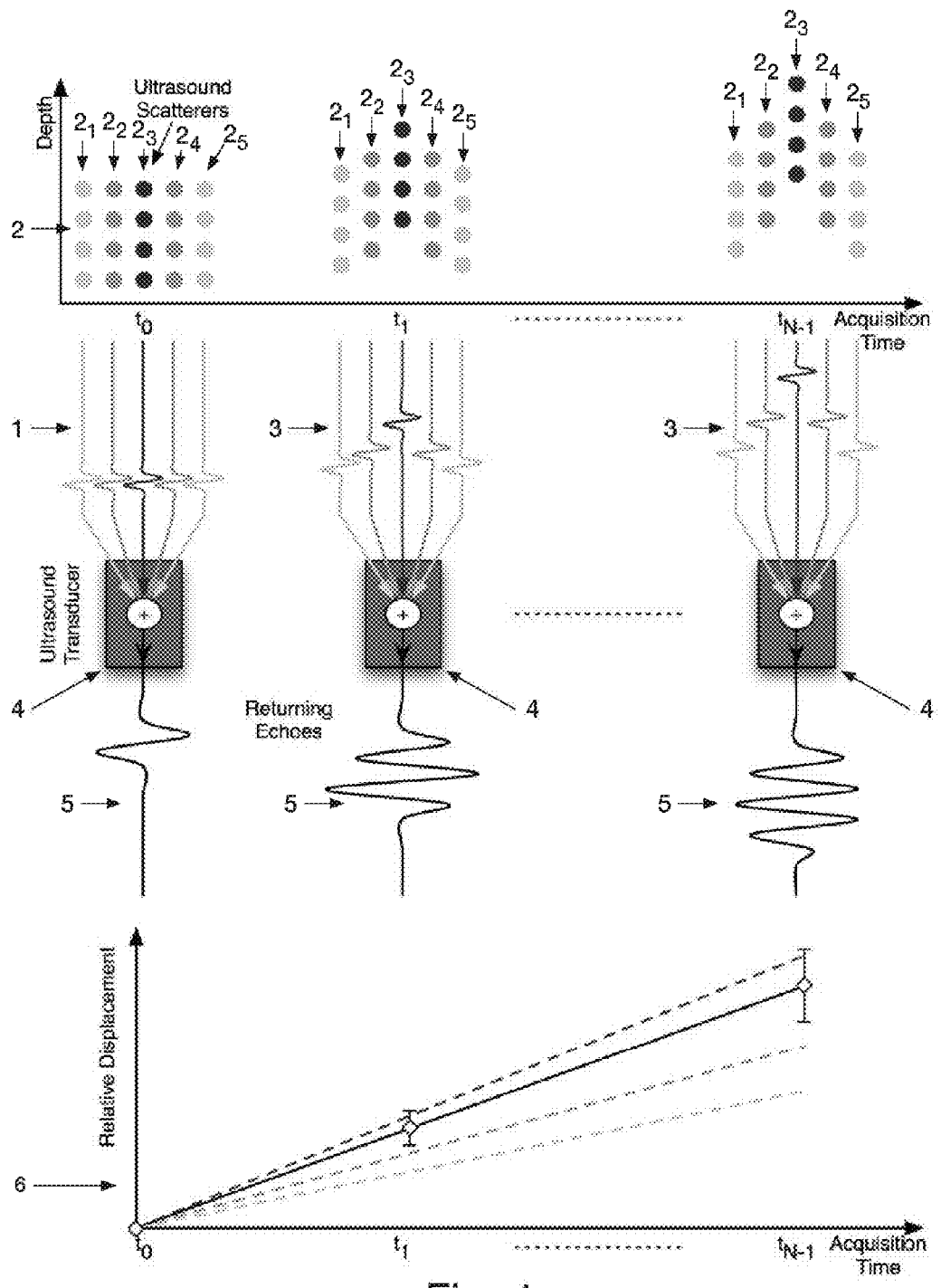
FIG. 1 schematically illustrates uncertainty that arises in displacement estimation with differential scatterer motion.

Before the present methods, systems and computer-readable media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a transducer" includes a plurality of such transducers and reference to "the image" includes reference to one or more images and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

An "ensemble" as used herein, refers to a set of more than one A-lines, which are acquired consecutively in time at the same beam axis position.

A "scatterer" refers to an object or region that exhibits a local variation in acoustic properties, including density, compressibility, and absorption, from surrounding objects or regions.

An "A-line" refers to a scan line in ultrasound imaging, the position of the ultrasound beam axis during one pulse-echo sequence. B mode images (see definition below) are produced by sweeping the ultrasound beam in a plane across the region of interest while transmitting ultrasound pulses and detecting the echoes. When a pulse is transmitted, the ultrasound beam remains stationary until all echoes from the displayed field of view are received. The beam then moves on to the next position. The echoes received at each position are displayed along A-lines in the image, corresponding to the beam axis positions. The density of the A-lines affects the lateral resolution in the image.

The term "B-mode" or "B-mode image" refers to a brightness mode, a two-dimensional ultrasound image display composed of bright dots representing the ultrasound echoes. The brightness of each dot is determined by the echo amplitude (after time gain compensation TGC). A B-mode image is produced by sweeping a narrow ultrasound beam through the region of interest while transmitting pulses and detecting echoes along a series of closely spaced scan lines (i.e., A-lines). The scanning may be performed with a single transducer mounted on an articulating arm that provides information on the ultrasound beam direction (compound B scan, static B scanner), or with a real-time scanner such as a mechanical scanner or an electronic array scanner. Using an array transducer with multiple transducer elements, at each scan line position, one ultrasound pulse is transmitted and all echoes from the surface to the deepest range are recorded before the ultrasound beam moves on to the next scan line position where pulse transmission and echo recording are repeated. In the B-mode image, the vertical (depth) position of each bright dot is determined by the time delay from pulse transmission to return of the echo, along with the speed of sound, and the horizontal position by the location of the receiving transducer element.

The terms "f-number" and "f/#", as used herein, refer to the range of interest (often the focal length) divided by the linear dimension of the aperture over which data is collected (receive aperture) or transmitted (transmit aperture). The transmit aperture is the width of the number of simultaneous firing transducer elements in the array of the system used to transmit the beam that caused the returning wave to be reflected off of an object. The above definition is typically referred to as the lateral f-number, recognizing that most modern imaging systems utilize linear or phased arrays that have a diversity of elements in only one dimension. For such systems one of ordinary skill in the art will also recognize the elevation f-number which simply refers to the range of interest divided by the elevation dimension of the array. Two-dimensional transducer arrays are now becoming common and for these systems lateral and elevation f-number have their clear meaning, with the difference being that such arrays have a plurality of elements in both the lateral and elevation dimensions. Lateral resolution is typically best (smallest), where there is a large aperture, short focal length, and short wavelength. In terms of f-number, resolution is best (finest) when the f-number is low and the wavelength is short.

The "point spread function" or "PSF" describes the response of an imaging system to a point source or object. Generically, the PSF refers to the system response over a combination of temporal and spatial dimensions. The specific combination of temporal and spatial dimensions much be determined from context, although in some cases the term may be used generically to refer to the system response to a point target.

The "most energetically significant signal" as used herein, refers to the component of a signal with the largest energy. For example, the most energetically signification signal will possess the largest sum squared value of signal magnitude over the length of the signal.

As used herein, the "most energetic principal component" or the "most energetic complex principal component" refers to the first principal component, which is the unit vector that maximizes the variance of its projection onto the input data set as expressed in equation (4) below.
Variance In general, TDE algorithms employ pattern-matching functions to estimate the optimal delay between two or more discretely sampled signals. For an unbiased estimator, the minimum achievable variance can be predicted theoretically using the Cramer-Rao Lower Bound (CRLB):

$$\sigma(\Delta t - \hat{\Delta t}) \geq \sqrt{\frac{3}{2 f_0^3 \pi^2 T (B^3 + 12B)} \left( \frac{1}{\rho^2} \left( 1 + \frac{1}{SNR^2} \right)^2 - 1 \right)} \quad (1)$$

where $\Delta t$ is the true time delay, $\hat{\Delta t}$ is the estimated time delay, $f_0$ is center frequency, T is kernel length, B is fractional bandwidth, $\rho$ is signal correlation, and SNR is electronic signal to noise ratio. Equation (1) indicates that given a set of imaging parameters ($f_0$, B, and T), the performance of an unbiased TDE estimator is highly dependent on the signal correlation and electronic SNR. For a more detailed description of equation (1), see Walker et al., "A fundamental limit on delay estimation using partially correlated speckle signals", IEEE Trans Ultrason Ferroelect Freq Contr 1995; 42(2):301-308, which is hereby incorporated herein, in its entirety, by reference thereto.

FIG. 1 schematically illustrates uncertainty (i.e., variance) that arises in displacement (i.e., motion) estimation with differential scatterer motion. A "scatterer" is defined here as an object or region that exhibits a local variation in properties, including, but not limited to density, compressibility and absorption, from surrounding objects or regions. The mismatch between reflective properties of adjacent regions results in reflection of the applied beam in all directions. A scatter may refer to an object or region of similar size or smaller than one wavelength of the transmitted pulse. In medical ultrasound applications, scatterers may refer to microstructures of various organs, tissues, or cells, including, but not limited to: kidney, liver tissue, muscle tissue and/or blood cells. A scatterer may also refer to a boundary region such as encountered in medical ultrasound imaging of the diaphragm, blood vessel walls, organs, etc. FIG. 1 shows a spatially varying acoustic radiation force field 1 being applied to a set of targets 2 over N acquisitions from time $t_0$ to $t_{N-1}$. The non-uniform force field 1 induces a gradient of scatterer displacements across the point spread function (PSF). FIG. 1 represents different displacements by the different columns $2_1$, $2_2$, $2_3$, $2_4$ and $2_5$ of circles in the target field. The echo signals received by transducer 4 from all scatterers across the PSF are summed to give the resulting received echo 5. The delays 3 in echo signals from different sets of scatterers are illustrated prior to the summation node at the transducer 4. As the gradient of displacements increases through acquisition time (as illustrated in graph 6), the correlation between successive received echoes decreases, which results in increasing uncertainty in displacement/motion estimates. The displacement profile estimated from the received echo signal is illustrated as the solid line 7 with error bars indicating uncertainty in the displacement estimate. The dashed lines 7', 7" and 7'" correspond to the different sets of scatterers $2_1$, $2_5$; $2_2$, $2_4$; and $2_3$, respectively, and indicate the actual displacements of these scatterers.

The present invention provides methods, systems and computer-readable media that employ complex principal component filtering (PCF) to improve echo correlation and SNR, thereby reducing variance and thus, improve overall TDE performance for estimation of motion. By forming a complex representation of signal data corresponding to at least one waveform reflected off of a moving target, complex principal components can be calculated. When real datasets are analyzed, the principal components of the real datasets do not contain information about the motion of the signal components and their behavior in different motion environments in not well predicted. In contrast, by using complex datasets according to the present invention, the motion of the scatterers of the target is captured in the phase of the signals, as the real portions of the signals remain relatively stable, and thus do not show the less stable behavior that the principal components of a corresponding real dataset would show. Thus, in the complex dataset, the data corresponding to motion is contained almost entirely as phase data, that is the phase of the data changes while the real component of the complex data is not altered significantly.

Complex Principal Component Filtering

Principal component filtering (PCF) applies principal component analysis (PCA) to filter signal data. Mathematically, principal component analysis (PCA) is defined as an orthogonal linear transformation of the data onto a new coordinate system such that the projection of the data onto the first coordinate (called the first principal component) has the largest variance. Likewise, the second principal component (PC), which is orthonormal to the first PC, has a projection with the second largest variance, and this trend persists for all new PC coordinates. The present invention applies principal component analysis (PCA) to ensembles of radio-frequency (RF) data, to separate source signals of interest from undesired secondary source signals and noise. In order to filter the undesirable source signals using PC filtering (PCF), the input data matrix is mapped onto a new signal subspace that spans only the PC coordinates of interest. After identifying the PC coordinates of interest, a signal subspace projection operator is formed by matrix multiplication of the PC coordinates of interest with their conjugate transpose. Next the input data matrix is projected onto the projection operator resulting in a filtered output of reduced rank.

In order to illustrate the application of complex PCF to ensembles of echo data, first consider the matrix of complex echo data, X (with dimensions [M×N] where M and N are both positive integers). The matrix, X has been mean reduced so that each column has zero mean and the matrix contains an ensemble of A-lines. For example, referring to a matrix of real values of echo data as Q (the input matrix), that the mean-reduced matrix X is calculated by:

$$U[n] = \frac{1}{M} \sum_{n=1}^{M} Q[m,n] \qquad (2)$$

and $$X = \text{Hilbert}(Q - hU) \qquad (3)$$

where h is an M×1 column vector in which all values are 1, and U is the 1×N empirical mean vector. The operator Hilbert( ) is performed as defined in the MATLAB function "hilbert.m".

Figure 2:
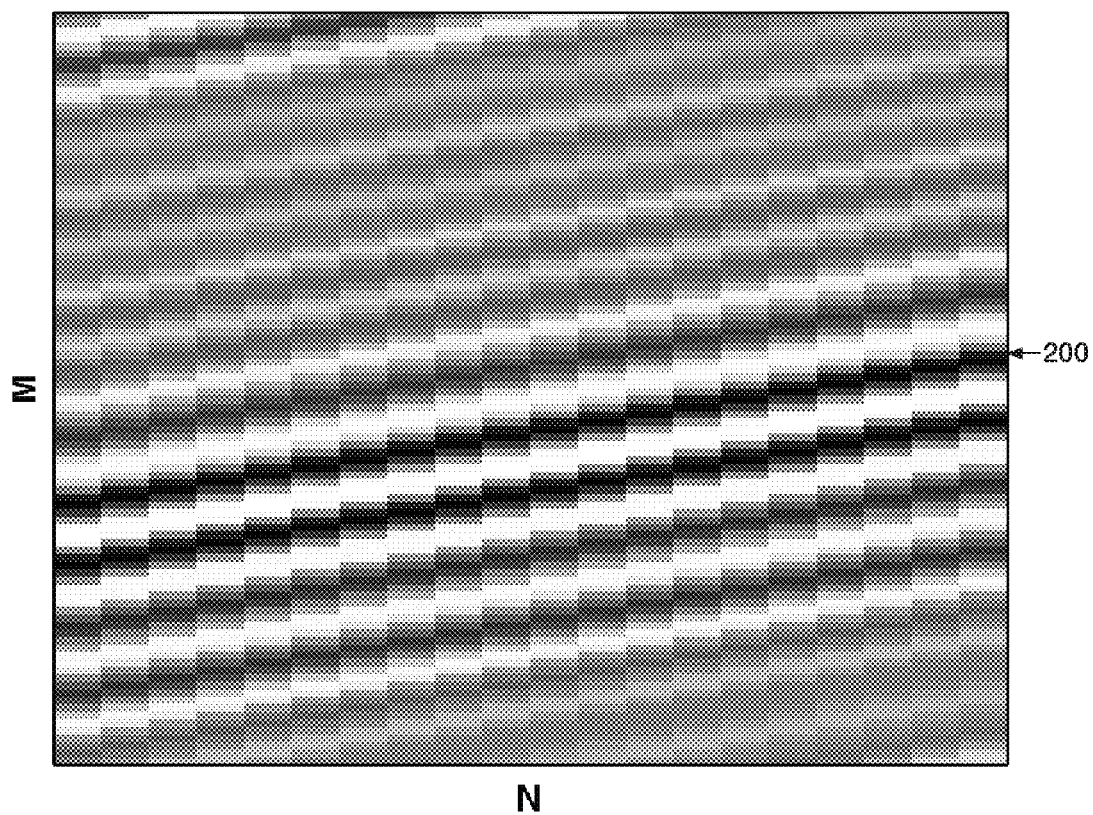
FIG. 2 illustrates a matrix of complex echo data.

An example of the real portion of 200 of matrix X is illustrated in FIG. 2. Columns of X represent the N number of A-lines in the ensemble, each containing M samples. The M samples span the 'fast time' dimension with interval determined by the sampling rate after complex demodulation. Conversely, the rows of X are oriented in the 'slow time' dimension so that there are N samples with period determined by the pulse repetition frequency (PRF). With this orientation, there are M observations (rows) and N variables (columns). Filtering is performed in the observation or row dimension, which corresponds to 'slow time' in the present invention. The first complex principal component, $v_1$ (with dimensions [N×1]) may be expressed as:

$$v_k = \underset{|v|=1}{\operatorname{argmax}} \operatorname{var}\{Xv_1\} = \underset{|v|=1}{\operatorname{argmax}} E\{(Xv_1)^2\} \qquad (4)$$

where $$\underset{|v|=1}{\operatorname{argmax}}$$

indicates that the argument is maximized under the condition that $v_k$ is a unit vector, var denotes variance, and E denotes expectation value. For further discussion regarding equation (4), see Jolliffe, "Principal Component Analysis, Springer Series in Statistics, 2nd ed., Springer, N.Y., 2002, which is hereby incorporated herein, in its entirety, by reference thereto. Therefore, the first PC, $v_1$ is the unit vector that maximizes the variance of the projection onto X. Similarly, the [$k^{th}$] $k^{th}$ PC coordinate may be found recursively by:

$$\hat{X}_{k-1} = X - X \sum_{i=1}^{k-1} v_i v_i^* \text{ for } 2 \le k \le N \qquad (5)$$

$$v_k = \underset{|v|=1}{\operatorname{argmax}}\{\operatorname{var}(\hat{X}_{k-1} v_k)\} \text{ for } 2 \le k \le N \qquad (6)$$

where v* is the conjugate transpose of v.

An alternative approach to computing principal components, which is used in the present invention, is a linear algebra approach called the covariance method. Given that the covariance matrix of the mean reduced ensemble of echo data is typically unknown, the sample covariance matrix, $\hat{C}$ (with dimensions [N×N]) can be computed:

$$\hat{C} = \frac{1}{N-1} X^* X \qquad (7)$$

The PCs can then be calculated by performing an eigenvalue decomposition to diagonalize $\hat{C}$ as follows:

$$V^{-1} \hat{C} V = \Lambda \qquad (8)$$

where V is an N×N matrix of eigenvectors arranged in columns, which are the computed PCs. The diagonal matrix Λ contains eigenvalues, arranged to correspond with the associated PCs in V.

The signal received from the transducer is a signal that is the sum of many signals, including a signal of interest. The goal of PCA is to find the signal of interest and exclude all other signals, to the extent possible. Designating $S_1$ as the signal received from the transducer, where $S_1 = S_2 + S_3 + S_4 + \ldots S_X$, where X is a positive integer, and the signal of interest is one of the signals $S_2, S_3, S_4, \ldots$ or $S_X$. Thus, to perform complex PC-based filtering, the orthonormal PCs can be calculated from a complex representation of the signal $S_1$. The orthonormal PC(s) that correspond to the signal of interest are adaptively selected, to form a matrix W (with dimensions [N×L]), where L represents the number of selected PCs. The PCs can be interpreted as filters that are formed based on the statistics or the input data set. In the present invention, PC selection is automatic. A projection operator, $P_k$ (with dimensions [N×N]) is then formed to map the input data matrix X onto the new signal subspace retaining only the PCs of interest, where $P_k$ is calculated as follows:

$$P_k = WW^* \qquad (9)$$

and $$Y = XP_k \qquad (10)$$

where Y (with dimensions [M×N]) is the output signal of the complex PC filter and W* is the conjugate transpose of W.

Therefore, a reduced rank approximation of the original data set can be computed as described above to form an adaptively filtered output. In the present invention, the original signal ensemble, e.g., echo data is transformed from real to complex data, preferably by using the Hilbert transform (e.g., using the Hilbert function in MATLAB (MathWorks, Inc., Natick, Mass.) applied to electrical signal data (i.e., echo data, e.g., Radio Frequency (RF) echo data) transduced from echoes received from a target. Only the real part of the filtered echo data, Y is utilized for time delay estimation. By applying PCF to complex echo data this allows trends in displacement to be captured with the first, most energetic principal component (PC). In contrast when PCF operates on real echo data, even small shifts through ensemble length (where "ensemble length" refers to the number of A-lines used to form the input matrix X), requires the use of multiple principal components to effectively capture the data representing the small shifts. Accordingly, using PCF according to the present invention, only the first PC need be calculated in instances where the target is fairly homogeneous, as the first PC is the most energetic in these instances. This greatly reduces computational time and the first PC after calculation is automatically selected for PCF. In some other instances, such as in vivo measurements of blood flow, for example, tissue (e.g., solid tissue such as vessel walls, heart tissue, etc) generates the most energetic PC, with the blood generating the second most energetic PC. In examples such as these, the system can be preprogrammed to calculate the first two PC's and select only the second PC for further processing using complex PCF. Visual inspection is generally required when deciding which real PCs to retain whereas complex PCF according to the present invention does not require user input, but is automatic, as only the first PC (or only the second PC, or some predefined combination of PC's) need be used and can therefore be automatically selected. Further, not only does the present invention does not require manual inspection, but it also does not require the projection of the principal component basis functions onto both dimensions of the input signal. The present invention allows for calculation of specific parameters, such as displacement, directly from the principal components. Still further, the calculation of one or more principal components according to the present invention provides an accurate estimate of the principal components. Approximate stationarity is achieved in the present invention by limiting the window size applied to the echo data such that first and second order statistics of the input signal are approximately stationary.

The application of complex PCF filtering can be used to reduce speckle decorrelation and improve motion estimation in amounts that improve results obtained by prior art methods and systems.

Figure 3:
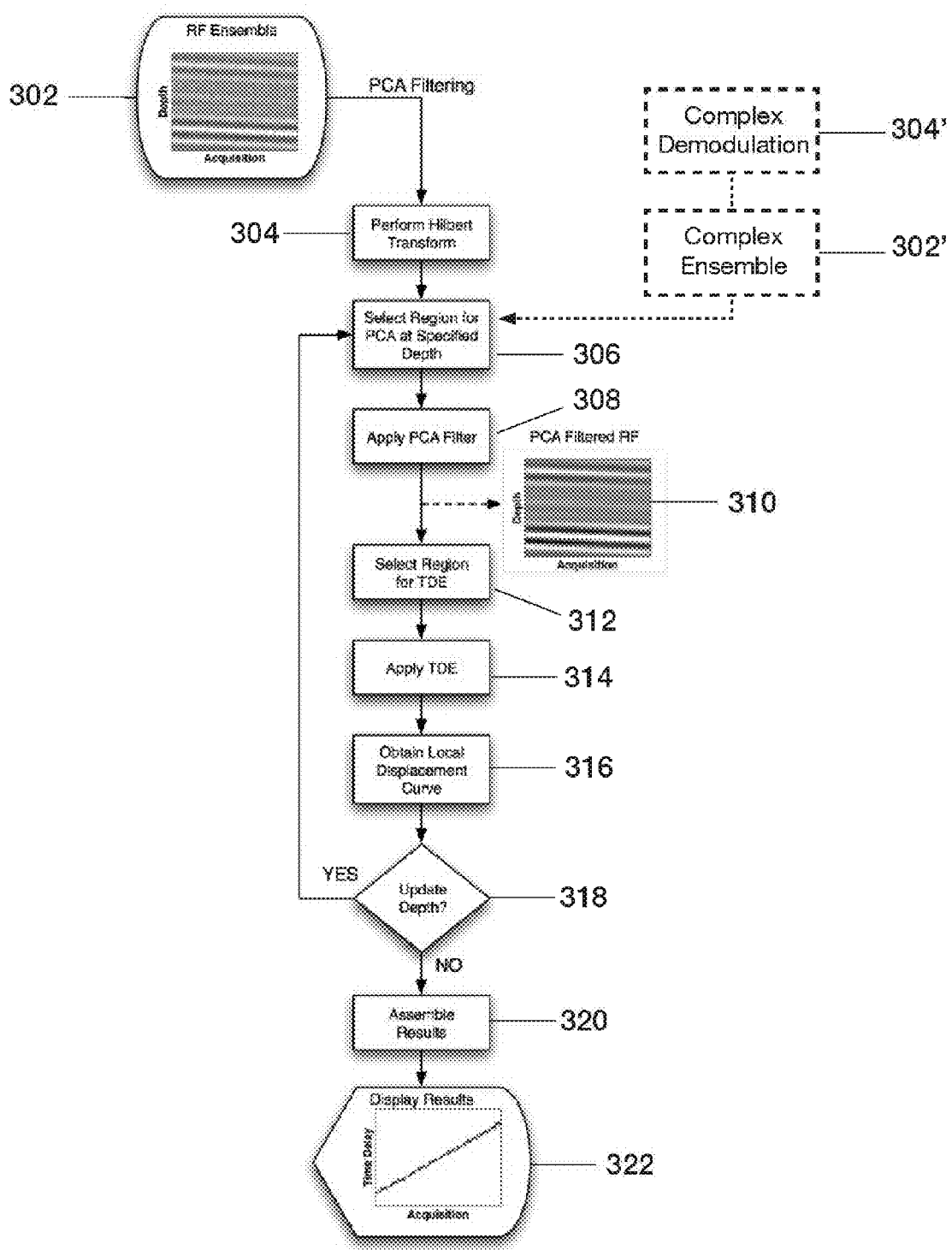
FIG. 3 is a flow chart illustrating events that may be carried out using a method according an embodiment of the present invention.

FIG. 3 is a flow chart illustrating events that may be carried out using a method according to an embodiment of the present invention for applying complex PCF to ensembles of echo data to decrease echo decorrelation of the data, reduce variance and improve certainty of the results outputted by the method. At event 302, a data matrix Q having N columns of A-lines and M rows of samples is inputted to the system (examples of systems are described below) for processing. Each sample corresponds to the echo reflected back from a target at a given depth.

At event 304, the matrix Q is transformed to a complex matrix X, such as by applying the Hilbert transform to the originally inputted matrix. The resulting matrix X is a matrix of complex echo data (with dimensions [M×N], where M and N are both positive integers). The matrix X is mean reduced so that each column has zero mean and the matrix X contains an ensemble of A-lines. Given Q is a real matrix, the complex matrix X is calculated using equations (2) and (3). As noted above, columns of X represent the N number of A-lines in the ensemble, each containing M samples. The M samples span the 'fast time' dimension with interval determined by the sampling rate after complex demodulation. Conversely, the rows of X are oriented in the 'slow time' dimension so that there are N samples with period determined by the pulse repetition frequency (PRF). Alternatively, complex demodulation of the signal can be performed prior to beamforming single channel echo data, as illustrated by alternative steps 304' and 302' In this case, the RF signals are complex demodulated at event 304' prior to forming an input matrix at 302' which, in this case is a complex ensemble. In either alternative, matrix X is provided, which is further processed at event 306.

At event 306 a region of the matrix X is selected for PCA filtering at a specified depth. The specified depth is preselected by a user. To render an image based on motion estimates, the selected depths typically span the entire length of the echo and they are typically spaced at regular intervals.

Once the region is selected for PCA filtering at a specified depth, PCA filtering (i.e., complex PCF) is performed at event 308. Filtering is performed in the observation or row dimension, which corresponds, to 'slow time' as described above.

Upon computing the empirical covariance matrix C and performing Eigenvalue decomposition of C to find principal components, which are arranged in columns of V (see equations (7) and (8) above, the first complex principal component PC) is then selected and retained for forming matrix W and the projection operator $P_k$ is formed (see equation (9) above).

The projection operator $P_k$ is then used to map X on the new signal subspace using equation (10) to provide filtered output RF data matrix Y, see 310.

At event 312, a region of the matrix Y is selected for further processing for time delay estimation (TDE). The region selected for further processing is a depth corresponding to the depth selected for PCF processing above, as predefined by the user.

At event 314, the system applies time delay estimation processing which may be performed according to a variety of different algorithms that are available for time delay estimation. A preferred algorithm for use in this embodiment is a spline-based time delay estimation algorithm described by Viola et al. in "A spline-based algorithm for continuous time-delay estimation using sampled data", IEEE Trans Ultrason Ferroelect Freq Contr 2005; 52(1):80-93, which is hereby incorporated herein, in its entirety, by reference thereto.

At event 316, results of TDE processing provide a local displacement curve, providing estimates of displacement of the target being measured by the RF ensemble at the currently selected depth and region of the data. At event 318 a decision is made as to whether to update the depth at which processing is to occur. As processing is performed automatically over a series of preprogrammed depths, this decision is made according to whether each of the preprogrammed depths has been processed yet. If all depths that were preprogrammed to be processed have already been processed, then processing proceeds to event 320 where results are assembled. Assembling of results includes combining the local displacement curves from events 316 so as to provide estimates of motion of the target over all samples and depths. At event 322, the assembled results are displayed, such as by displaying on a display screen or outputting on paper or other medium that is readable by a user.

If, at event 318 there remains one or more additional depths at which processing has not yet been performed, then processing returns to event 306 and events 306, 308, 310, 312, 314, 316 and 318 are iterated until all depths intended to be processed have been processed.

Processing as described above with regard to FIG. 3 can be performed on stored data (e.g., stored data matrix/matrices) or "on-the-fly", in real time as the echoes are being received by the system.

Figure 4:
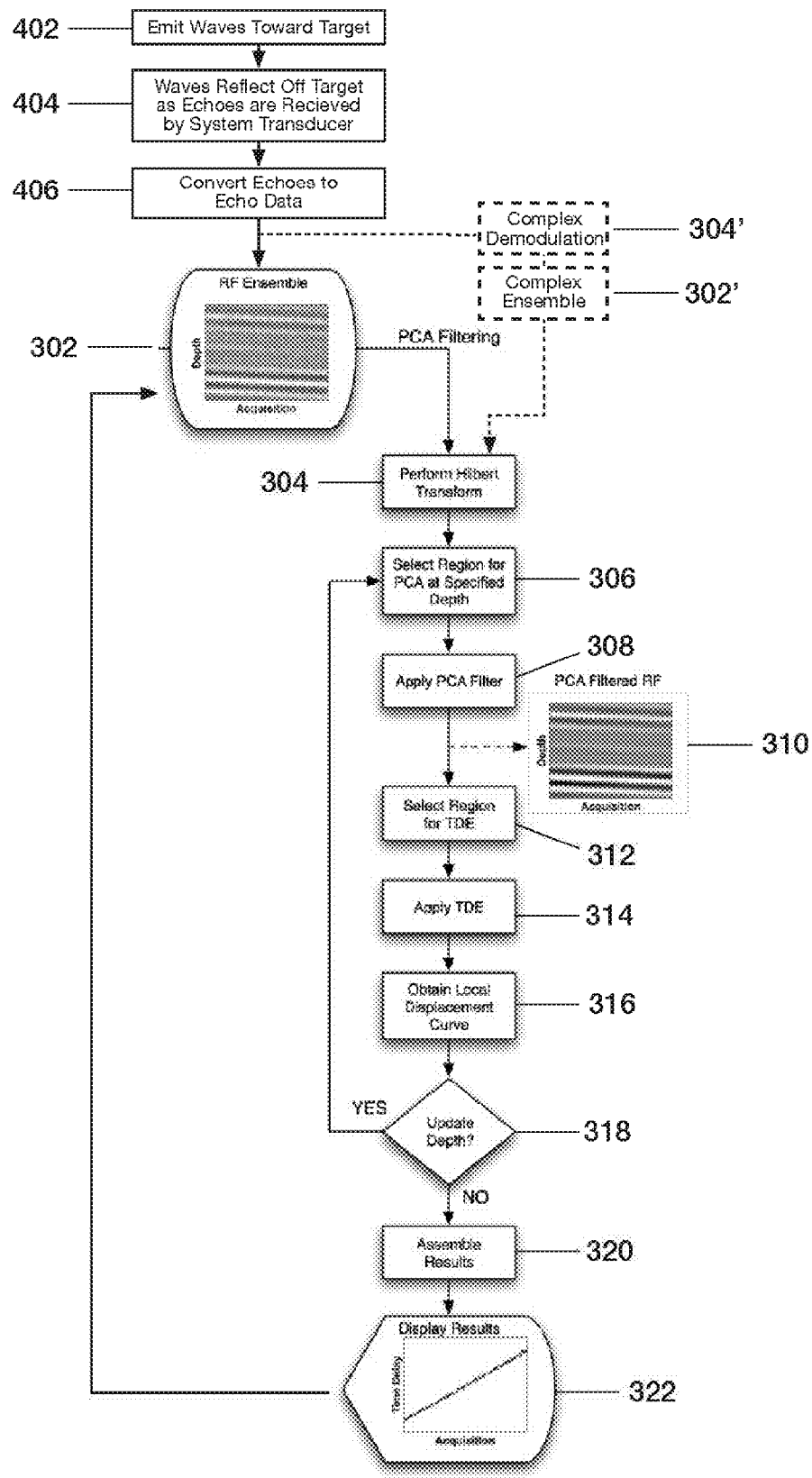
FIG. 4 is a flow chart illustrate carrying out events described in FIG. 3, where the input data matrix/matrices are being generated and processed in real time.

FIG. 4 illustrates an example of events where the input data matrix/matrices are being generated and processed in real time. At event 402, waves are emitted from a transducer toward a target to be imaged. At event 404, the wavers are reflected off the target as echoes and received by a transducer of the system, which may be the same as or different from the transducer used to emit the waves. At event 406, the echoes are converted to electric signal data (i.e., echo data) and the echo data is assembled into the input matrix at event 302.

Processing then continues as described above with regard to FIG. 3. Once results are displayed at 322, processing returns to 302 if the user still desires to image the target and a new input matrix is obtained at 302. Events 402-406 may also continue to operate continuously as long at the user desires to continue imaging the target, or the user may intermittently carry out this process as desired. For each input matrix obtained at 302, events 304-322 are carried out as described above to provide an output result for viewing by a user.

Robust Principal Component Displacement Estimation

In order to further reduce computational complexity and therefore reduce processing time, which is particularly valuable for real time applications, robust principal component displacement estimation (PCDE), according to the present invention, is a hybrid estimator technique in that it operates partially as a time domain estimator and partially as a phase domain estimator. Thus, this approach combines the decorrelation reduction of PCA with the modest computational cost of phase-domain estimators and the high performance of time domain techniques.

Figure 5A:
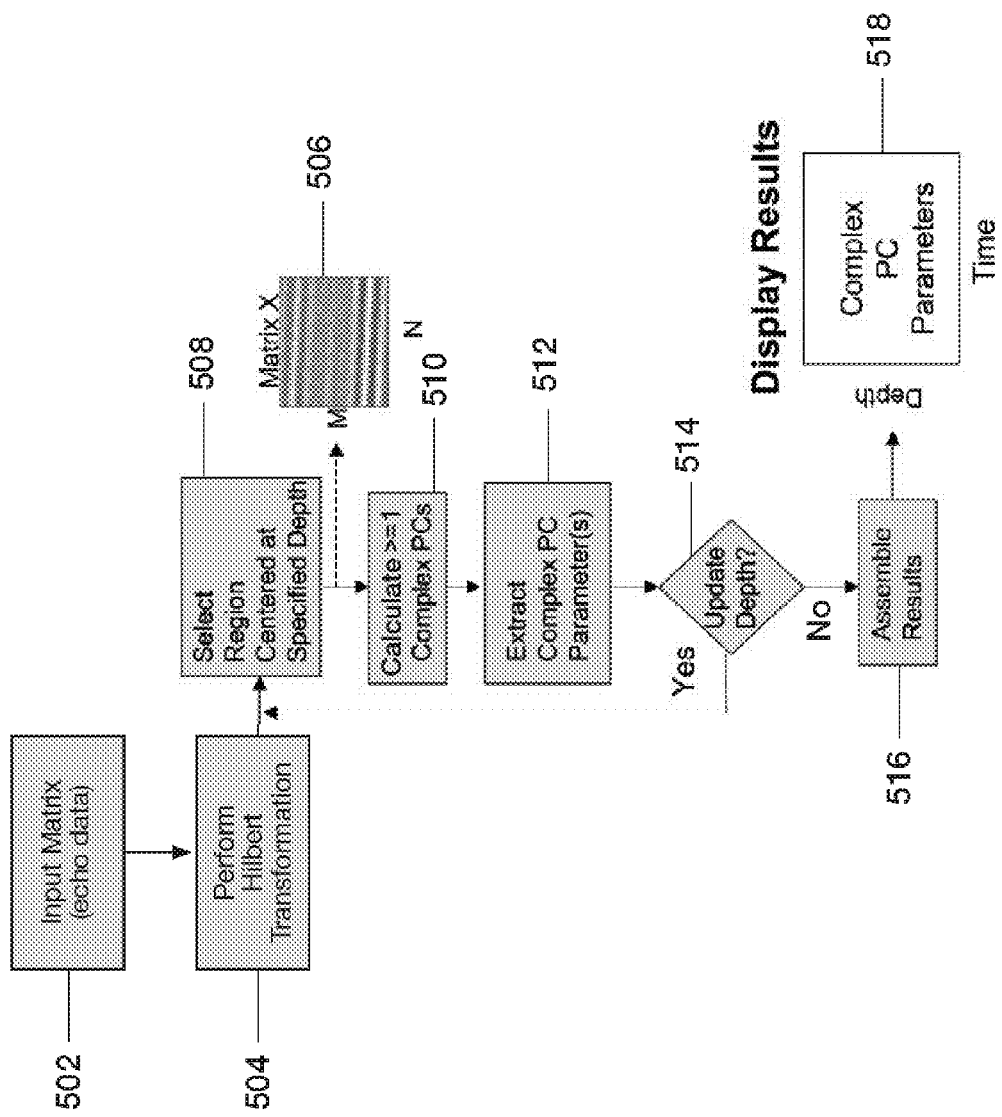
FIG. 5A is a flow chart illustrating events that may be carried out using a method according another embodiment of the present invention.

Like PCF, PCDE operates on an ensemble of echo data (e.g., RF signal data) as INPUT. In FIG. 5A, data in input matrix 502 are made complex via the Hilbert transform at event 504 for windowing through depth to form the matrix, X(506 (with dimensions M×N). At event 508 a region of the transformed input matrix is selected for forming matrix X for PCA analysis at a specified depth. Thus, X is a subset of the complex RF data (cRF) with window through depth of length M. For example, if dpth is used to represent the desired depth, then X=cRF(n,m), where n=dpth−(M/2), ... dpth+(M/2) and m=1, 2, ..., N.

The specified depth is preselected by a user and is typically preprogrammed. To render an image based on motion estimates, the selected depths typically span the entire length of the echo and are typically spaced at regular intervals.

At event 510, at least one complex PC is calculated according to techniques already described. At event 512, complex PC parameters are extracted for one or more complex PC's. This process may also be automatic, where only the first PC is calculated and parameters are extracted, or any number of PC's may be preselected for calculation of the complex PCs and extraction of complex parameters therefrom.

At event 514 a determination is made as to whether to update the specified depth to select another region of the data at a new specified depth.

If, at event 514 there remains one or more additional depths at which processing has not yet been performed, then processing returns to event 508 and events 508, 510, 512 and 514 are iterated until all depths that were preselected to be processed have been processed.

Once all preselected depths have been processed (i.e., when the answer is "No" at event 414), then results for all depths are assembled at event 516 and complex PC parameters (e.g., estimate of displacement, phase and/or peak displacement, etc.) are extracted at event 518.

Figure 5B:
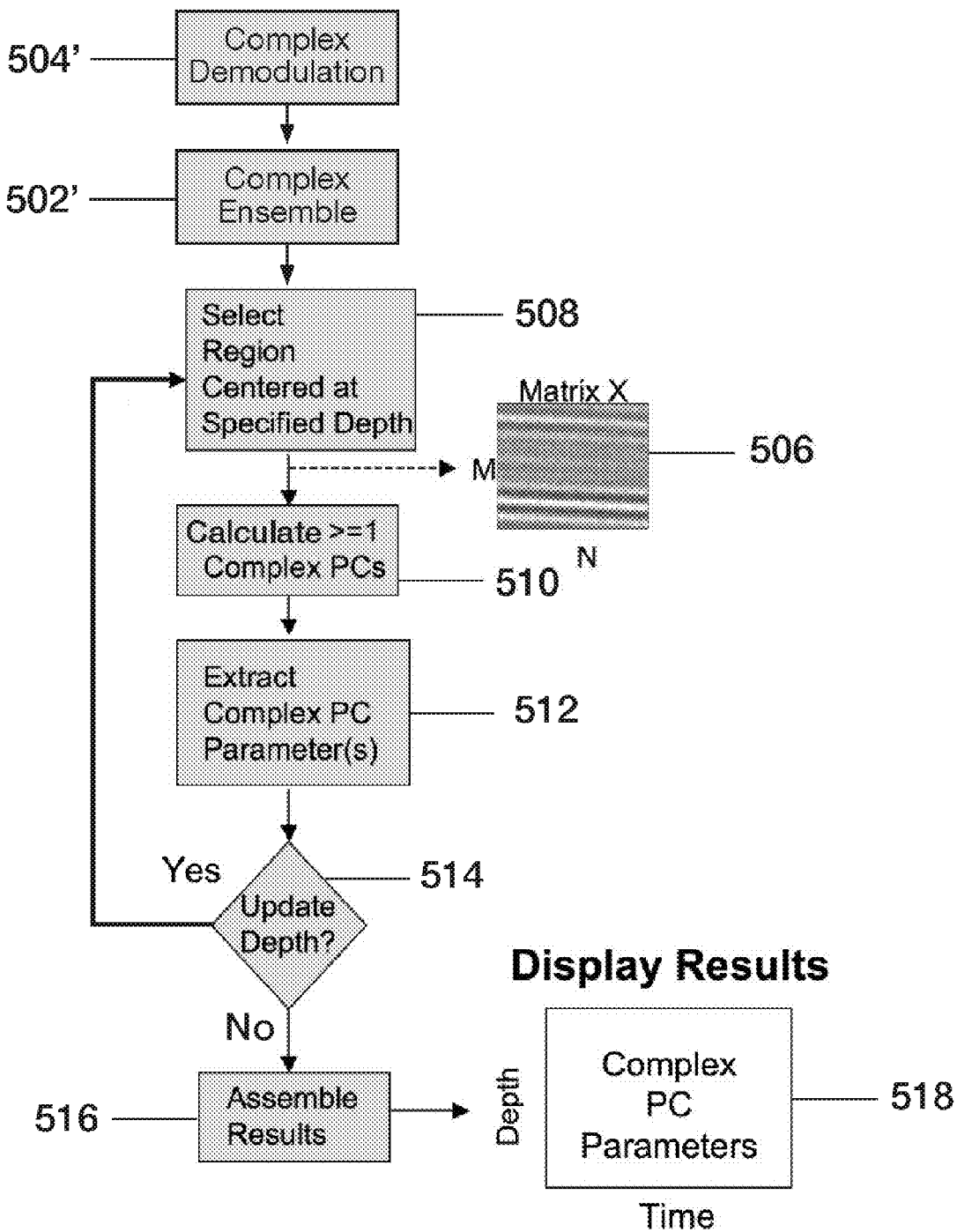
FIG. 5B is a flow chart illustrating events that may be carried out using a method according another embodiment of the present invention.

Conversion of the input data from real data to complex data can be performed as in FIG. 5A, upon receiving RF data after beamforming the data received from a transducer. Alternatively, data received from the transducer may be complex demodulated prior to beamforming, as illustrated in FIG. 5B. Thus, for example, RF data received from a transducer is complex demodulated at event 504' and then beamformed at event 502' to output A-lines of complex data. Processing then continues from event 508 in the same manner described above with regard to FIG. 5A.

Figure 5C:
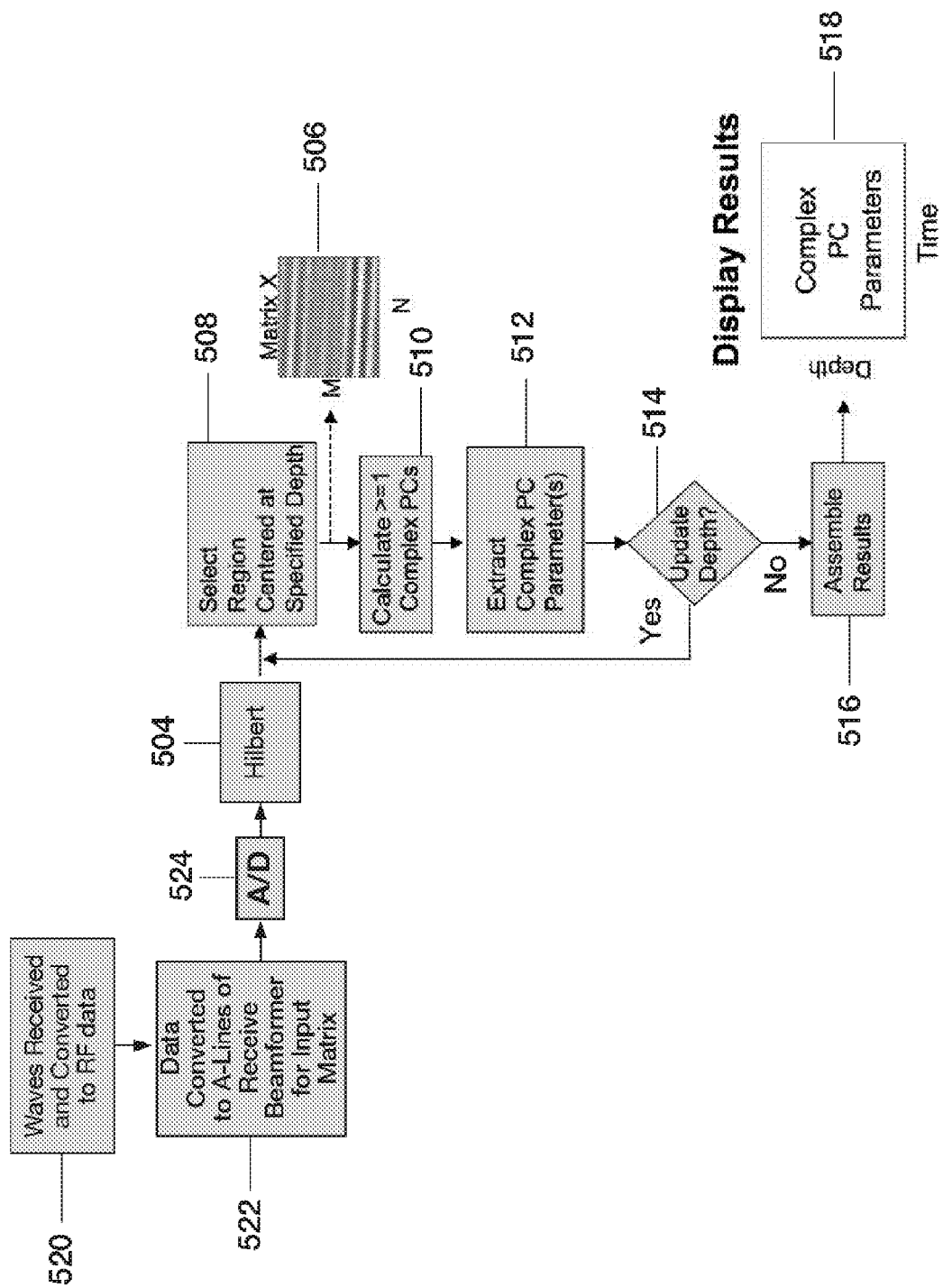
FIG. 5C is a flow chart illustrating events that may be carried out using a method according another embodiment of the present invention.

Similar to PCF processing as described with regard to FIGS. 3-4 above, PCDE processing can be performed on stored data (e.g., stored data matrix/matrices) or "ion-the-fly", in real time as the waves are being received by the system. In FIG. 5C, waves are received by a transducer at event 520 and converted to RF data. The RF data is then input to a receive beamformer at event 522 and the receive beamformer converts the RF data to A-lines for form input matrix Q. The input matrix data is A/D (analog-to-digital) converted at event 524 and then processing proceeds from event 504 in the same manner as described with regard to FIG. 5A above.

Figure 5D:
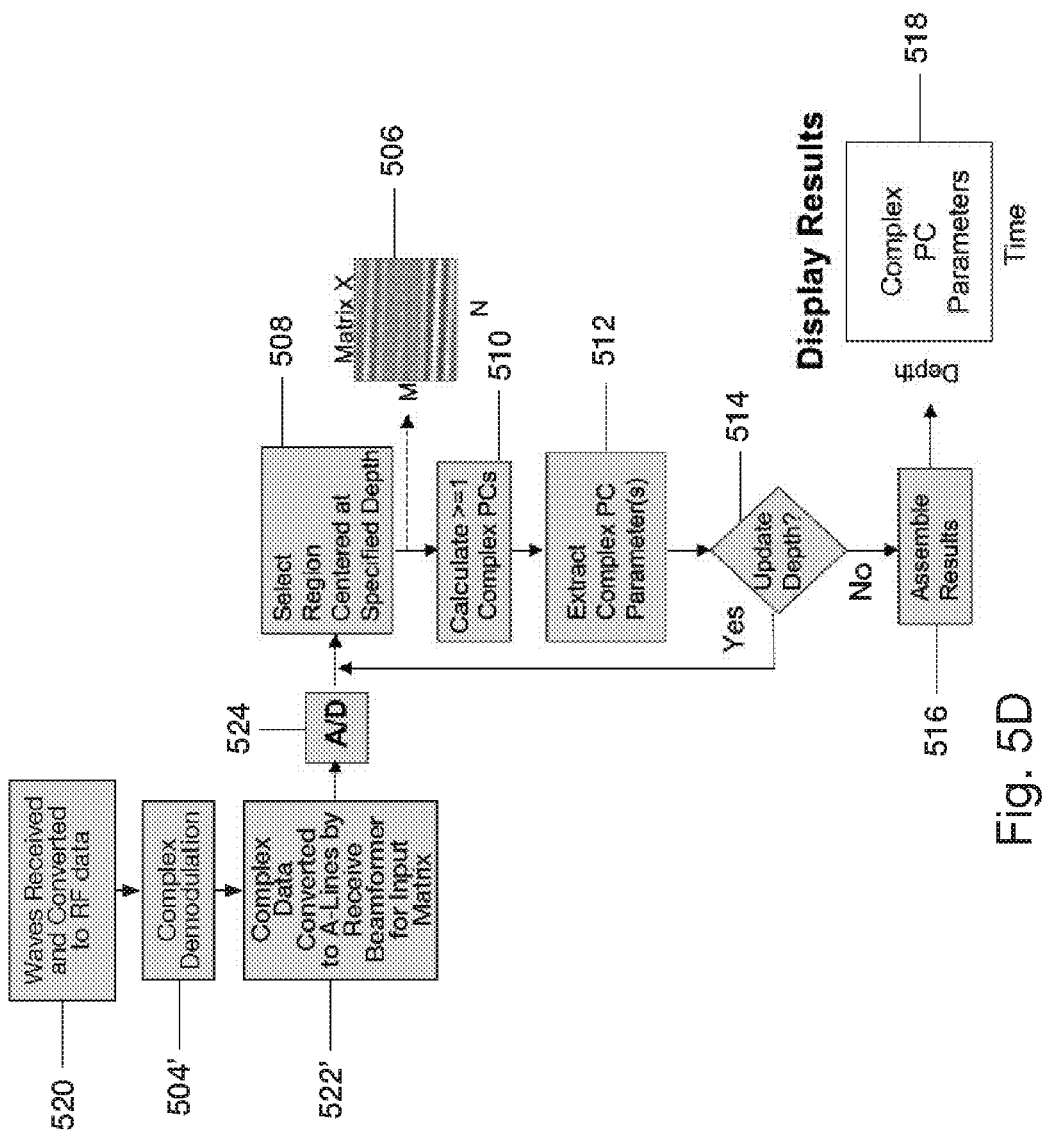
FIG. 5D is a flow chart illustrating events that may be carried out using a method according another embodiment of the present invention.

Similarly, FIG. 5D illustrates that waves are received by a transducer at event 520 and converted to RF data. The RF data is then complex demodulated at event 504' and the complex data is then input to a receive beamformer at event 522', where the receive beamformer converts the complex data to A-lines of complex data. The complex data is input to an A/d converter at event 524 where it is A/D converted and then processing proceeds from event 508 in the same manner as described with regard to FIG. 5B above.

Once the principal components of the matrix X have been calculated, the first complex PC, $v_1$ is used to compute displacements in PCDE at event 502. The first complex PC is obtained from the first column of V. The estimate of displacement through ensemble length, d [samples] (where each sample, m, has dimensions N×1), is calculated by scaling the phase of the first complex PC, $\angle v_1$ [radians] by the sampling frequency, $f_s$ [samples/s] and center frequency, $\omega_0$ [radians/s]:

$$d = \angle v_1 \frac{f_s}{\omega_0} \qquad (11)$$

Local variations in the center frequency of the echo ensemble are computed using the phase of the autocorrelation function γ(m',n'):

$$\gamma(m', n') = \sum_{m=0}^{M-m'-1} \sum_{n=0}^{N-n'-1} X(m, n) X^*(m+m', n+n') \qquad (12)$$

$$\omega_0 = \tan^{-1}\left\{ \frac{\text{Im}[\gamma(1, 0)]}{\text{Re}[\gamma(1, 0)]} \right\} \qquad (13)$$

where Im[γ(1,0)] is the imaginary component of γ(1,0) and Re[γ(1,0)] is the real component of γ(1,0), and m' and n' are dummy variables.

After estimating displacements at event 502, processing then proceeds to event 320 where results are assembled. Assembling of results includes combining the local displacement estimates so as to provide estimates of motion of the target over all samples and depths. At event 322, the assembled results are displayed, such as by displaying on a display screen or outputting on paper or other medium that is readable by a user.

Processing as described above with regard to FIG. 5 can be performed on stored data (e.g., stored data matrix/matrices) or "on-the-fly", in real time as the echoes are being received by the system. This embodiment is particularly well-suited to real time processing, as the displacement estimate calculations require the computation of only one PC. An example of real time processing using PCDE includes carrying out the events of 402-406 in real time, in conjunction with performing the events of FIG. 5.

Figure 6:
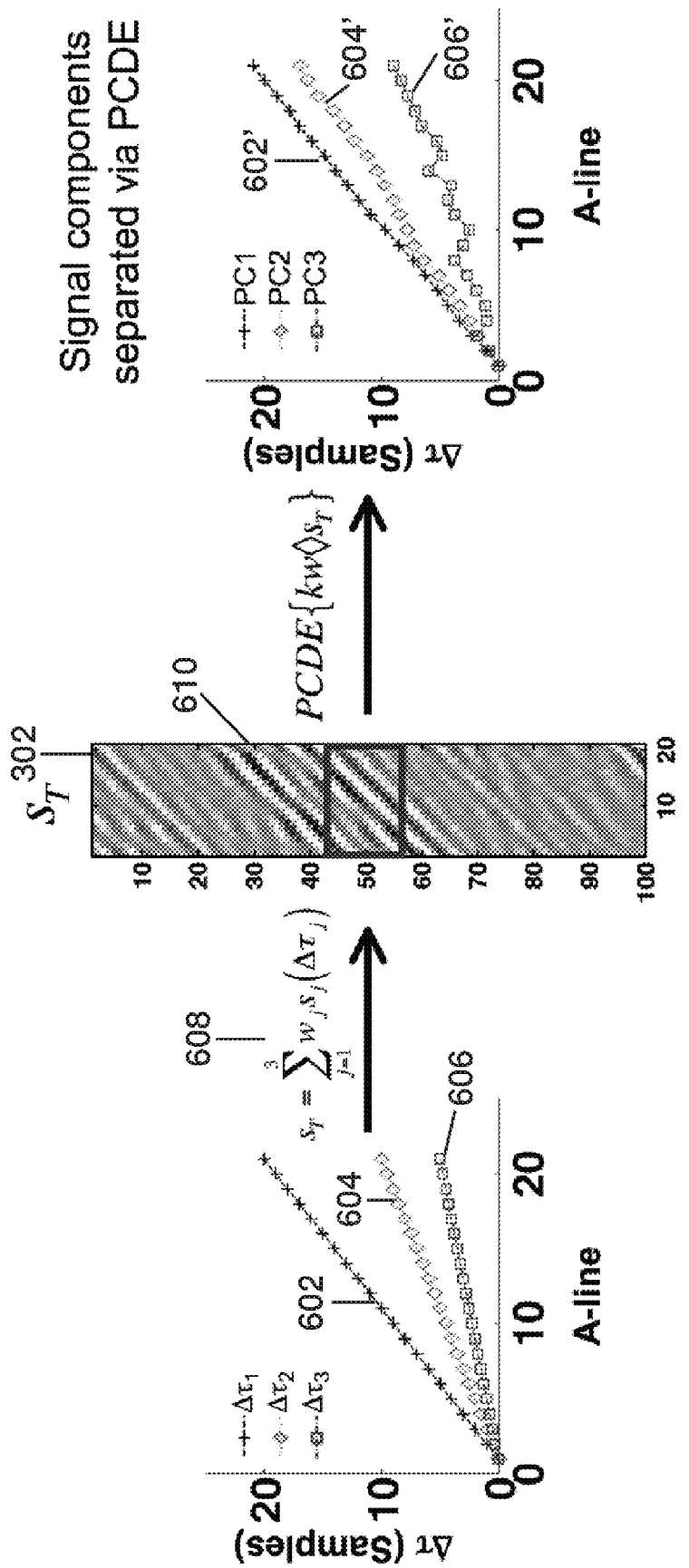
FIG. 6 schematically illustrates the signal separation capabilities of PCDE when operating on an ensemble of echo data, according to an embodiment of the present invention.

FIG. 6 schematically illustrates the signal separation capabilities of PCDE when operating on an ensemble of echo data. Three source signals 602, 604 and 606 with variable delay characteristics were weighted and summed 608 to form a simulated ensemble of echo data $S_T$ 302, to model decorrelation arising from differential motion across the point spread function (PSF) of the acoustic beam of an ultrasound system. The resulting ensemble of echo data 302 was processed as described above with regard to FIG. 5, where for each iteration of depth, a portion of the echo data defined by kernel window 610 is processed, and where window 610 is centered at different depths (dimension in the vertical direction of FIG. 6, wherein centering a particular depth "windows" a subset of the data as outlined by the window 610, and windowing is performed by iteratively centering the window at each of the predefined depths and processing at each window location), which depths are predefined by the user.

The echo data windowed by the kernel window length is designated by kw $\diamond$ $s_T$ and is shown as the data within rectangle 610 in FIG. 6. In FIG. 6, PCDE processing that was performed on the windowed echo data is shown as the separation of signal components, provided as 602', 604' and 606', and which illustrate the delay characteristics of the first three principal components (PCs). As noted, when using PCDE, only the first principal component, PC1 602' is typically calculated for use in motion estimation.

Systems

Figure 7:
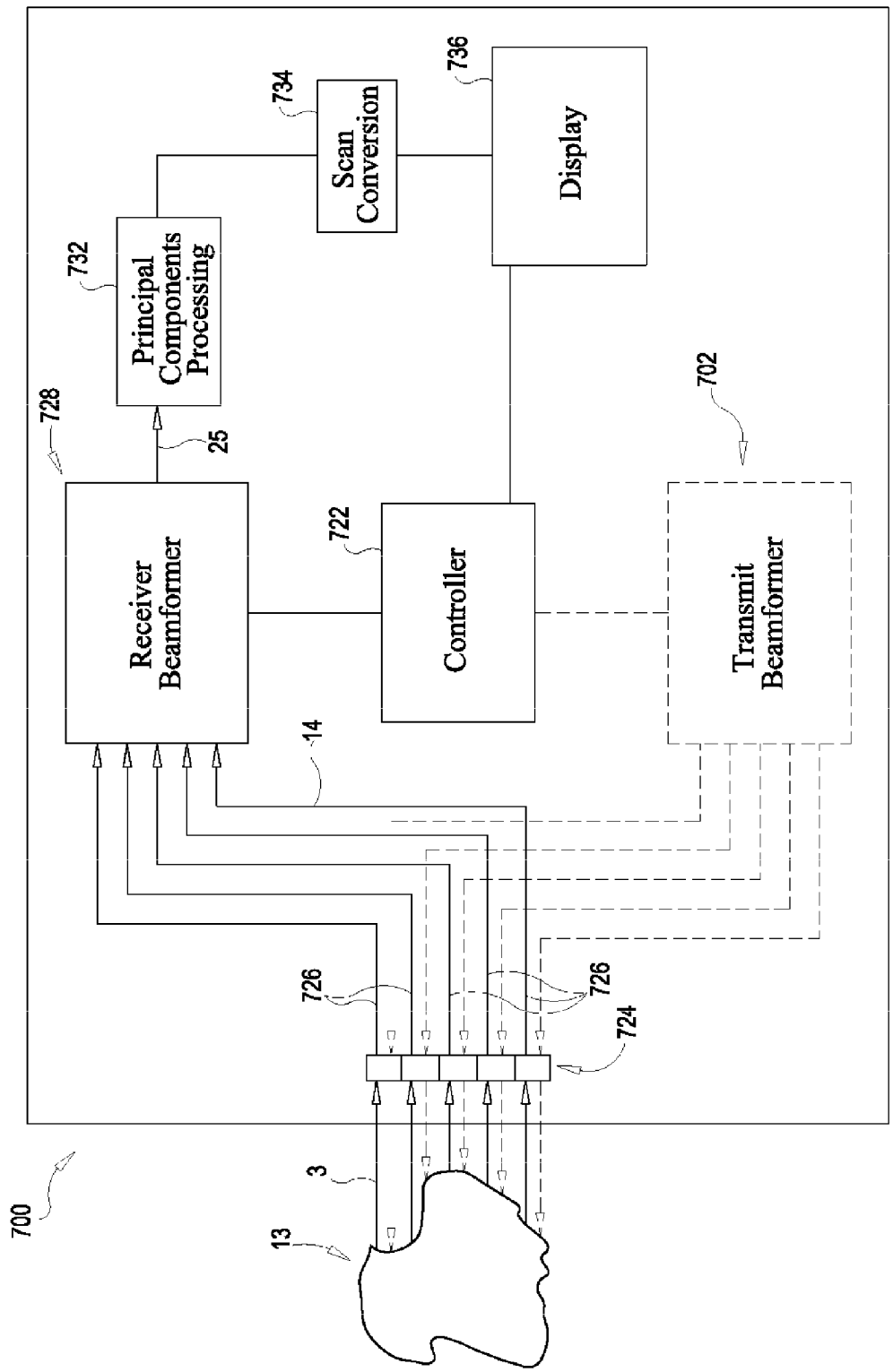
FIG. 7 is a basic, schematic representation of an ultrasound system 700 according to one embodiment of the present invention.

FIG. 7 is a basic, schematic representation of an ultrasound system 700 according to one embodiment of the present invention that is referred to in order to generally describe the operations of an ultrasound system to produce an image of an object 13. System 700 may optionally include a transmit beamformer 702 which may include input thereto by controller 722 to send electrical instructions to array 724 as to the specifics of the ultrasonic waves to be emitted by array 724. Alternatively, system 700 may be a receive only system and the emitted waves may be directed to the object 13 from an external source.

In either case, echoes 3 reflected by the object 13 (and surrounding environment) are received by array 724 and converted to electrical (e.g., radio frequency (RF)) signals 726 that are input to receive beamformer 728. Controller 722 may be external of the beamformer 728, as shown, or integrated therewith. Controller 722 automatically and dynamically changes the distances at which scan lines are performed (when a transmit beamformer 702 is included) and automatically and dynamically controls the receive beamformer 728 to receive signal data for scan lines at predetermined distances. Distance/depth is typically calculated assuming a constant speed of sound in tissue (i.e. 1540 m/s) and then time of flight is recorded such that the returning echoes have a known origination. The summed RF lines output by the receive beamformer 728 are input to a principal components processing module 732, which may be separate from and controlled by, or incorporated in controller 722. Principal components module 732 processes A-lines as an RF ensemble 302 using PCF or optionally PCDE. In at least one embodiment, the window length of the window 610 used to separate signal components using PCDE may be selected by a user through controller 722. Other user selectable parameters include, but are not limited to: how many PCs to retain or reject (although the default is to automatically calculate and use only the first PC), which PCs to retain or reject (although, again, the default is to automatically calculate and use only the first PC), the total number of depths at which to process, the distances of the depths at which to process, percent overlap between adjacent kernel windows during the "windowing" process, and/or number of A-lines to include in an input matrix (i.e., choose the positive integer value for the N dimension of matrices Q and X.

The assembled output 320 of PCDE and/or PCF processing are input into a scan converter module 734. The scan converter 734 processes data output from module 732 from multiple depths, A-lines, and/or ensembles to determine the data to be output at each image pixel. The image formed within the scan converter 734 is displayed on display 736. Although FIG. 7 has been described as an ultrasound system, it is noted that transducers 724 may alternatively be transducers for converting electrical energy to forms of energy other than ultrasound and vice versa, including, but not limited to radio waves (e.g., where system 700 is configured for RADAR), visible light, infrared, ultraviolet, and/or other forms of sonic energy waves, including, but not limited to SONAR, or some other arbitrary signal of arbitrary dimensions greater than one (such as, for example, a signal that is emitted by a target).

Figure 8A:
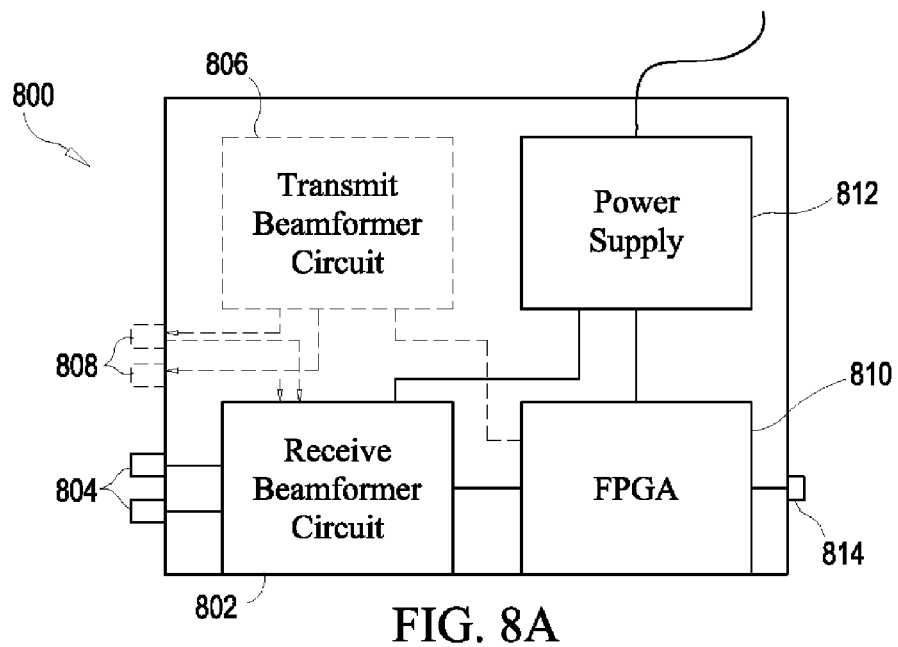
FIG. 8A schematically illustrates a beamforming instrument useable in at least one embodiment according to the present invention.

FIG. 8A schematically illustrates a beamforming instrument 800 that is provided independently of the transducers used to transmit waves and receive echoes, and which is also connectable to an external component used to perform the PCF/PCDE and to output the filtered results. Alternatively, FPGA can be programmed to perform the PCF/PCDE at the location of the instrument 800.

Instrument 800 includes a receive beamformer circuit 802 configured to receive RF signals from an external source and process them in the manner described above with regard to beamformer 728. Instrument 800 includes one or more receive channels 804 (two receive channels 804 are shown in the embodiment of FIG. 8A) through which RF signals are inputted to receive beamformer circuit 802.

Optionally instrument 800 may include a transmit beamformer circuit 806 configured to transmit RF signals to an external transducer for conversion to energy waves to be transmitted to a target. In cases where a transmit beamformer circuit 806 is provided, one or more transmit channels 808 or transmit/receive channels 808 (two transmit/receive channels 808 are shown in the embodiment of FIG. 8A) may be provided, through which RF signals can be outputted to a transducer. When transmit/receive channels 808 are provided, these channels are useable for both inputting and/or outputting RF signals.

Instrument 800 is further provided with a field programmable gate array (FPGA) board 810 to control timing and data transfer to and from the instrument 800. A power supply 812 is also provided to which electricity can be inputted to generate power to run the other components of the instrument 800. Instrument 800 further includes one or more output channels 814 to output an RF ensemble of echo data (e.g., "real RF matrix Q") for further processing.

Figure 8B:
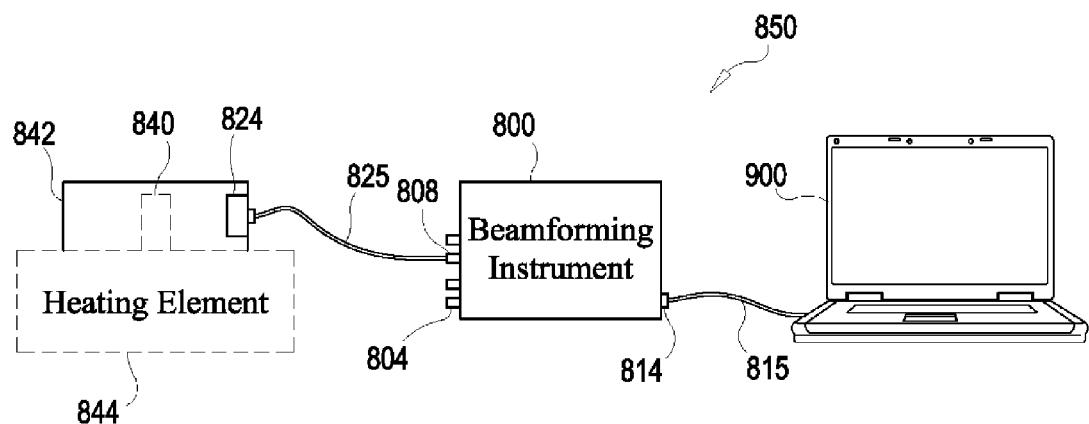
FIG. 8B is a schematic illustration of the instrument of FIG. 8A used in an ultrasound system according to an embodiment of the present invention.

FIG. 8B is a schematic illustration of the instrument 800 of FIG. 8A used in an ultrasound system 850 according to an embodiment of the present invention. In this system, beamforming instrument is in communication with transducer 824, via wire connection 825 connecting transducer 824 to one of transmit/receive channels 808. A sample is receivable in sample receptacle 840 (e.g., a cuvette, vial, or the like) which can be mounted in a sample holder box 842. Transducer 824 may also be mounted through sample holder box 842, as in the example shown in FIG. 8B to ensure that the transducer and sample remain aligned throughout the course of measurement/image taking. Optionally, sample holder box 842 may be mounted on an heating element 844 useable to control the temperature of the sample in the sample receptacle 840 during the course of measurement/image taking.

Instrument 800 is also connected to a computer 900, such as the laptop computer 900 shown in FIG. 8B, or any other type of computing system that includes at least one processor, memory, and input/output devices and is configurable for performing PCF and PCDE. In the example shown, the output channel 814 of instrument 800 is electrically connected to computer 900 via a USB cable. However, other types of electrical connectors may be substituted. System 850 may be used to perform sonorheometry, where the sample in sample receptacle 840 is blood. Alternatively, transducer 824 need not be mounted in box 842 but may be hand manipulated for use in vivo, such as for Doppler motion detection of blood, or other applications, including, but not limited to: physiological motion estimation of various tissues and organs in vivo, such as heart contractions; estimation of acoustic radiation force-induced displacements, as may be used to reconstruct mechanical properties of tissue in shear wave elasticity imaging (SWEI) or acoustic radiation force impulse imaging (ARFI); estimation of strains induced by free-hand palpation of tissue with the transducer as performed in elastography imaging; identification of targets or at least one portion of targets that are/is not moving and providing an image of the same; or separating moving portions of a target from non-moving portions of the target and providing images of at least one of the moving and non-moving portions.

Further alternatively, although FIG. 8B has been described as an ultrasound system, it is noted that transducer 824 may alternatively be a transducer for converting electrical energy to forms of energy other than ultrasound and vice versa, including, but not limited to radio waves (e.g., where system 850 is configured for RADAR), visible light waves, infrared rays and/or ultraviolet rays, and other forms of sonic energy waves, including, but not limited to SONAR.

Figure 9:
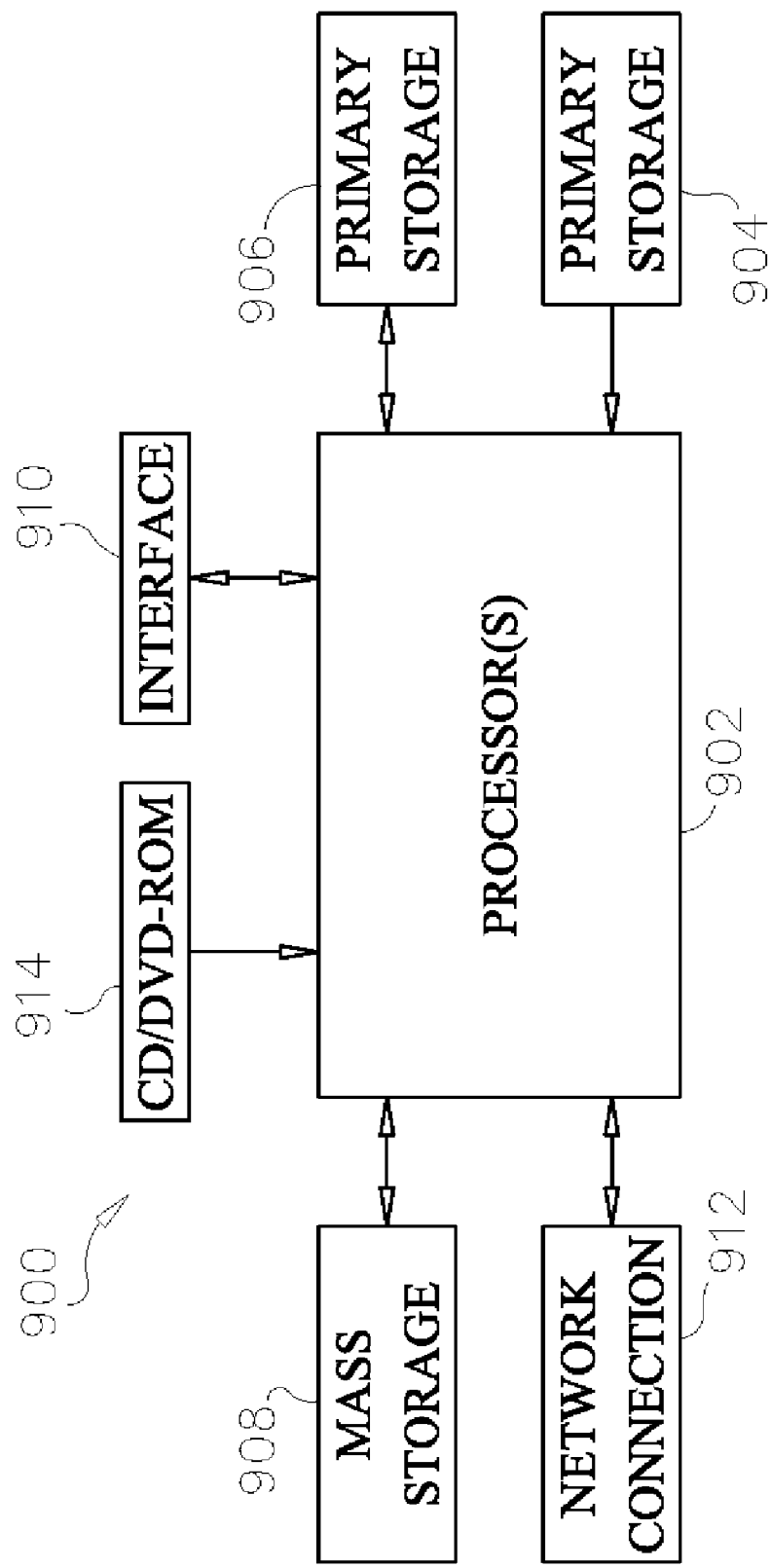
FIG. 9 illustrates a typical computer system, all or a portion of which may be incorporated into a system according to an embodiment of the present invention.

FIG. 9 illustrates a typical computer system, all or a portion of which may be incorporated into a system according to an embodiment of the present invention. The computer system 900 includes any number of processors 902 (also referred to as central processing units, or CPUs) that are coupled to storage devices including primary storage 906 (typically a random access memory, or RAM), primary storage 904 (typically a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable computer-readable storage media such as those described above. A mass storage device 908 is also coupled bi-directionally to CPU 902 and provides additional data storage capacity and may include any of the computer-readable media described above. It is noted here that the terms "computer readable media" "computer readable storage medium" "computer readable medium" and "computer readable storage media", as used herein, do not include carrier waves or other forms of energy, per se, Mass storage device 908 may be used to store programs, data and the like and is typically a secondary storage medium such as a hard disk that is slower than primary storage. It will be appreciated that the information retained within the mass storage device 908, may, in appropriate cases, be incorporated in standard fashion as part of primary storage 906 as virtual memory. A specific mass storage device such as a CD-ROM or DVD-ROM 914 may also pass data uni-directionally to the CPU.

CPU 902 is also coupled to an interface 910, which may include one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. CPU 902 optionally may be coupled to a computer or telecommunications network using a network connection as shown generally at 912. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, instructions for performing PCF as described, instructions for performing PCDE as described, instructions for envelope detection and instructions for displaying a B-mode image, and/or other instructions and/or algorithms, etc. may be stored on mass storage device 908 or 914 and executed on CPU 902 in conjunction with primary memory 906.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Simulation Methods—PCF

To assess the performance of the PCA filtering technique (PCF), broadband ultrasound signals were simulated with varied SNR, delay, TDE window length, and PCF window length. Synthetic ensemble data 302 was constructed by summing a desirable, peak delay signal with two undesirable, lower energy signals that mimicked a range of displacements across the acoustic beam. These simulations were analyzed to determine the ability of complex PCF to separate the desired, peak displacement signal from the undesirable and decorrelating signals present in the lateral regions of the tracking beam. An illustration of the physical basis for the decorrelation model is shown in FIG. 1.

TDE was applied to simulated data that had undergone bandpass filtering, PCF, or both. TDE performance was analyzed in terms of signal correlation, root mean square (RMS) error between the estimated and true delay profile, and standard deviation. In performing PCF, only the first PC was retained. This PC corresponded to a matrix W, with dimensions N×1, as shown in filtering equations (9) and (10) above. The dimension N corresponds to slow time or the number of transmissions in the ensemble. Furthermore, PCF operated on complex echo data in all instances via the Hilbert transform. Because the amount of echo shift is retained in phase information, it was preferable for PCF to operate on complex data, which contains phase information, rather than the real component of the echo data.

Unless otherwise noted, simulations used the default values summarized in Table 1 below.

TABLE 1

| Parameter | Value |
| --- | --- |
| Center frequency ($f_0$) | 10 MHz |
| Sampling frequency ($f_s$) | 65 MHz |
| Signal-to-Noise Ratio (SNR) | 20 dB |
| Fractional Bandwidth (BW) | 50% |
| TDE Kernel Length (T) | 1.5 $\lambda$ |
| PCF Kernel Length ($T_{PCF}$) | 10 $\lambda$ |
| Ensemble Length | 400 echo lines |
| Displacement | 3 samples |

The PCF kernel length $T_{PCF}$ represents a typical value suitable for the radiation force imaging application, sonorheometry. When PCF is applied to clinical RF echo data it is advantageous to use longer kernel lengths as long as the displacements within the kernel window are approximately stationary. Furthermore, while an ensemble length of 400 echo lines may not be appropriate for blood flow imaging, it is typical in the sonorheometry application. The SNR ratio reported in Table 1 reflects the ratio of signal to additive white Gaussian distributed noise.

Synthetic, broadband ultrasound signals were generated in MATLAB (MathWorks Inc., Natick, Mass.) by convolving Gaussian distributed white noise with a Gaussian weighted sinusoidal ultrasound pulse as given by:

$$psf(t) = e^{-\frac{t^2}{2\sigma}} \sin(2\pi f_0 t) \quad (14)$$

$$\sigma = \frac{0.42466}{B f_0} \quad (15)$$

where B is fractional bandwidth, $f_0$ is center frequency, and 0.42466 relates the full width at half the maximum value of a Gaussian to its standard deviation.

To model a sum of different target deformations across the acoustic beam, the default ensemble, $s_T$ (with dimensions [M×N]) was defined as the sum of three independent ensembles of echo data, each with different weighting coefficients and constant velocity:

$$s_T = w_1 s_1 + w_2 s_2 + w_3 s_3 \quad (16)$$

where w are weighting coefficients ($w_1 > w_2 > w_3$), and s represents independent M×N matrices ($s_1$, $s_2$, and $s_3$) of simulated ensemble data. The ensemble with the largest weighting coefficient also corresponded to the ensemble with the largest time delay so that if d is the peak delay for ensemble s then:

$$d_1 = 4 d_2 = 8 d_3 \quad (17)$$

Within this simulation framework, the goal of complex PCF was to reject random noise across all frequencies and also to reject the undesirable signals $S_2$ and $s_3$ while retaining the most energetically significant signal, $s_1$. By keeping only the most energetic signal (corresponding to the largest time delay), correlation of echo signals should have improved, and bias and standard deviation in TDE measurements should have been reduced. Simulations were also performed where $s_1$ corresponded to the signal with the lowest velocity rather than the highest. Another set of simulations was performed with exponential rather than linear velocity, five signal components rather than three, and more narrow velocity separation between components.

Figure 10:
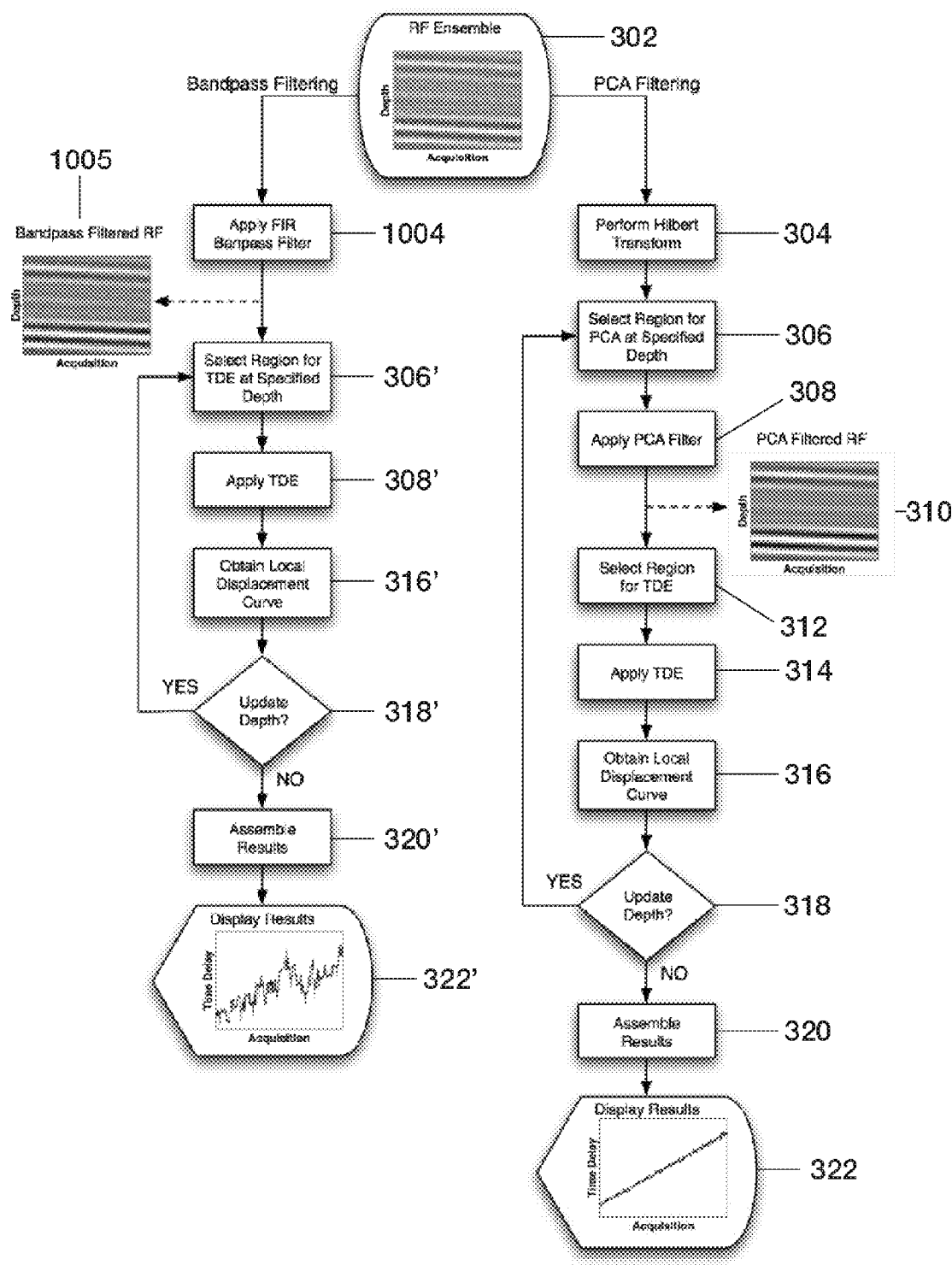
FIG. 10 is a flowchart schematically illustrating events of two different processing approaches, one approach being according to the present invention.

Time delay estimation was performed on ensembles of simulated echo data after either frequency-based or regression filtering. A schematic of the different processing approaches is illustrated in FIG. 10, where the complex PCF method of the present invention is illustrated along the right column of the figure and is the same as that described above with regard to FIG. 3. The bandpass filtering method is represented in the left column and the complex PCF method is represented in the right column.

In the case of the complex PCF approach, echo data was processed as described previously with regard to FIG. 3. The echo data was processed to generate a complex representation via the Hilbert transform (event 304). Next, the complex data was windowed over a pre-defined PCF kernel length, and then filtered in the acquisition time or 'slow time' dimension. In this way, the resulting PCs represented echo delays across the length of the ensemble. Only the first PC was retained, so that matrix W was a vector of the first PC and filtering was performed as described above with regard to equations (9) and (10). Time delays were estimated from the real part of the reduced rank output of the complex PC filter. In all simulation instances, the FIR bandpass filter used for bandpass filtering (event 1004) for the comparative TDE process was 50 taps and had a center frequency of 10 MHz with a fractional bandwidth of 50 percent. The bandpass filtering process produces a bandpass filtered RF ensemble at event 1005 of time domain data. Events 306', 308', 316', 318', 320' and 322' are similar to events 306, 308, 316, 318, 320 and 322, except that that are performed on the bandpass filtered RF ensemble rather than the PC filtered RF ensemble. For further details about FIR filtering, see application Ser. No. 12/371,911 filed on Feb. 16, 2009 and titled "Imaging or Communications System Utilizing Multisample Apodization and Method". application Ser. No. 12/371,911 is hereby incorporated herein, in its entirety, by reference thereto.

The spline-based time delay estimation (TDE) algorithm described by Viola et al., "A spline-based algorithm for continuous time-delay estimation using sampled data", IEEE Trans Ultrason Ferroelect Freq Contr 2005; 52(1):80-93, was used to estimate time delays. The delay profiles through ensemble length were formed using two different variations: N to 1 delay estimation and N to N−1 delay estimation. A delay profile is defined as a vector representing the cumulative time delay across ensemble length. The N to 1 delay technique determined the Nth time delay, $\Delta \hat{t}_N$ by estimating the delay between the first, reference signal, $e_1$ of the ensemble and the Nth shifted signal, $e_N$:

$$\Delta \hat{t}_N = \text{splineTDE}(e_N, e_1) \quad (18)$$

Conversely, the N to N−1 delay technique computed the Nth time delay as the addition of the delay between signal N−1 and the Nth shifted signal and the previously computed N−1 delay, $\Delta \hat{t}_{N-1}$:

$$\Delta \hat{t}_N = \text{splineTDE}(e_N, e_{N-1}) + \Delta \hat{t}_{N-1}. \quad (19)$$

$$\Delta \hat{t}_1 = 0 \quad (20)$$

Since the N and N−1 echoes are consistently spaced in time (assuming constant PRF) and generally exhibit small relative shifts, the N to N−1 delay profile technique has the advantage of lower and more constant decorrelation across the ensemble. In contrast, the N to 1 method will tend to have increased decorrelation as the time between the first and Nth echo grows. The improved correlation of the N to N−1 method is offset by an accumulation of error. This accumulation of error is illustrated in equations (19) and (20) where the Nth delay is dependent on the previous N−1 delay. In contrast, the N to 1 method from equation (17) exhibits no dependence on previous delay values. Another important difference between the N to N−1 and N to 1 methods is their associated computational load. Whereas the N to 1 delay profile method only requires one spline operation per delay profile, the N to N−1 method requires N−1 transformations of the discretely sampled echo signals to continuous, spline representations.

Under a given set of simulation conditions, performance statistics were computed over 1000 trials. The RMS error over a single estimated delay profile was computed as:

$$RMS(\Delta \hat{t}) = \sqrt{\frac{\sum_{j=1}^{N} |\Delta \hat{t}_j - \Delta t_j|^2}{N}} \quad (21)$$

where $\Delta t$ and $\Delta \hat{t}$ are the true and estimated time delays respectively and N is the ensemble length.

The default simulation values, which are listed in Table 1 above, included a 10 MHz center frequency, 65 MHz sampling frequency, 20 dB SNR, with 50 percent fractional bandwidth, 1.5 period TDE kernel window length, 10 period PC kernel window length, an ensemble length of 400 A-lines, and maximum delay per ensemble length of 3 samples.

Figure 11A:
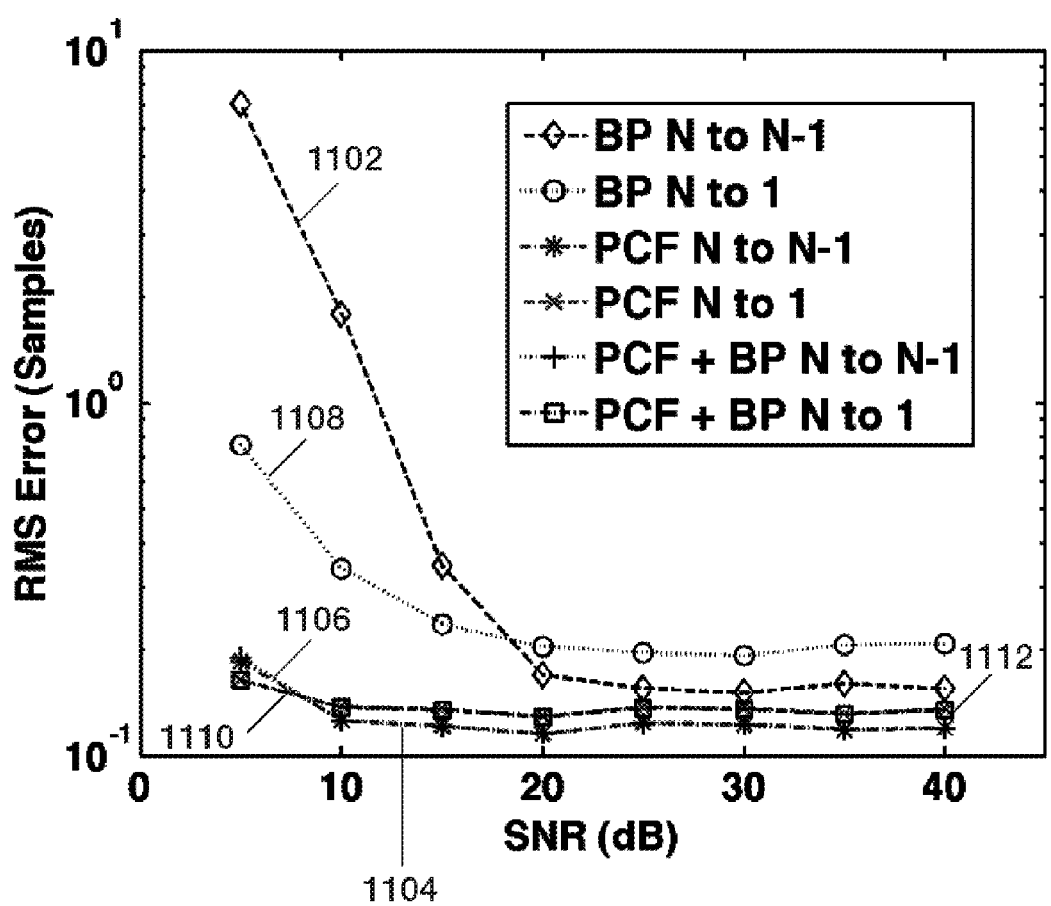
FIGS. 11A-11C show RMS error results (FIG. 11A), standard deviation at acquisition 400 (FIG. 11B), and the average decorrelation between consecutive echoes (average N to N−1 decorrelation) (FIG. 11C) when SNR was varied and all other simulation parameters were held constant.
Figure 11B:
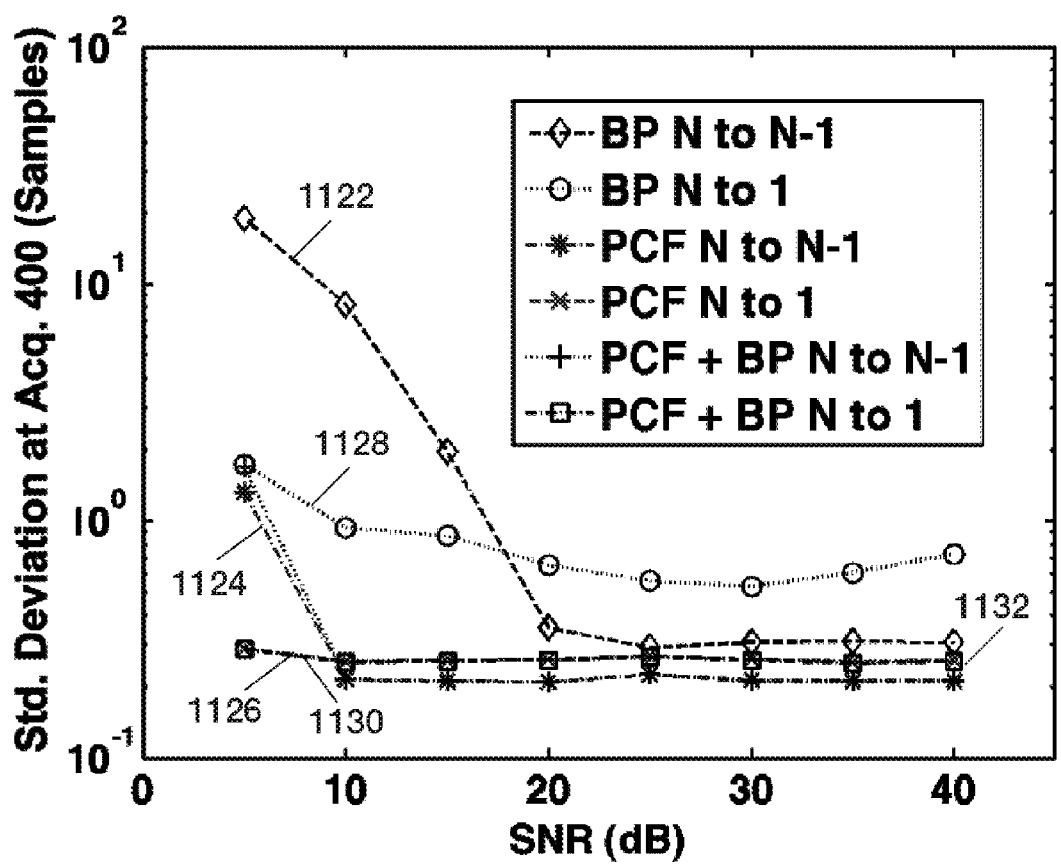
Figure 11C:
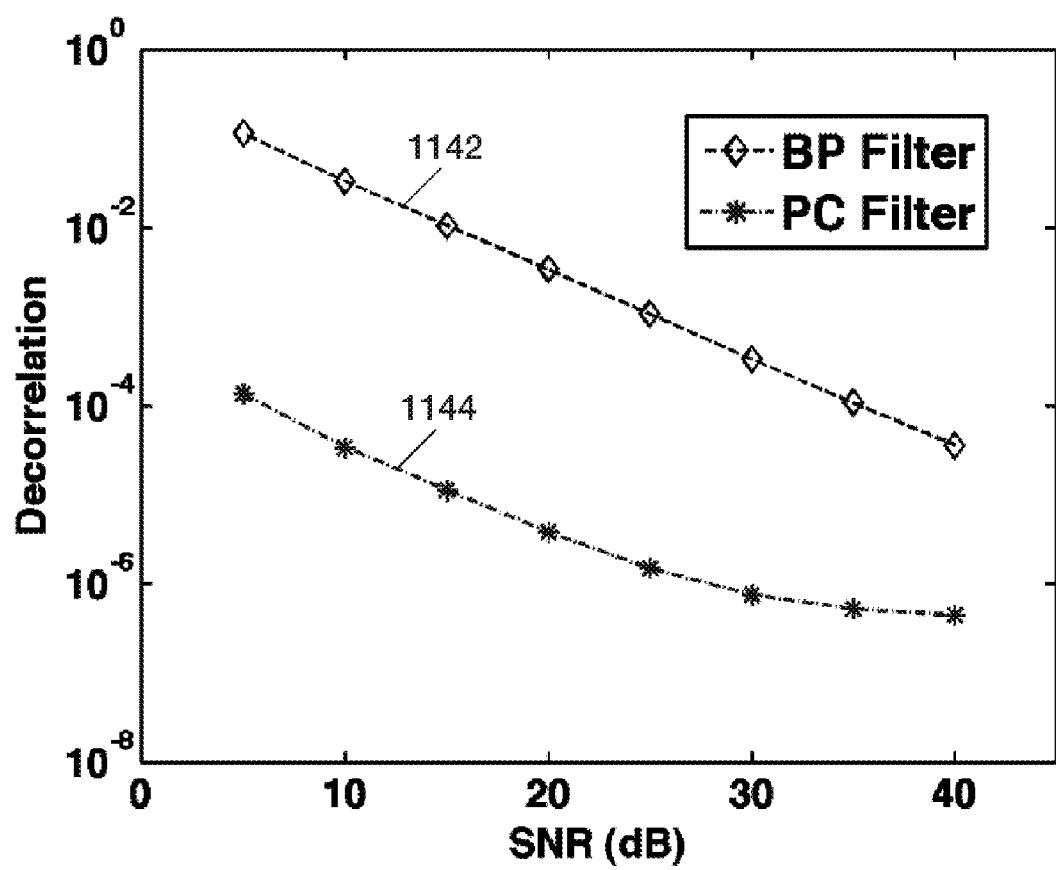

Results in FIGS. 11A-11C show RMS error (FIG. 11A), standard deviation at acquisition 400 (FIG. 11B), and the average decorrelation between consecutive echoes (average N to N−1 decorrelation) (FIG. 11C) when SNR was varied and all other simulation parameters were held constant. Results are illustrated for bandpass 1102, 1122, respectively, complex PCF 1104, 1124, respectively, and bandpass with complex PCF 1106, 1126, respectively, methods which were used in conjunction the N to N−1 method, and bandpass 1108, 1128, respectively, complex PCF 1110, 1130, respectively, and bandpass with complex PCF 1112, 1132, respectively, methods which were used in conjunction the N to 1 method for delay profile estimation. By reviewing FIGS. 11A and 11B, it is apparent that there was a negligible difference between bandpass and PCF combined methods 1106,1126 and 1112,1132 compared to the PCF methods that did not use the bandpass filtering 1104,1124 and 1110,1130. Therefore, it was determined that the combined methods using complex PCF with bandpass filtering were not needed for the subsequent examples performed, as described below.

In FIG. 11B, the average standard deviation was calculated for the 400$^{th}$ time delay estimate. As Table 1 indicates, the peak time delay for the simulated ensemble was 3 samples and therefore, FIG. 11B represents the standard deviation for spline TDE at a shift of 3 samples. FIG. 11C shows average decorrelation results between consecutive echoes (average N to N−1 decorrelation) relative to variation in SNR for the bandpass filtering examples 1142 and for the PCF filtering examples 1144.

The objective or these simulations was to assess which signal separation technique, frequency-based bandpass filtering or regression-based complex PCF, provide the best means for reducing the decorrelation and noise constraints on TDE performance. In FIGS. 11A-11C, the effects of PCF for reduced echo decorrelation and noise were examined against the alternative frequency-based filtering approach for varied levels of additive noise. The first apparent trend in the data was that PCF with bandpass filtering provided no additional benefit over PCF alone. From these results, it was concluded that the combined approach provided no additional benefit, and thus, it was omitted from later simulation comparisons. The next apparent trend was that for SNR values between 5 dB and 40 dB, the PCF technique resulted in TDE estimates with lower bias, as reflected in RMS error values in FIG. 11A, as well as lower TDE standard deviation, as reflected in FIG. 11B. This trend was independent of whether the N to 1 or N to N−1 delay profile estimation technique was utilized. An explanation for this trend may be found in the N to N−1 decorrelation values, which are shown in FIG. 11C. With higher correlation between successive echo signals, equation (1) predicts that the PCF method would exhibit a lower standard deviation in delay estimates, which was verified in FIG. 11B. Further, with the lower RMS error seen in FIG. 11A, it may be concluded that complex PCF is more efficacious at rejecting random noise along with undesirable signal components $s_2$ and $s_3$ than the bandpass filtering technique across a range of 5 dB to 40 dB SNR. It is also apparent from FIGS. 11A-11B that the relative improvement in TDE performance with complex PCF increased as SNR decreased.

Another apparent trend shown in FIGS. 11A-11B is that for either the bandpass or the PCF technique, there was a crossover point between which delay profile method exhibited a lower RMS error and standard deviation. When the bandpass filtering technique operated on the simulated RF, the N to N−1 delay profile method had lower standard deviation and RMS error at SNR values of at least 20 dB, but the N to 1 performed better at SNR values less than 20 dB. For complex PCF, this switch occurred between 5 dB and 10 dB SNR—10 dB lower than the bandpass instance. Due to error accumulation with the N to N−1 instance, the N to 1 technique was preferred under low SNR. The lower SNR value at which the N to 1 method becomes preferable in the complex PCF case illustrated that complex PCF rejected a larger amount of noise than bandpass filtering.

Figure 12A:
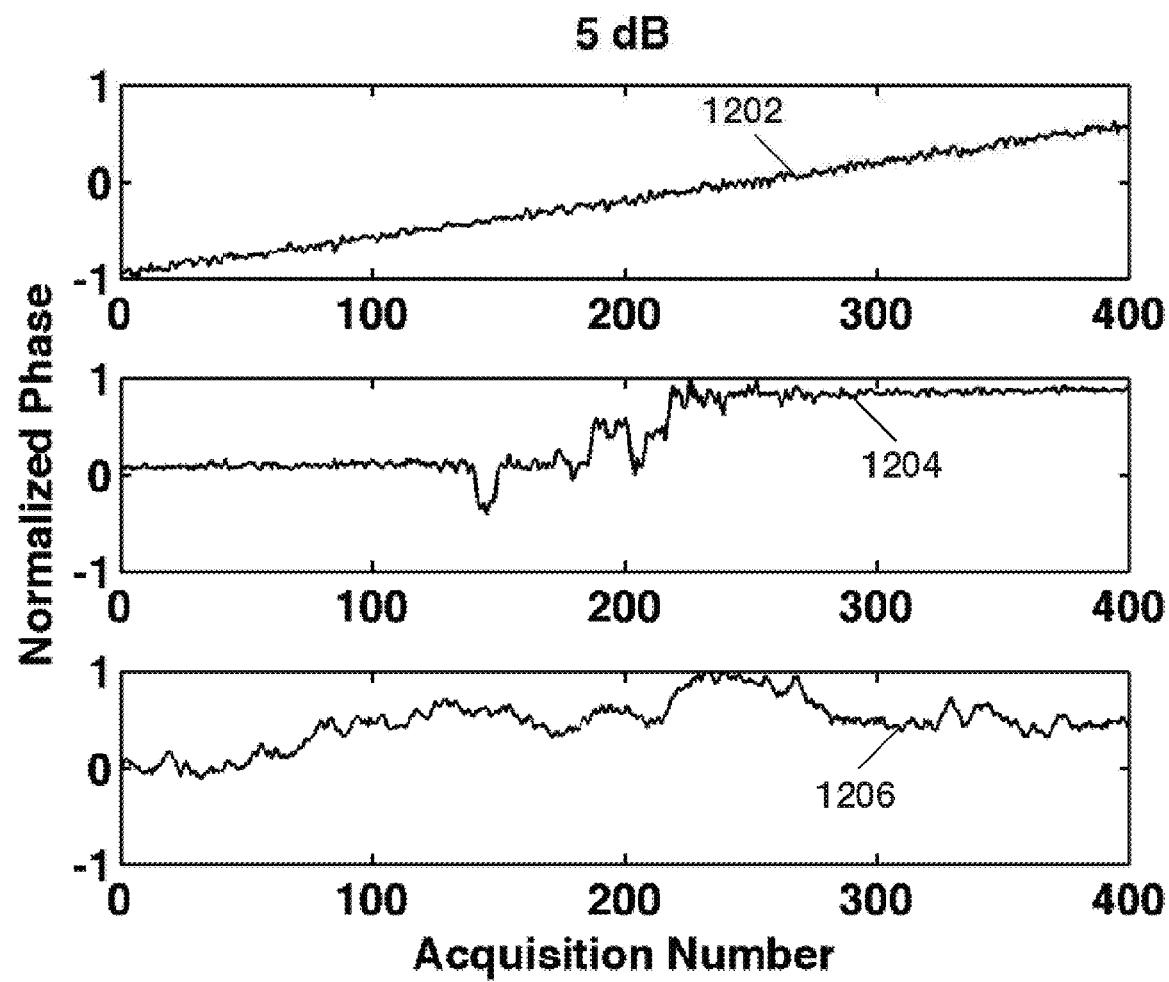
Figure 12D:
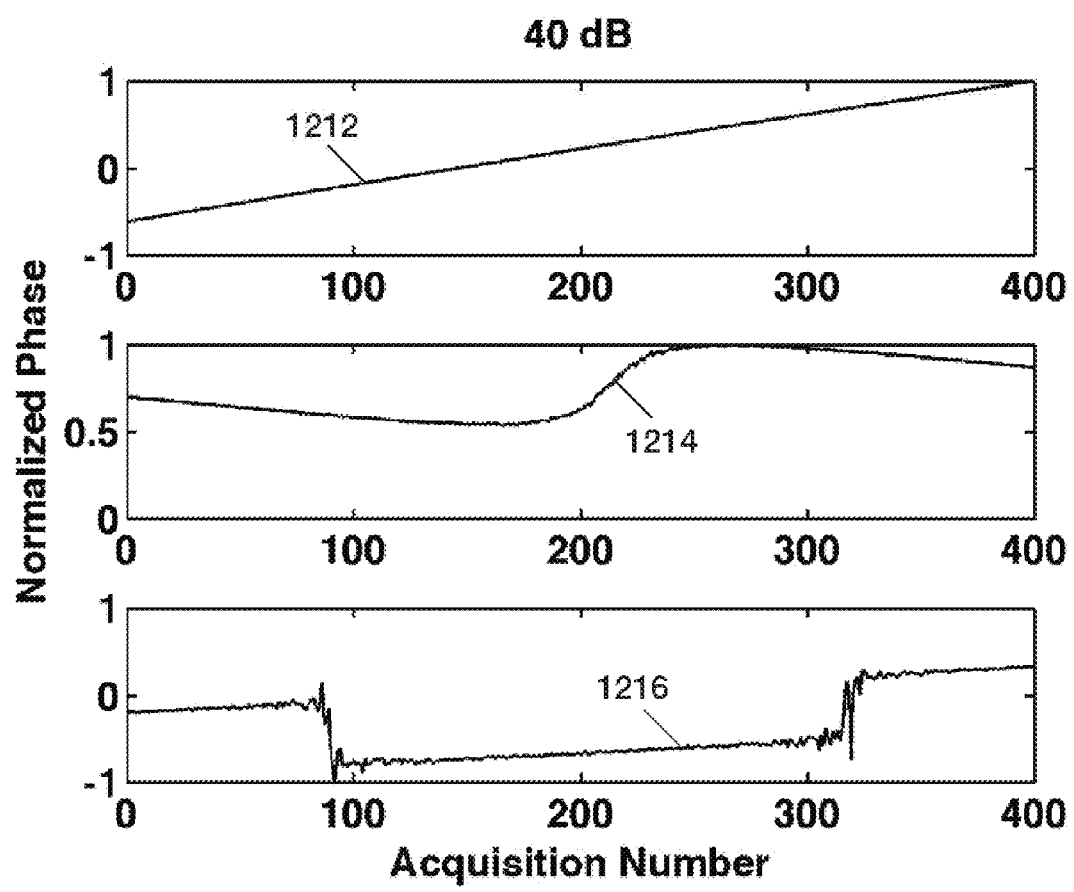
Figure 12E:
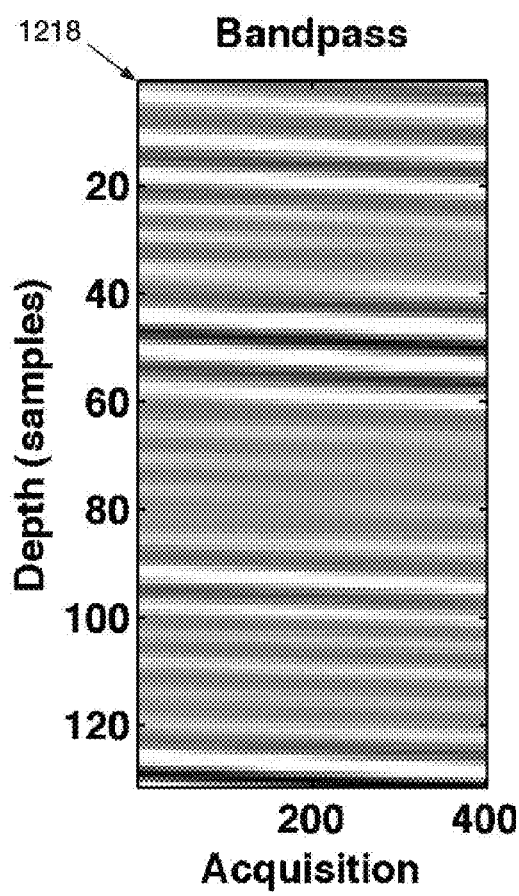
Figure 12F:
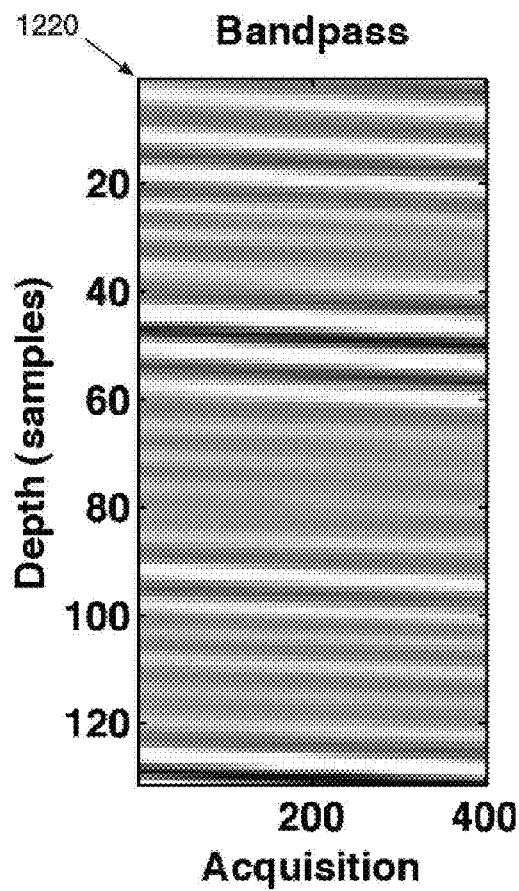

FIGS. 12A-12F show sample PCs and simulated RF from the variable SNR simulations. In FIG. 12A normalized PC phases for PCs 1 (1202), 2 (1204), and 3 (1206) are shown and corresponding simulated echo data 1208 and 1210 are illustrated in FIGS. 12B and 12C for a bandpass filtering example and a PCF filtering example, respectively, for an SNR of 5 dB. The simulated echo data is shown across the PC kernel window length of 10 periods or 130 samples for each of the 400 echo acquisitions. The simulated RF after a 50 tap bandpass filter is shown in FIG. 12B while simulated RF after complex PCF is displayed in FIG. 12C. Similarly, FIG. 12D shows the normalized PC phases 1212, 1214 and 1216 for the first, second and third PCs, respectively, along with simulated RF over a 130 sample range at 40 dB SNR for a 50 tap bandpass filter (see 1218, FIG. 12E) and for complex PCF (see 1220, FIG. 12F).

For both SNR values it is clear that the first PC (1202, 1212, respectively), which was the only PC retained for filtering, was also the only PC that represented the desired signal component of constant velocity across the ensemble. The second and third PCs (1204, 1206 and 1214, 1216, respectively), which were orthonormal to PC 1, represented noise and energy from the undesired and decorrelating signal components. As reflected in FIGS. 11A, 11B, 12B, 12C, 12E and 12F, the difference between the RF data after a bandpass filter and PCF filter was more visible at lower SNR values.

Figure 13A:
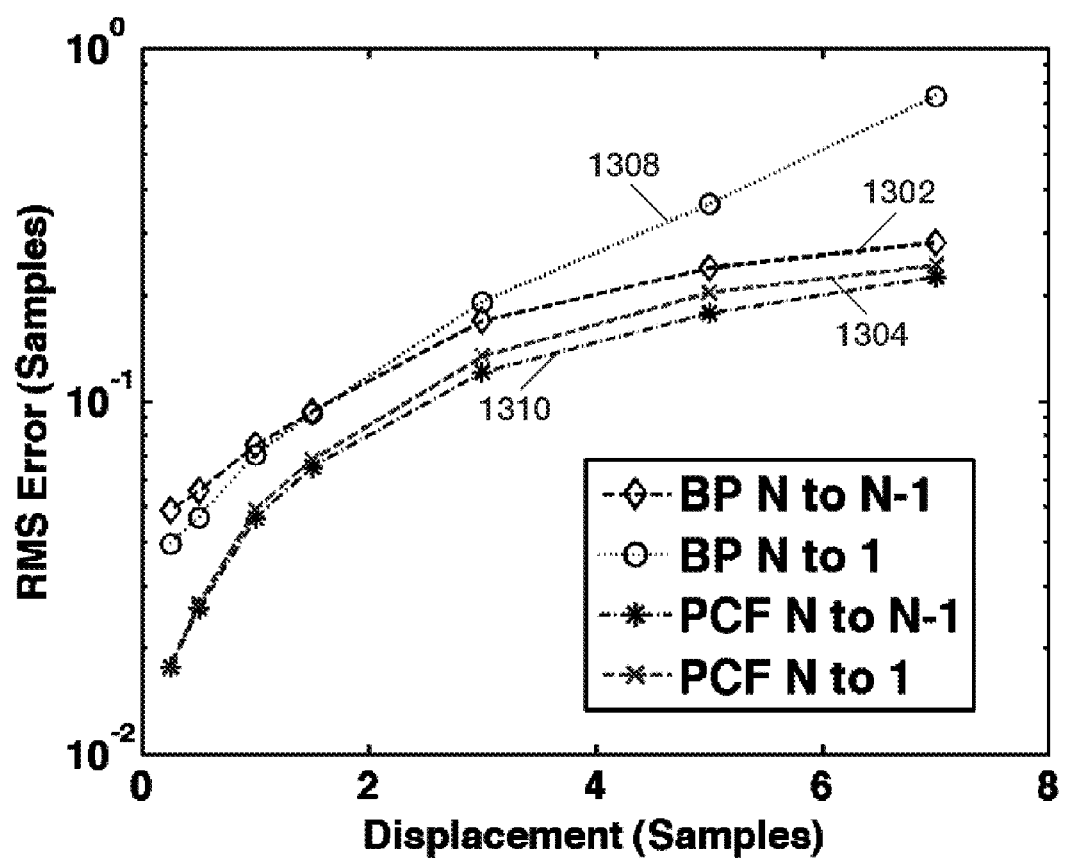
FIGS. 13A-13C display simulation results obtained over 1000 trials when maximum displacement over the ensemble was variable and all other simulation parameters were held constant.
Figure 13B:
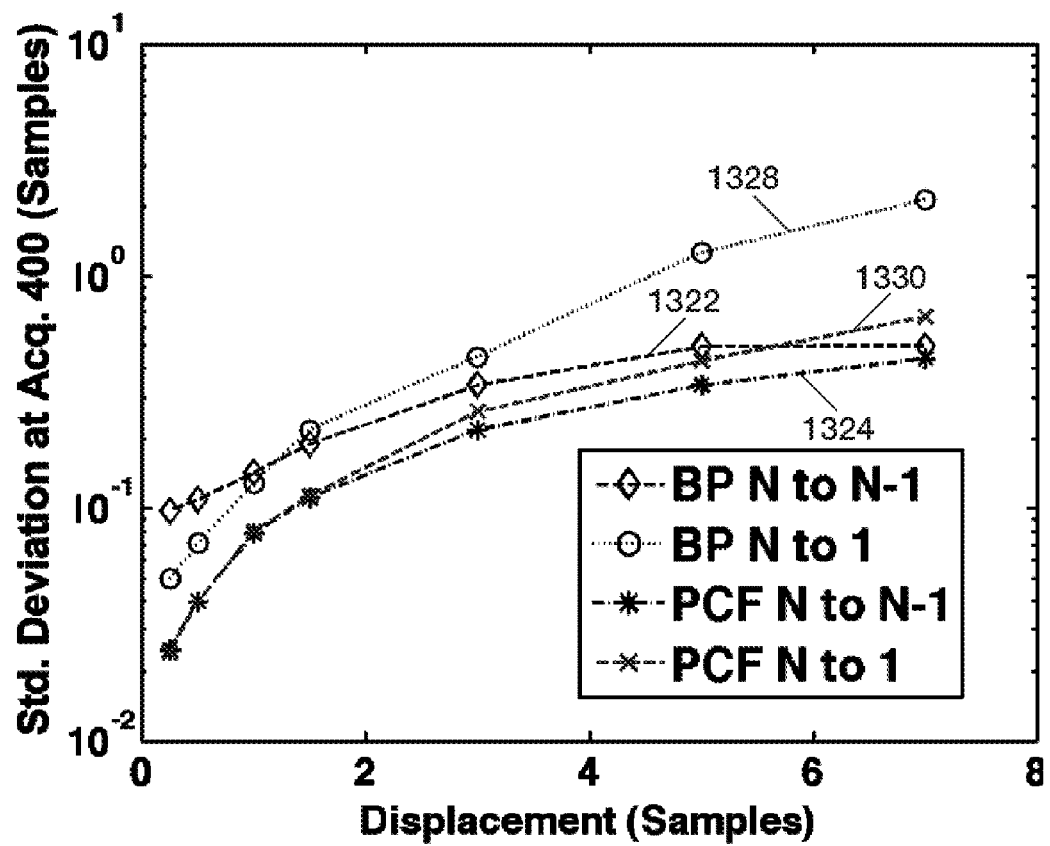
Figure 13C:
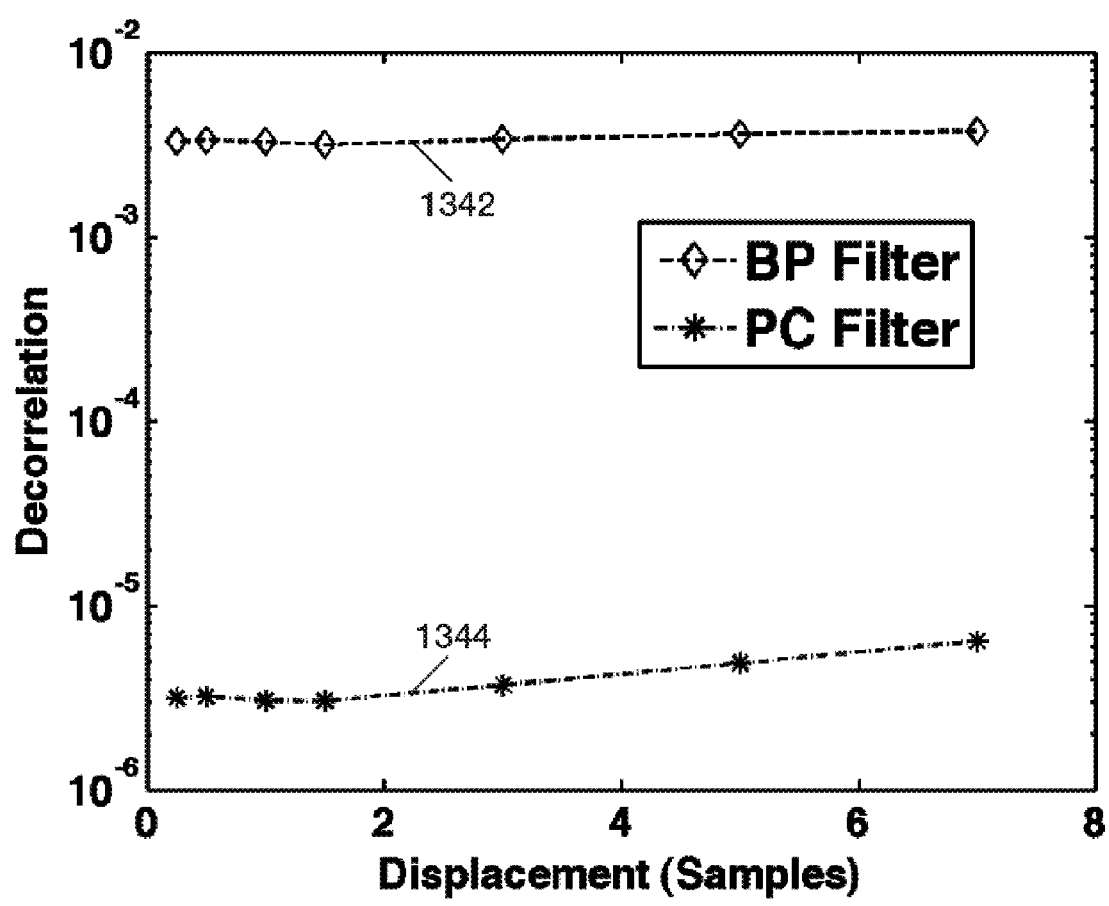

FIGS. 13A-13C display simulation results obtained over 1000 trials when maximum displacement over the ensemble was variable and all other simulation parameters were held constant. RMS error (FIG. 13A), standard deviation at acquisition 400 (FIG. 13B), and the average decorrelation between consecutive echoes (average N to N−1 decorrelation) (FIG. 13C) are shown, Results shown in FIG. 13A are for bandpass 1302 and complex PCF 1304, each used in conjunction the N to N−1 method; and bandpass 1308, and complex PCF 1310, each used in conjunction with the N to 1 method for delay profile estimation. Results shown in FIG. 13B are for bandpass 1322 and complex PCF 1324, each used in conjunction with the N to N−1 method; and bandpass 1328, and complex PCF 1330, respectively, each used in conjunction with the N to 1 method for delay profile estimation. FIG. 13C shows average decorrelation between consecutive echoes (average N to N−1 decorrelation) for the bandpass filter method 1342 and the complex PCF method 1344, respectively. The maximum displacement per ensemble was varied between 0.25 and 7 samples.

By varying the slope of delay across the ensemble, simulations were performed to examine the impact of delay magnitude on the PCF technique, and results are shown in FIG. 5. There are two dominant trends present in the data. First, given the same delay profile estimation technique, either N to N−1 or N to 1, the RMS error, standard deviation, and decorrelation was always lower for complex PCF. Second, for bandpass filtering, there was a shift in optimal delay profile technique, where the N to 1 technique had lower RMS error and standard deviation at total shifts of less than 1.5 samples. Conversely, the N to N−1 method exhibited superior performance at total shifts of at least 1.5 samples. This trend, which is similar to what was observed in FIG. 3, can be explained by a larger amount of decorrelation across the ensemble with larger total shifts.

Figure 14A:
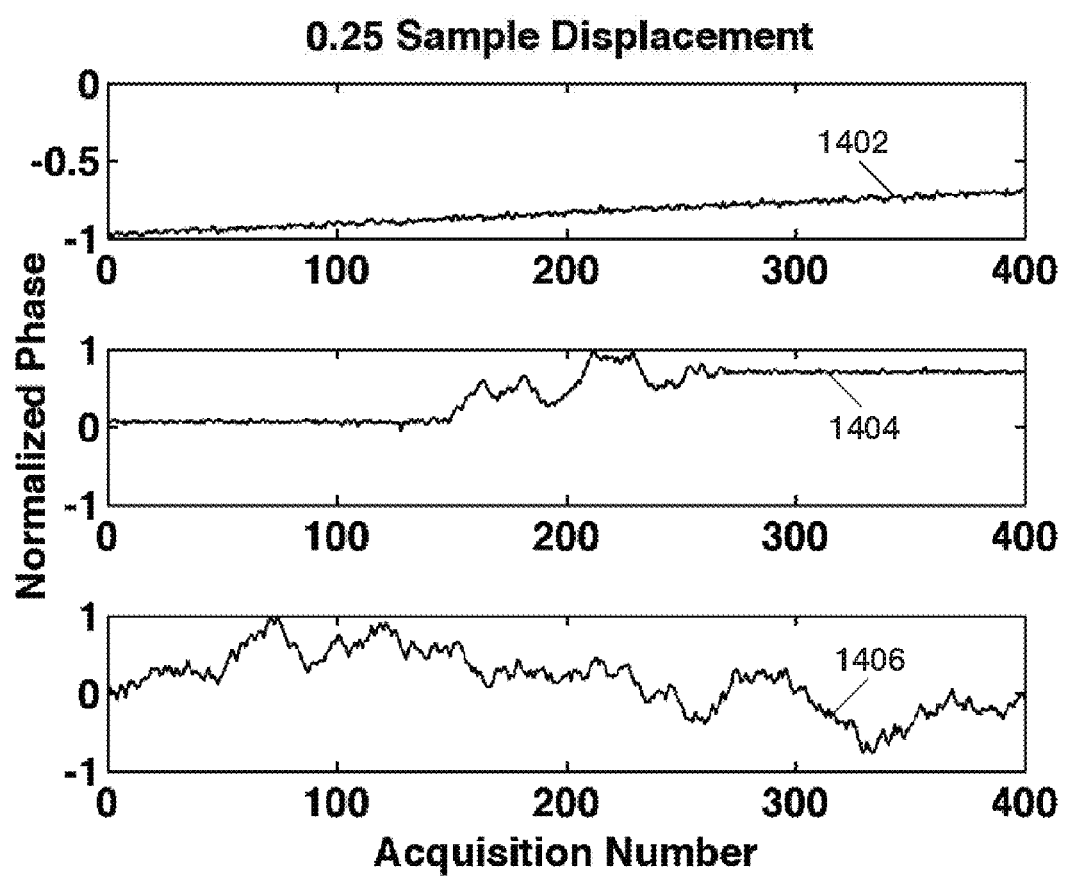
FIG. 14A shows results of the normalized phase of PCs using 0.25 maximum displacement.
Figure 14B:
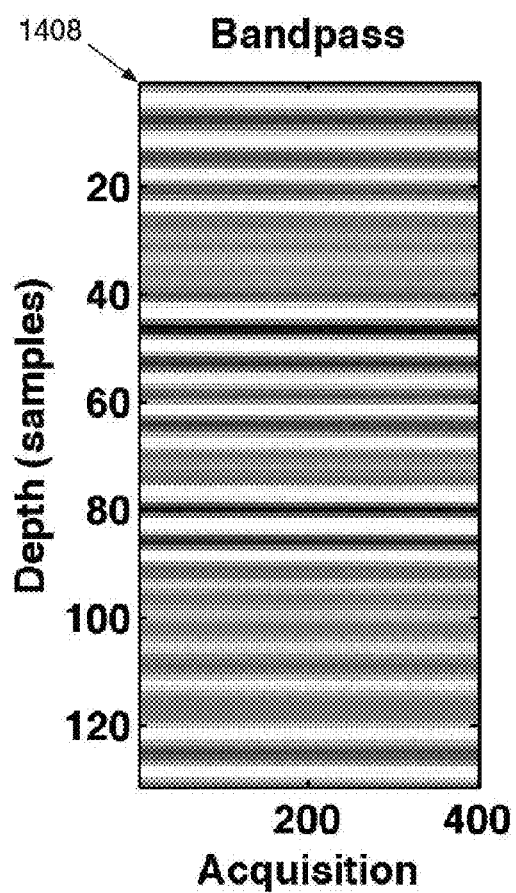
FIGS. 14B and 14C show corresponding bandpass filtered RF ensemble and complex PCF filtered RF ensemble simulated with 0.25 samples of maximum displacement across the ensemble.
Figure 14C:
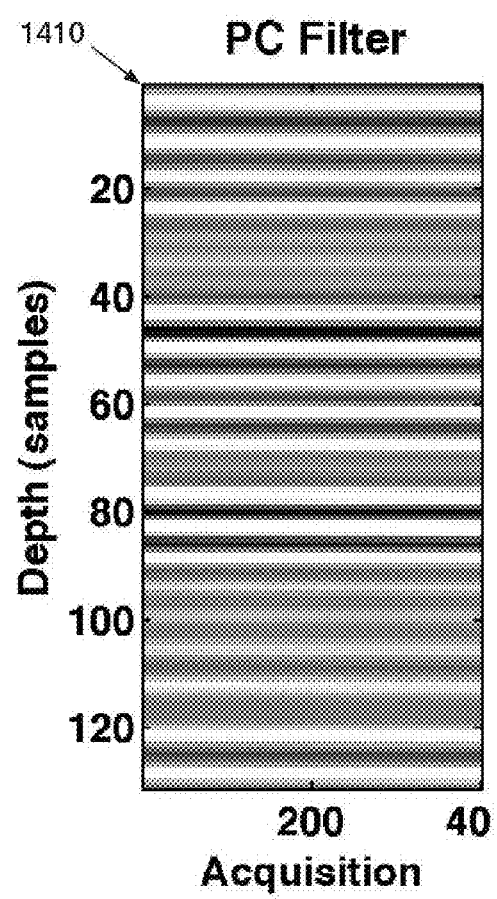
Figure 14D:
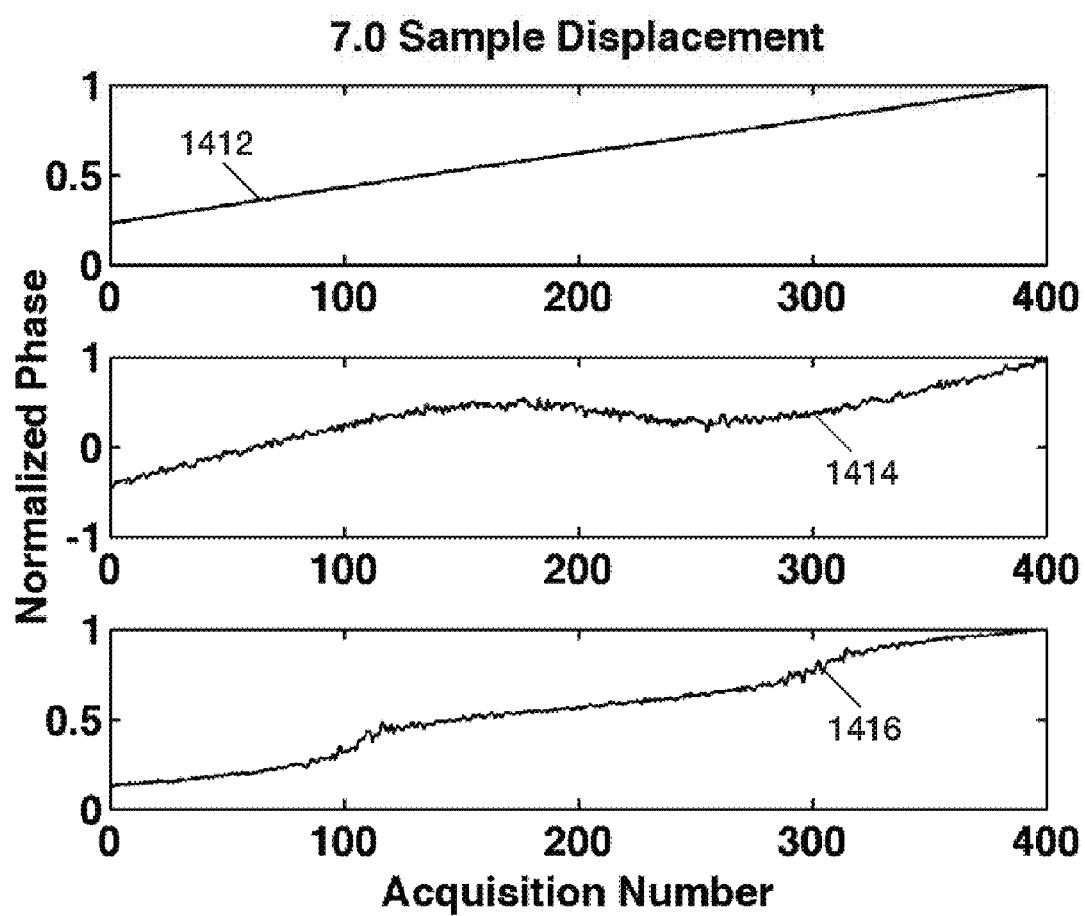
FIG. 14D shows results of the normalized phase of PCs using 7.0 maximum displacement.
Figure 14E:
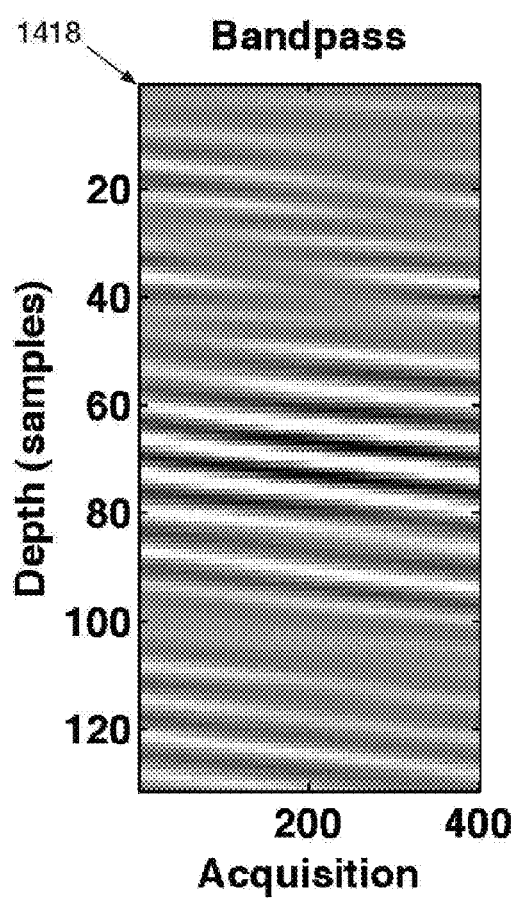
FIGS. 14E and 14F show corresponding bandpass filtered RF ensemble and complex PCF filtered RF ensemble simulated with 7.0 samples of maximum displacement across the ensemble.
Figure 14F:
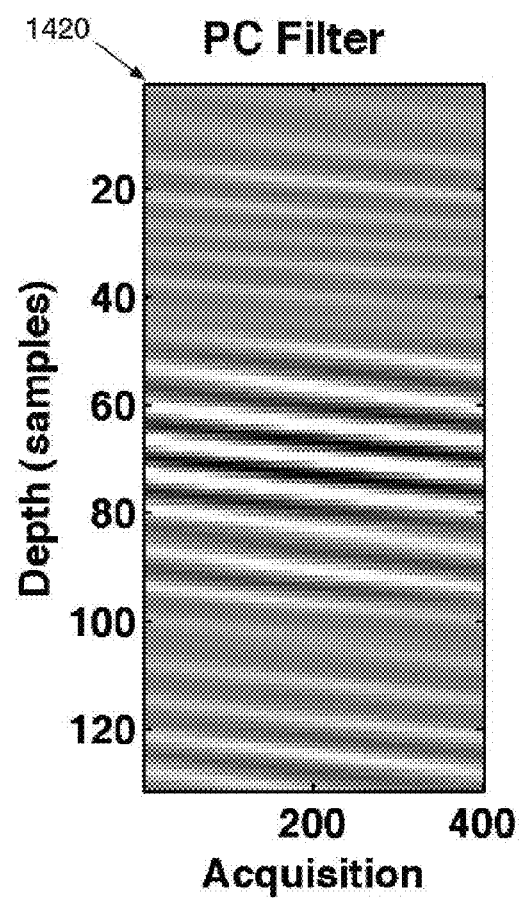

FIG. 14A shows results of the normalized phase of PCs 1 (1402), 2 (1404) and 3 (1406) using 0.25 maximum displacement. FIGS. 14B and 14C show corresponding bandpass filtered RF ensemble 1408 and complex PCF filtered RF ensemble 1410 simulated with 0.25 samples of maximum displacement across the ensemble. FIG. 14D shows results of the normalized phase of PCs 1 (1412), 2 (1414) and 3 (1416) using 7.0 maximum displacement. FIGS. 14E and 14F show corresponding bandpass filtered RF ensemble 1418 and complex PCF filtered RF ensemble 1420 simulated with 7.0 samples of maximum displacement across the ensemble. RF data is shown over a 130 sample window, which corresponds to the PC kernel window length used in simulation.

Because the N to N−1 technique performed better under greater decorrelation, this delay profile estimation method was preferable for greater displacements. Increased decorrelation with larger shift is apparent in the RF data of FIGS. 14A-14F. In FIGS. 14A-14C with a maximum shift of 0.25 samples, random noise represents the only visible cause of signal corruption. However, in FIGS. 14D-14F with a maximum shift of 7 samples, the data was visibly corrupted by decorrelation. The bandpass filtered data (FIG. 14E) exhibits significantly more signal decorrelation than the complex PCF data (FIG. 14F). Further, the PCs shown in FIGS. 14A and 14D illustrate the same characteristics as those in FIGS. 12A and 12D where the first PC 1402, 1412 and 1202, 1212, respectively represents the desired signal component with constant delay across the ensemble, and PCs 2 and 3 (1404 and 1406; 1414 and 1416; 1204 and 1206; and 1214 and 1216, respectively) represented undesired signal components.

Figure 15A:
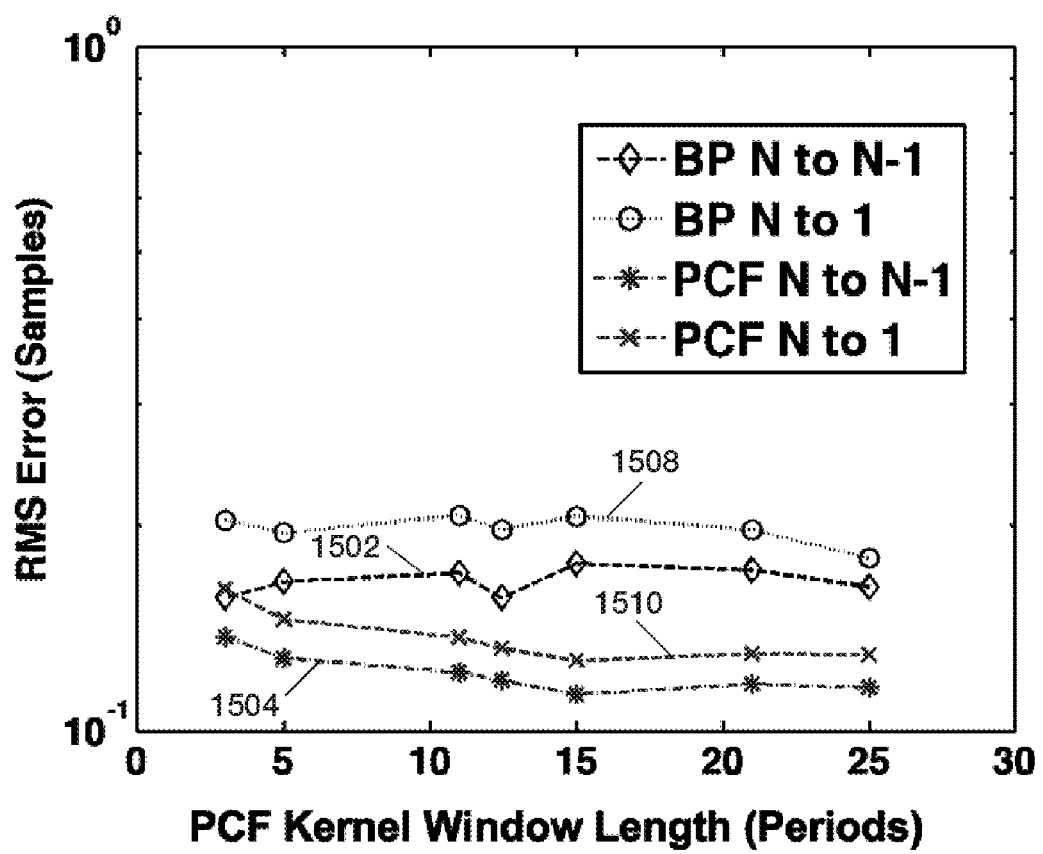
FIGS. 15A-15C display simulation results obtained over 1000 trials when PCF kernel length was varied from 3λ to 25λ, and all other simulation parameters were held constantl.
Figure 15B:
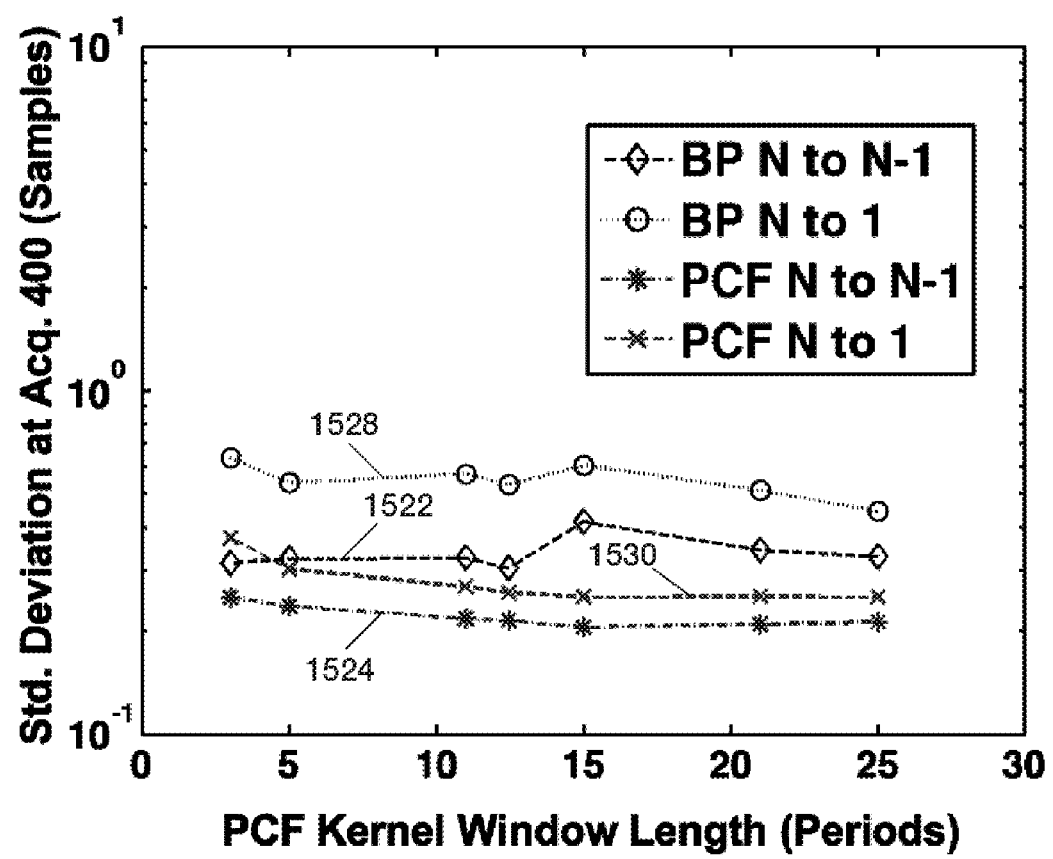
Figure 15C:
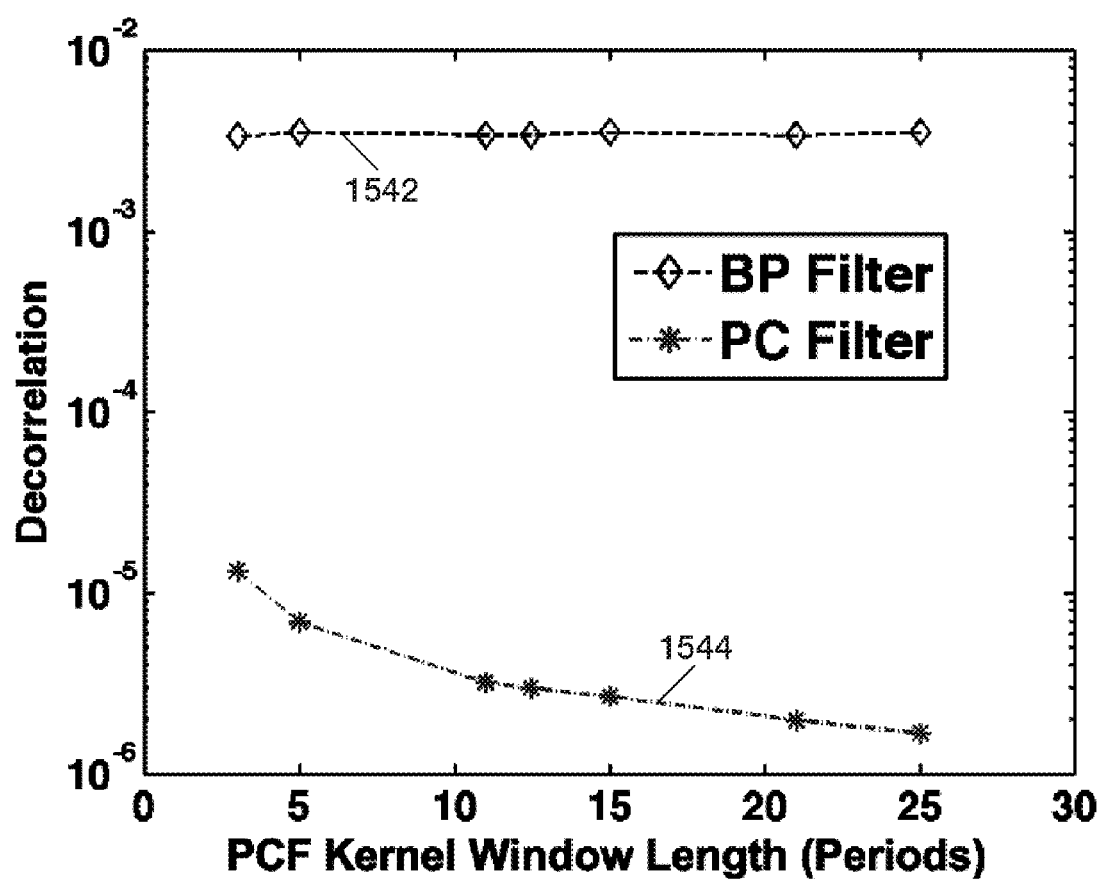

FIGS. 15A-15C display simulation results obtained over 1000 trials when PCF kernel length was varied from 3λ to 25λ and all other simulation parameters were held constant. RMS error (FIG. 15A), standard deviation at acquisition 400 (FIG. 15B), and the average decorrelation between consecutive echoes (average N to N−1 decorrelation) (FIG. 15C) are shown. Results shown in FIG. 15A are for bandpass 1502 and complex PCF 1504, each used in conjunction the N to N−1 method, and bandpass 1508, and complex PCF 1510, each used in conjunction with the N to 1 method for delay profile estimation. Results shown in FIG. 15B are for bandpass 1522 and complex PCF 1524, each used in conjunction with the N to N−1 method; and bandpass 1528, and complex PCF 1530, respectively, each used in conjunction with the N to 1 method for delay profile estimation. FIG. 15C shows average decorrelation between consecutive echoes (average N to N−1 decorrelation) for the bandpass filter method 1542 and the complex PCF method 1544, respectively.

Figure 16A:
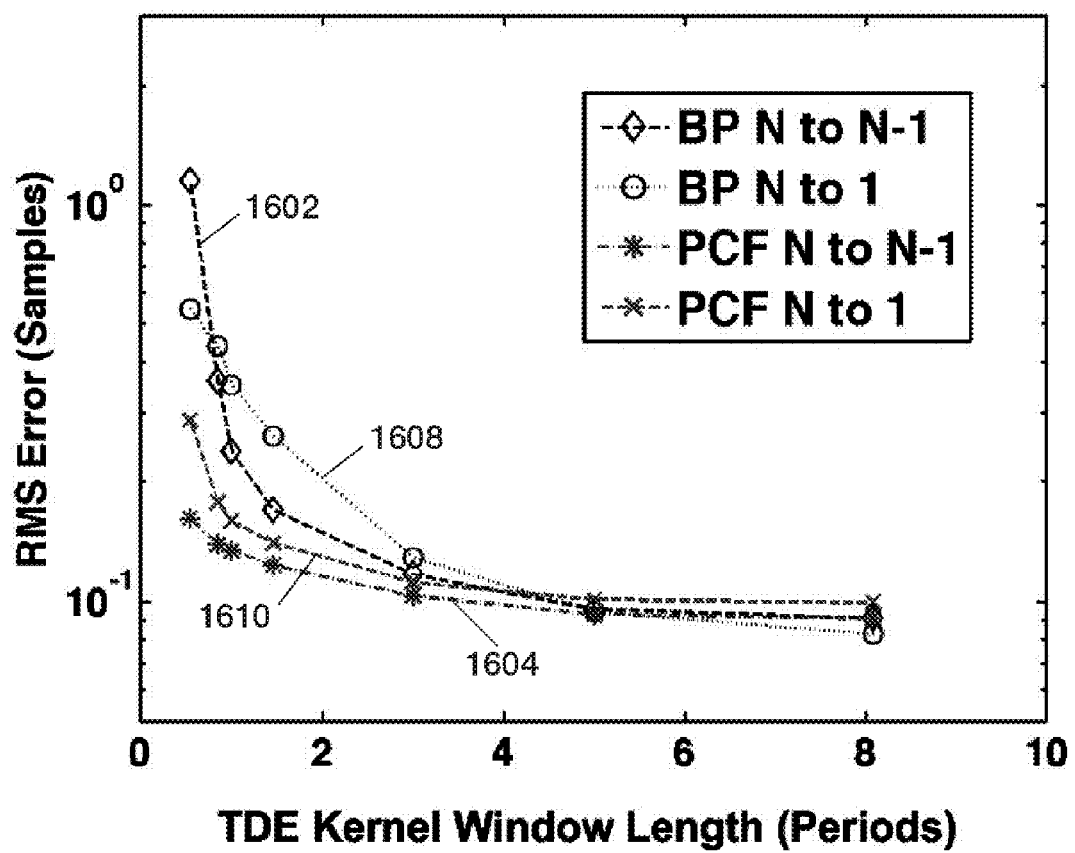
FIGS. 16A-16C display simulation results obtained over 1000 trials when TDE kernel length was varied from 0.5λ to 8λ and all other simulation parameters were held constant].
Figure 16B:
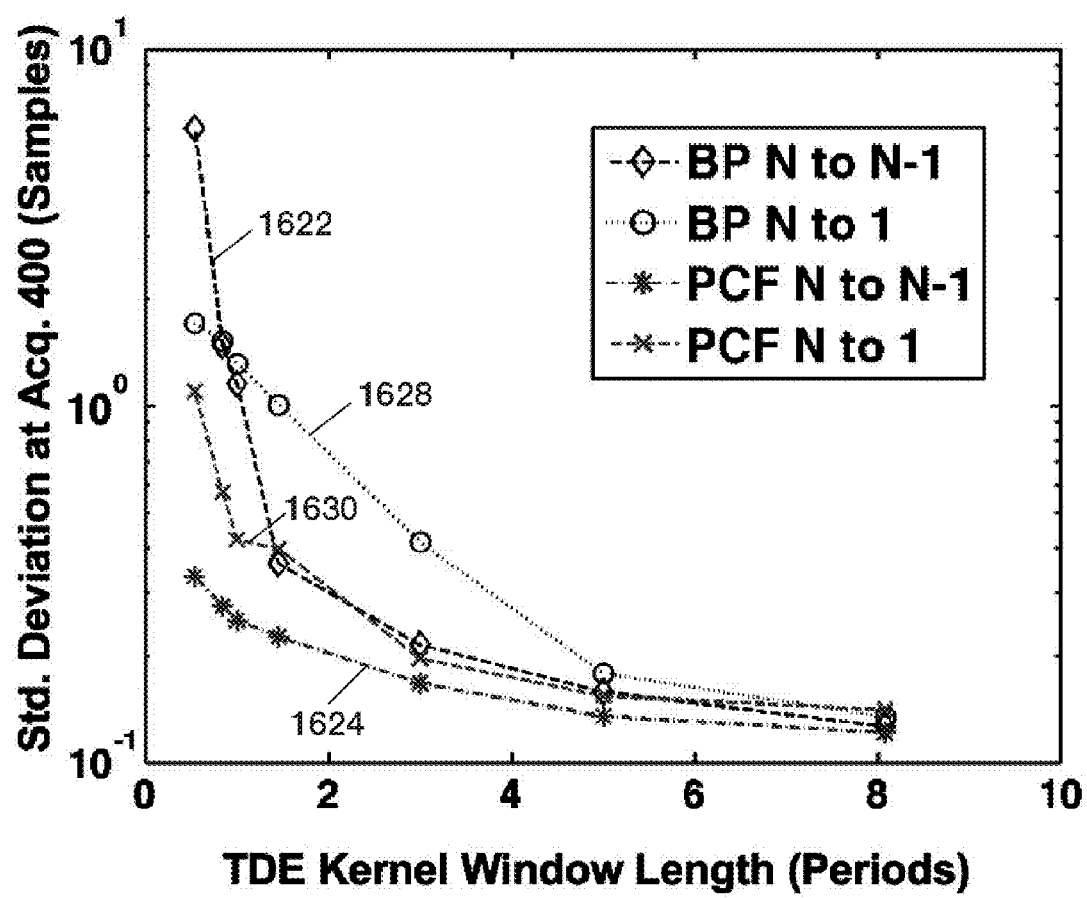
Figure 16C:
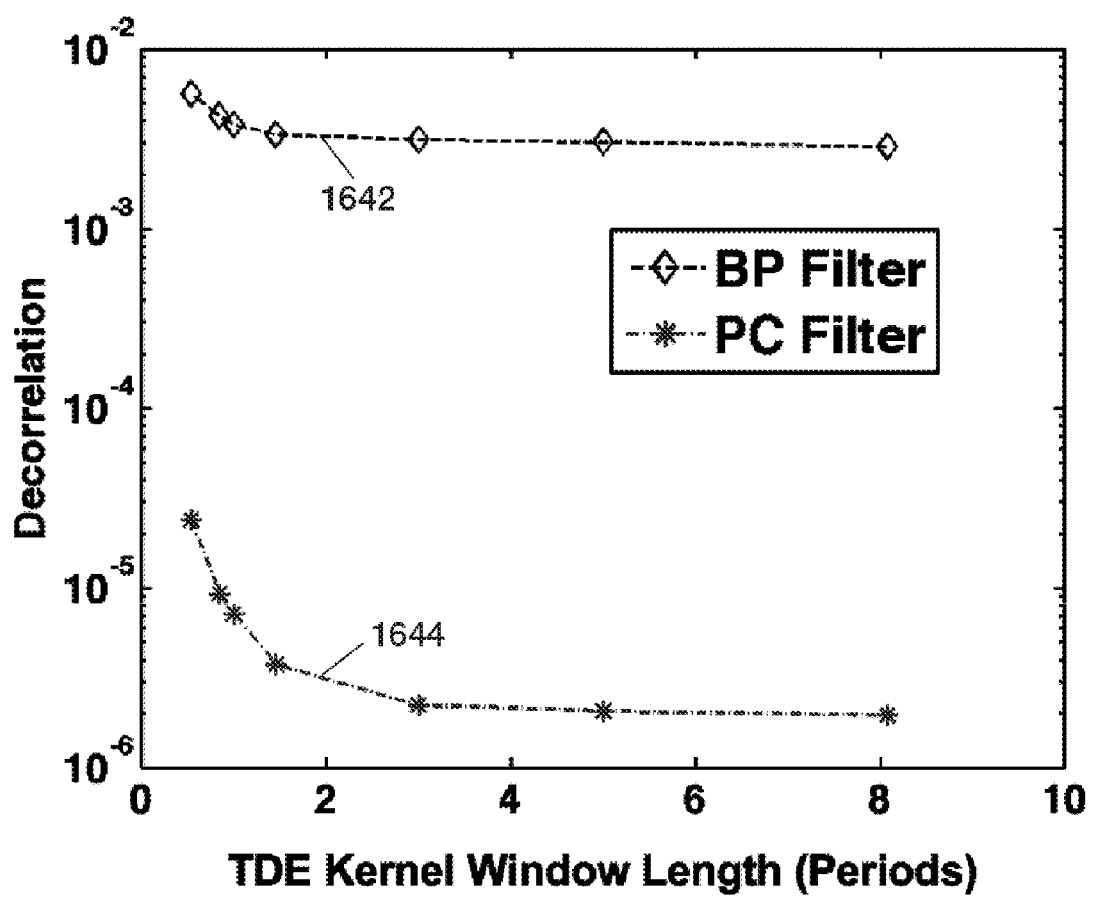

FIGS. 16A-16C display simulation results obtained over 1000 trials when TDE kernel length was varied from 0.5λ to 8λ and all other simulation parameters were held constant. RMS error (FIG. 16A), standard deviation at acquisition 400 (FIG. 16B), and the average decorrelation between consecutive echoes (average N to N−1 decorrelation) (FIG. 16C) are shown. Results shown in FIG. 16A are for bandpass 1602 and complex PCF 1604, each used in conjunction the N to N−1 method; and bandpass 1608, and complex PCF 1610, each used in conjunction with the N to 1 method for delay profile estimation. Results shown in FIG. 16B are for bandpass 1622 and complex PCF 1624, each used in conjunction with the N to N−1 method; and bandpass 1628, and complex PCF 1630, respectively, each used in conjunction the N to 1 method for delay profile estimation. FIG. 16C shows average decorrelation between consecutive echoes (average N to N−1 decorrelation) for the bandpass filter method 1642 and the complex PCF method 1644, respectively.

In FIGS. 15A-15C and 16A-16C, the impact of kernel lengths for PCA filtering, $T_{PCF}$ and spline TDE, T are shown, respectively. When only $T_{PCF}$ was varied and all other simulation parameters were held constant, the complex PCF method provided better results with longer $T_{PCF}$ as displayed in FIG. 15C. Because a larger $T_{PCF}$, corresponding to a larger number of observations, allowed for a better estimate of the sample covariance matrix, superior filter performance resulted. FIGS. 16A-16C show that the advantage of complex PCF over bandpass filtering is negligible with increased TDE kernel lengths. Although decorrelation is dramatically reduced by PCF at larger values of T, as shown in FIG. 16C, the RMS error and standard deviation differences are minimal. Equation (1) suggests that decorrelation no longer dominates TDE performance at large values of T, where TDE kernel length dominates performance.

Although larger TDE kernel lengths produced lower error and standard deviation, in practical applications there are costs associated with larger TDE kernel lengths that include increased computational cost and decreased sensitivity to displacement changes through depth. Because clinical data often exhibits a large range of displacement magnitudes and profiles through depth, it is preferable to be sensitive to these displacement changes by selecting a smaller T. Thus, there is a practical tradeoff, and one must select a T which balances these effects. There is a similar tradeoff with respect to $T_{PCF}$ when complex PCF is applied to clinical RF data. Although increasing $T_{PCF}$ results in a better estimate of the covariance matrix, it only does so when the displacement profile is stationary across the analysis window. If the RF data at different ranges exhibit differing displacement profiles, the shape of the first PC retained during complex PCF may be impacted. In this way, it is possible that a very large $T_{PCF}$ may provide biased results. This is especially true when different regions within the window exhibit differing gains, as is common under frequency dependent attenuation. For this reason, it is desirable to choose a large $T_{PCF}$ only if the echo data within the interval is approximately stationary.

Figure 17A:
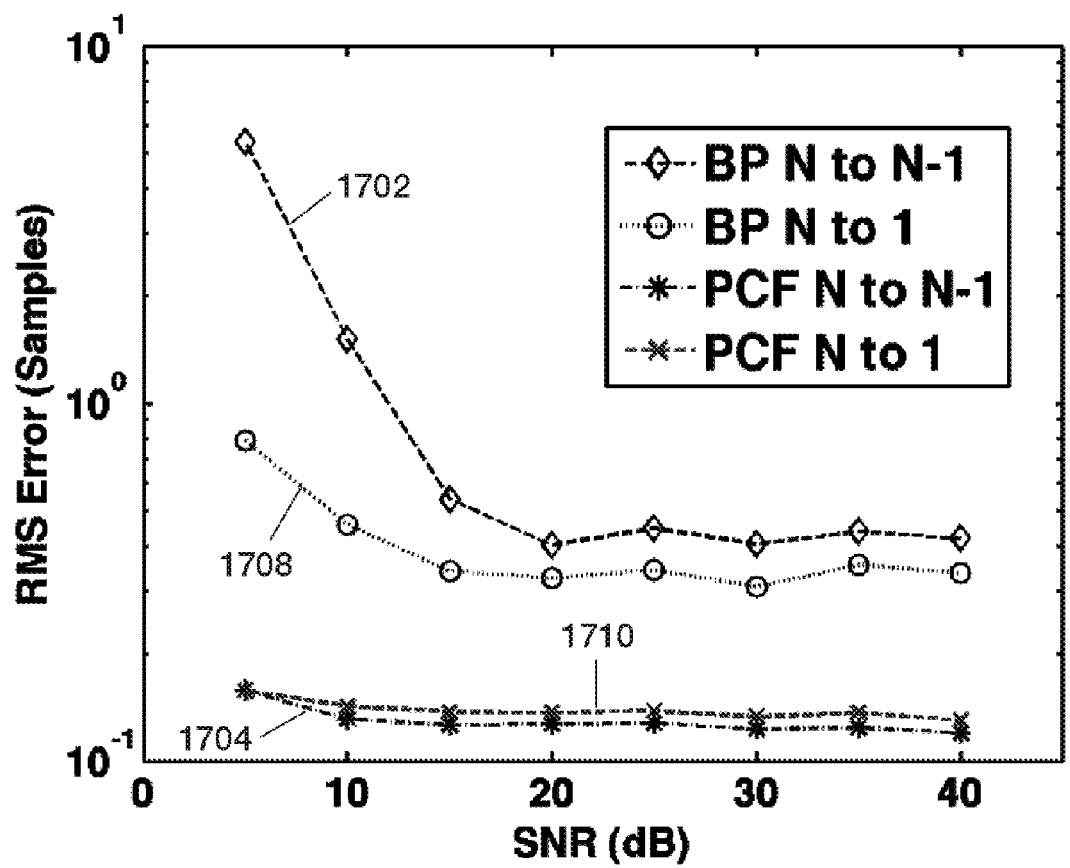
FIGS. 17A-17F show simulation results similar to FIG. 11A-11C depicting RMS error (FIGS. 17A and 17D), standard deviation at acquisition 400 (FIGS. 17B and 17E) and the average decorrelation between consecutive echoes when SNR is varied from 5 to 40 dB (FIGS. 17C and 17F).
Figure 17B:
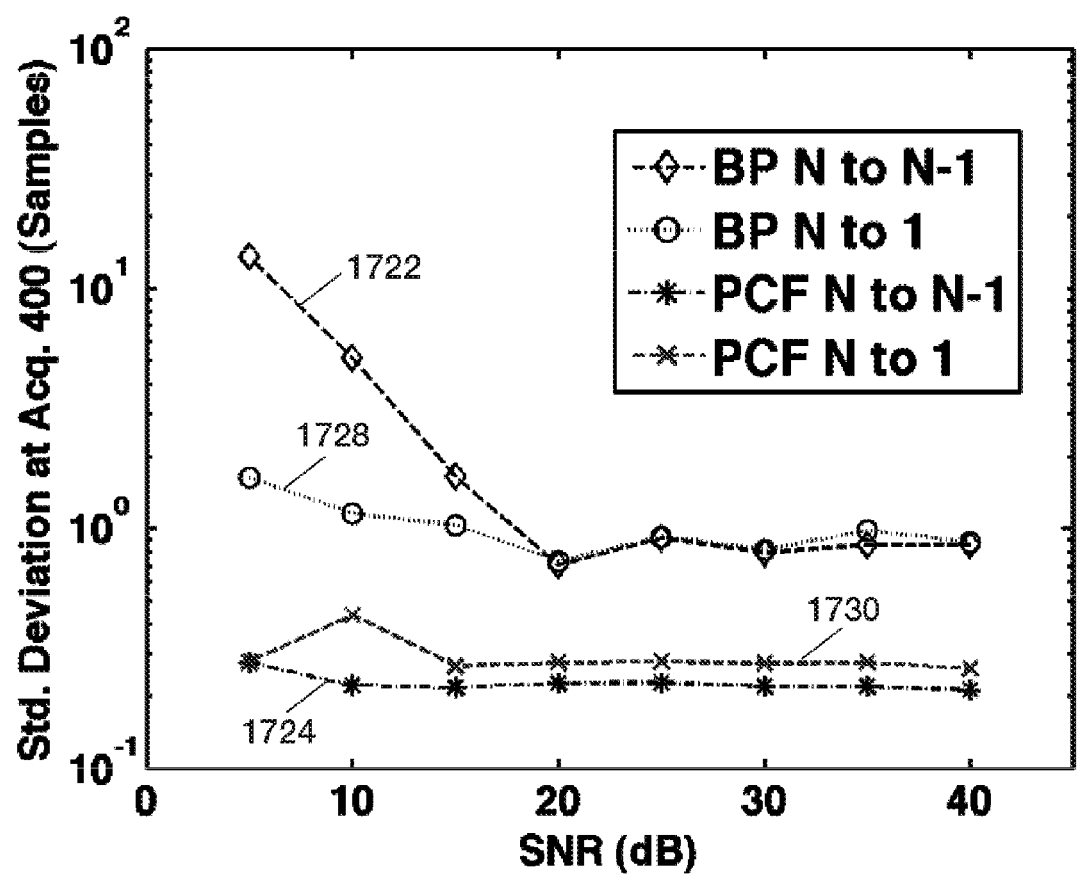
Figure 17C:
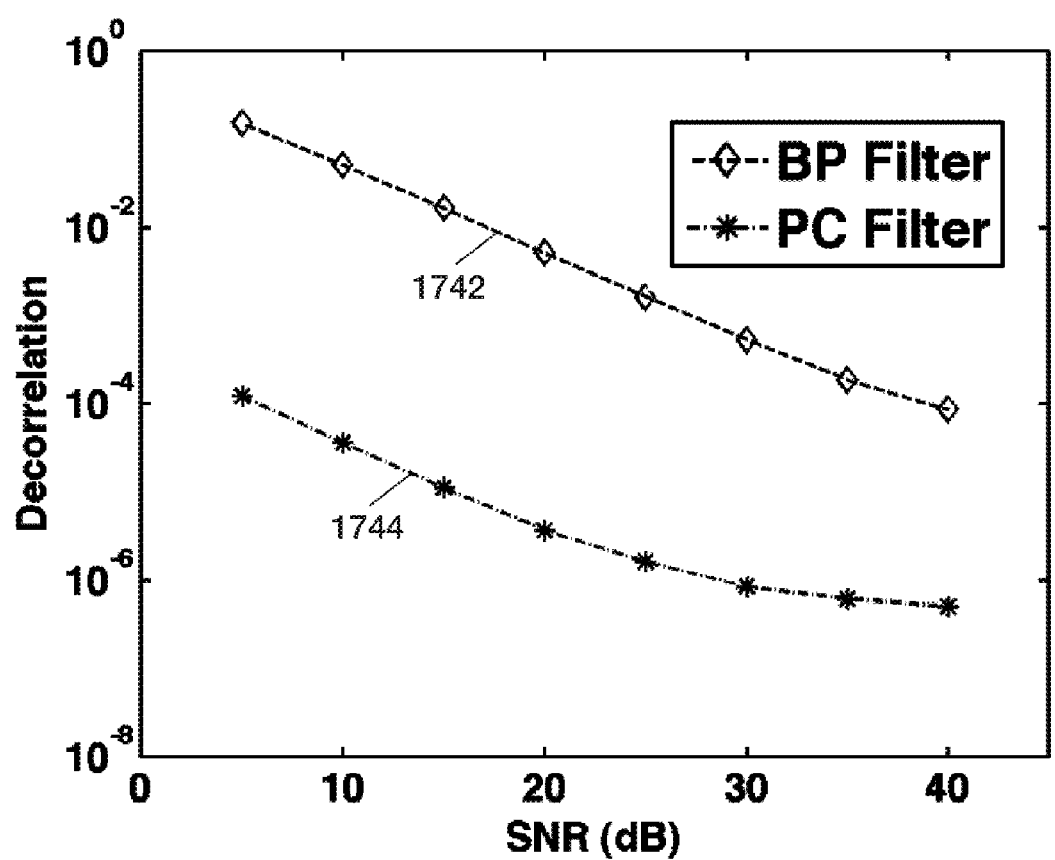
Figure 17D:
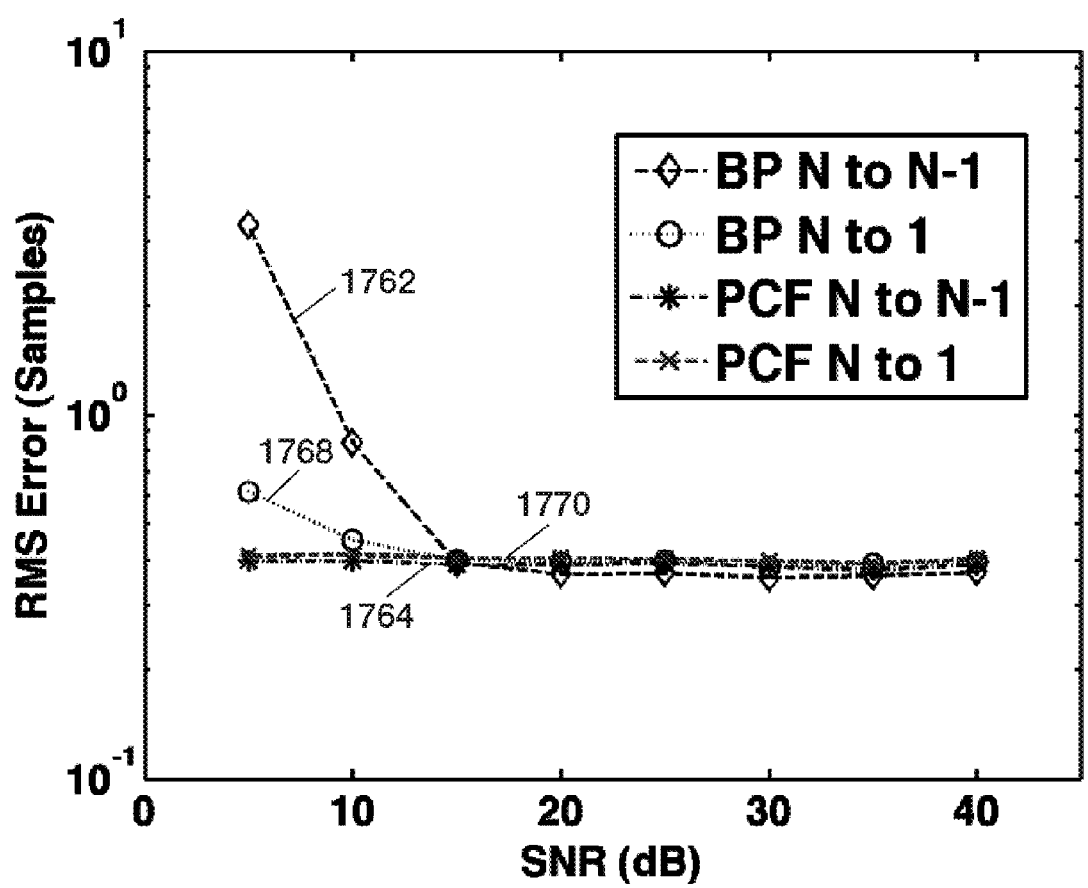
Figure 17E:
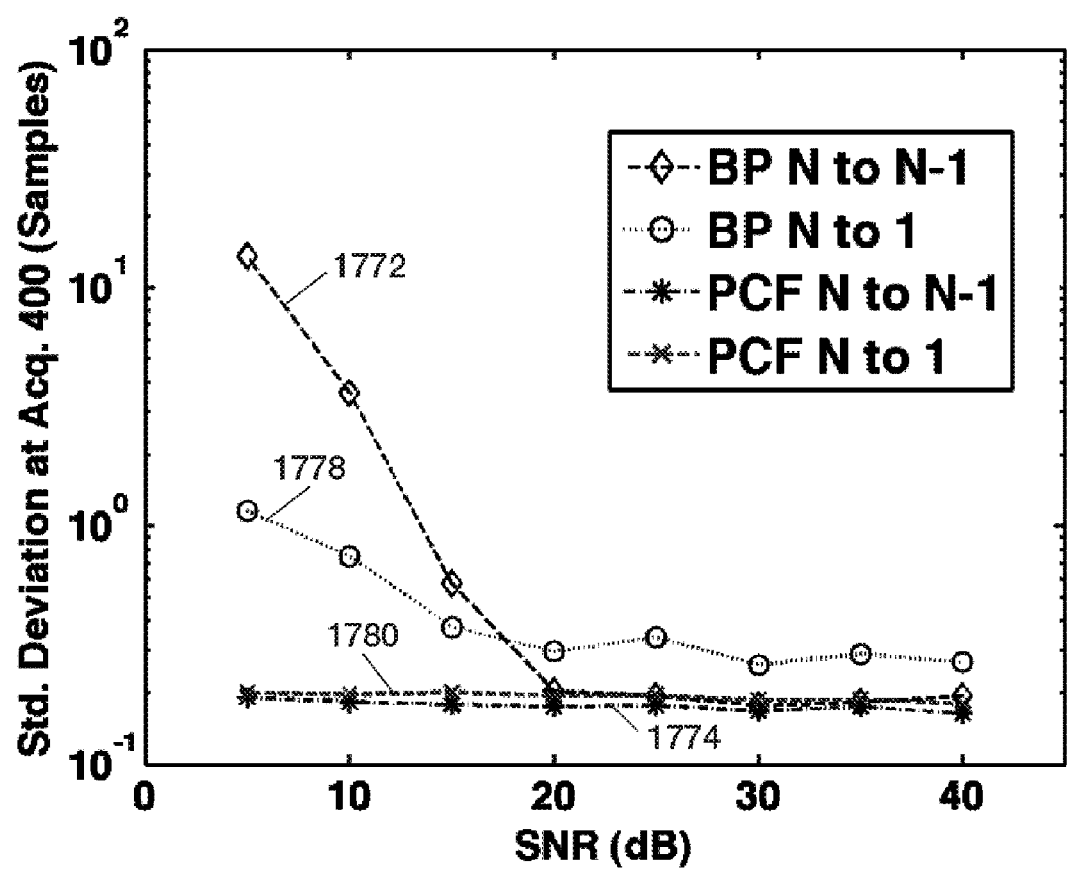
Figure 17F:
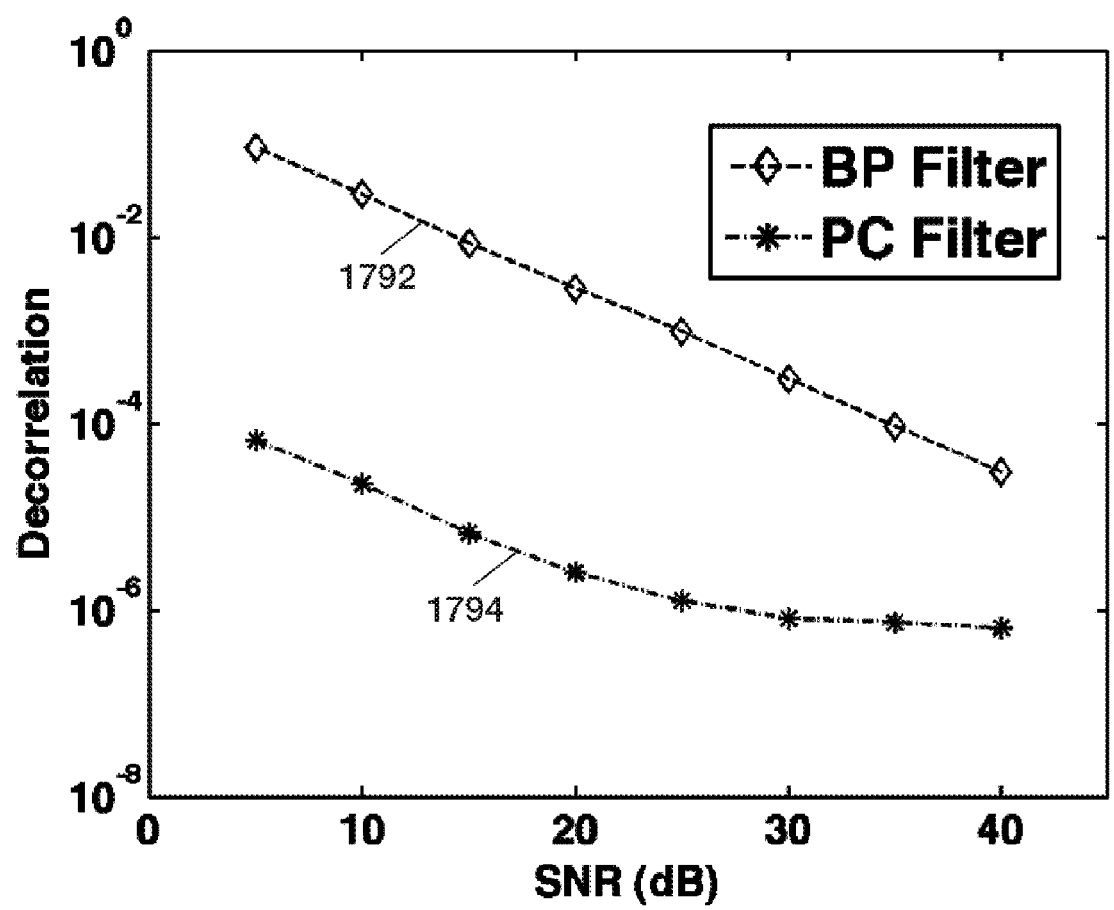

FIGS. 17A-17F show simulation results similar to FIG. 11A-11C depicting RMS error (FIGS. 17A and 17D), standard deviation at acquisition 400 (FIGS. 17B and 17E) and the average decorrelation between consecutive echoes when SNR is varied from 5 to 40 dB (FIGS. 17C and 17F). In regard to FIGS. 17A-17C, simulated ensembles of echo data were formed where the signal of interest $s_1$ had the lowest velocity of the three signal components as given by:

$$d_1 = \frac{1}{4}d_2 = \frac{1}{8}d_3 \qquad (22)$$

Results shown in FIG. 17A are for bandpass 1702 and complex PCF 1704, each used in conjunction the N to N−1 method; and bandpass 1708, and complex PCF 1710, each used in conjunction with the N to 1 method for delay profile estimation. Results shown in FIG. 17B are for bandpass 1722 and complex PCF 1724, each used in conjunction with the N to N−1 method; and bandpass 1728, and complex PCF 1730, respectively, each used in conjunction the N to 1 method for delay profile estimation. FIG. 17C shows average decorrelation between consecutive echoes (average N to N−1 decorrelation) for the bandpass filter method 1742 and the complex PCF method 1744, respectively.

In regard to FIGS. 17D-17F, simulated ensembles of echo data were formed with five signal components rather than three. Furthermore, rather than a constant velocity, the component displacement profiles followed an exponential trend where $v_n(t)$ is displacement through time, $d_n$ is the steady-state displacement, t is time from zero to one second, and $\tau$ is the time constant set to 0.25 seconds:

$$v_n(t) = d_n(1 - e^{-\frac{t}{\tau}}) \qquad (23)$$

The five signal components also had a smaller separation in velocity than other simulations performed above. The steady-state displacements of the signal components for the example represented by FIGS. 17D-17F were given by:

$$d_1 = \frac{7}{8}d_2 = \frac{4}{3}d_3 = 2d_4 = 4d_5 \qquad (24)$$

Results shown in FIG. 17D are for bandpass 1762 and complex PCF 1764, each used in conjunction the N to N−1 method; and bandpass 1768, and complex PCF 1770, each used in conjunction with the N to 1 method for delay profile estimation. Results shown in FIG. 17E are for bandpass 1772 and complex PCF 1774, each used in conjunction with the N to N−1 method; and bandpass 1778, and complex PCF 1780, respectively, each used in conjunction the N to 1 method for delay profile estimation. FIG. 17F shows average decorrelation between consecutive echoes (average N to N−1 decorrelation) for the bandpass filter method 1792 and the complex PCF method 1794, respectively.

The results of FIGS. 17A-17F show that the PCF method used performs at least as well in terms of RMS error and standard deviation under these circumstances as in FIGS. 11A-11C, when $s_1$ was assigned the largest velocity given by equation (16). This shows that the efficacy of the PCF algorithm does not rely on the desirable signal component having the greatest displacement, but only that the signal of interest is the most energetic. Further, FIGS. 17D-17F show the performance of PCF versus bandpass filtering when there are five signal components that exhibit non-uniform velocity through ensemble length and a smaller difference between velocity magnitudes. By simulating the echo data with signal components that had more similar velocity trends, the resulting simulated RF did not contain as much decorrelation. Thus, PCF did not offer gains in RMS error and standard deviation as large as those reported in FIGS. 11A-11C. However, as anticipated, PCF still produced large gains in TDE performance at lower SNR levels. Thus, simulation results summarized in FIGS. 17D-17F illustrate that the PCF methods do not rely on a specific number of components, constant velocity, or a specified difference between magnitudes of component velocities. However, these results do indicate that PC filtering (PCF) will offer larger gains in time delay estimation performance when there is more decorrelation and noise present in the echo data.

These simulations showed that complex PCF filtering outperformed the conventional bandpass filtering technique when ultrasound echo data was simulated with decorrelation and noise over a wide range of imaging conditions.

Example 2

Complex PCF for Sonorheometry Displacement Estimation

By observing the dynamic displacements induced in blood by acoustic radiation force, sonorheometry provides a non-contact means for assessment of blood coagulation in vitro. In this sonorheometry example, radiation force ultrasound was used to transfer momentum to coagulating blood and ultrasound tracking methods were used to track resulting displacement. As a means to improve echo correlation and displacement estimation in sonorheometry, complex PCF was applied to experimental RF data.

RF data was acquired using a 10 MHz, 1.0-cm diameter single-piston transducer (General Electric Panametrics V327, Waltham, Mass.) with a 4.0 cm focal length. The piston transducer was coupled to a custom designed sonorheometry system (e.g., see FIG. 8A, 800), which included two transmit channels 808, four receive channels 804/808, an FPGA 810, and power supply circuitry 812. Received echoes were bandpass filtered, digitized at 65 MHz with 12 bits precision, and then transferred via USB 2.0 connection to a laptop computer 900 where the data was processed in MATLAB. Experiments were performed using 1 mL fresh blood samples placed in polystyrene cuvettes, modified as described below.

Blood samples were obtained via a 20-gauge IV catheter placed in a peripheral arm vein of a healthy 39 year old male subject. The initial 3 ml of blood were discarded, and 10 experiments were performed on each of the next 1 ml blood samples. Each cuvette was modified by drilling a 7 mm diameter hole through the front and back and sealing both with a 250 μm polydimethylsiloxane (PDMS) film. The hole and film allowed the acoustic beam to propagate through the blood sample with minimal attenuation.

Blood was then mixed with 125 μl of 0.1% kaolin solution to initiate the cloning process, with the first acquisition taking place 30 seconds after adding kaolin. An ensemble of sonorheometry data consisted of 400 pulses transmitted at a pulse repetition frequency (PRF) of 400 Hz for a total duration of 1 second. A single experiment consisted of a series of ensembles repeated every 6 seconds for 8 minutes. Experiments were performed with written consent from all subjects and in accordance with the protocol approved by the Institutional Review Board (IRB) at the University of Virginia.

TDE estimates were made using the spline TDE algorithm after either FIR bandpass or complex PC filtering. Complex PCF was applied to the experimental RF in the same way that it was applied to the simulated echo data and as described in detail with regard to FIG. 3 above. The PC kernel window length was identical to the simulation default, which corresponded to 10 periods or approximately 1.5 mm. Displacement profiles of coagulating blood were calculated, and the material properties were estimated by fitting displacement responses to a discrete viscoelastic model. The model used was a modified Voigt model with an added mass, which has been shown to characterize the response of coagulating blood to a step excitation of acoustic radiation force, i.e., see Viola et al., "Sonorheometry: A noncontact method for the dynamic assessment of thrombosis", Ann Biomed Eng 2004; 32(5): 696-705, which is hereby incorporated herein, in its entirety, by reference thereto. The differential equation governing this viscoelastic model, with acoustic force modeled as a step function with magnitude, A can be written:

$$Au(t) = kx(t) + \mu \frac{d}{dt}x(t) + m\frac{d^2}{dt^2}x(t) \quad (25)$$

where u(t) is the unit step function, x(t) is the resulting displacement, k is the elastic constant, $\mu$ is the coefficient of viscosity, and m is an inertial constant. Two mechanical parameters of interest are the time constant parameter, $\tau$ and the steady-state displacement parameter, $x_{ss}$ which can be expressed:

$$\tau = \frac{\mu}{k} \quad (26)$$

$$x_{ss} = \frac{A}{k} \quad (27)$$

Figure 18A:
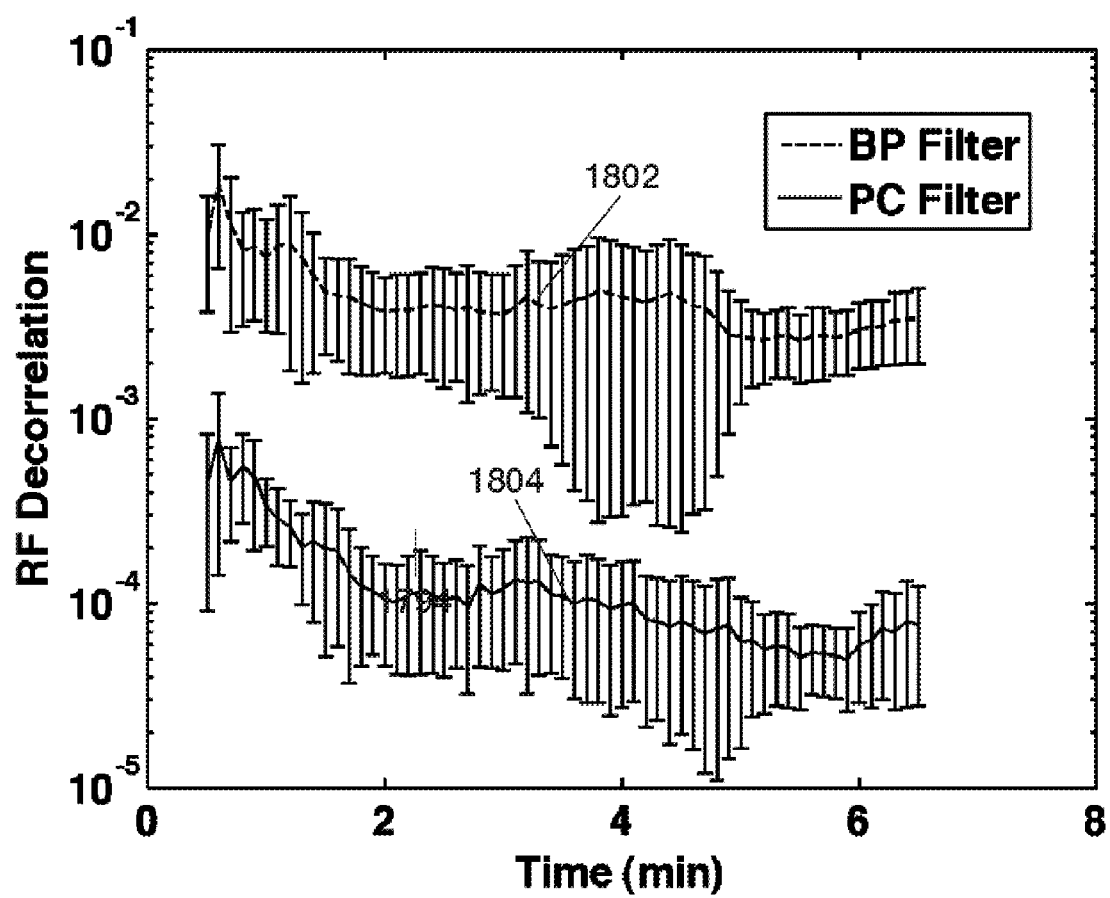
FIG. 18A shows the average RF decorrelation over ten trials decreased by at least an order of magnitude under complex PCF results relative to bandpass filtering results.
Figure 18B:
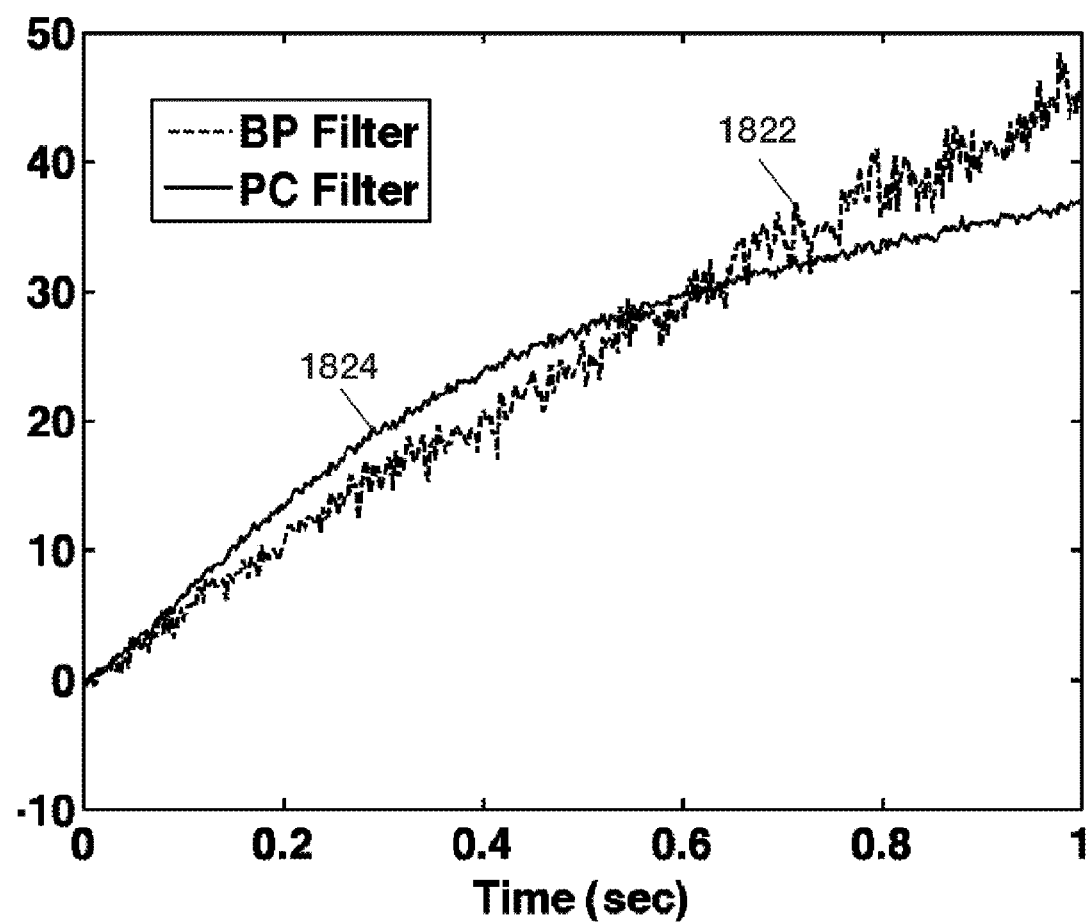
FIG. 18B shows example displacement profiles relative to the example described in FIG. 18A.
Figure 18C:
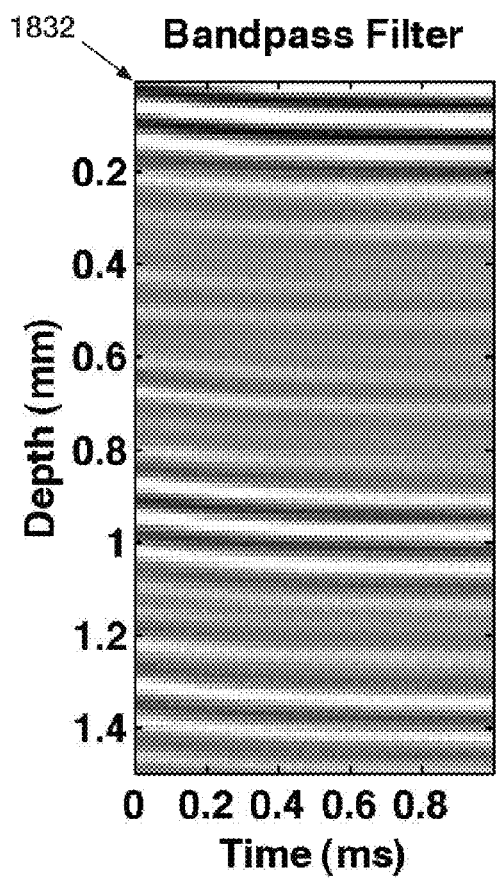
FIGS. 18C-18D show ensembles of RF signal data from which the displacement profiles of FIG. 18B were calculated.
Figure 18D:
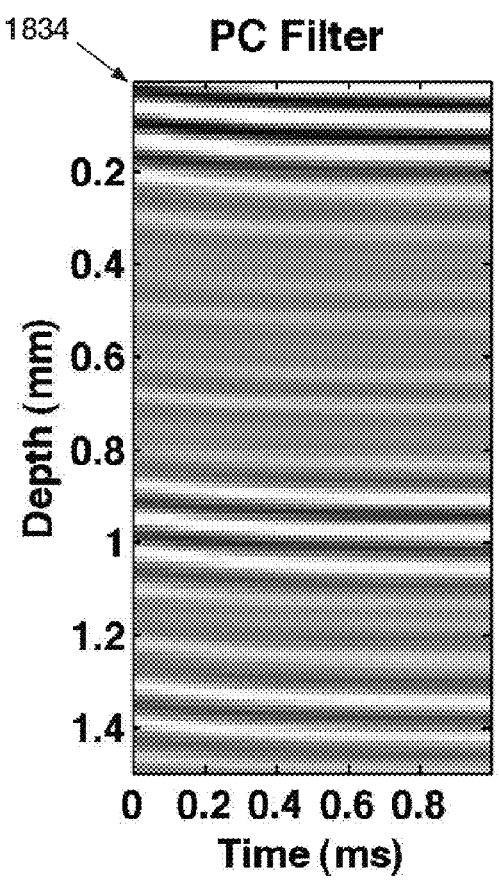
Figure 18E:
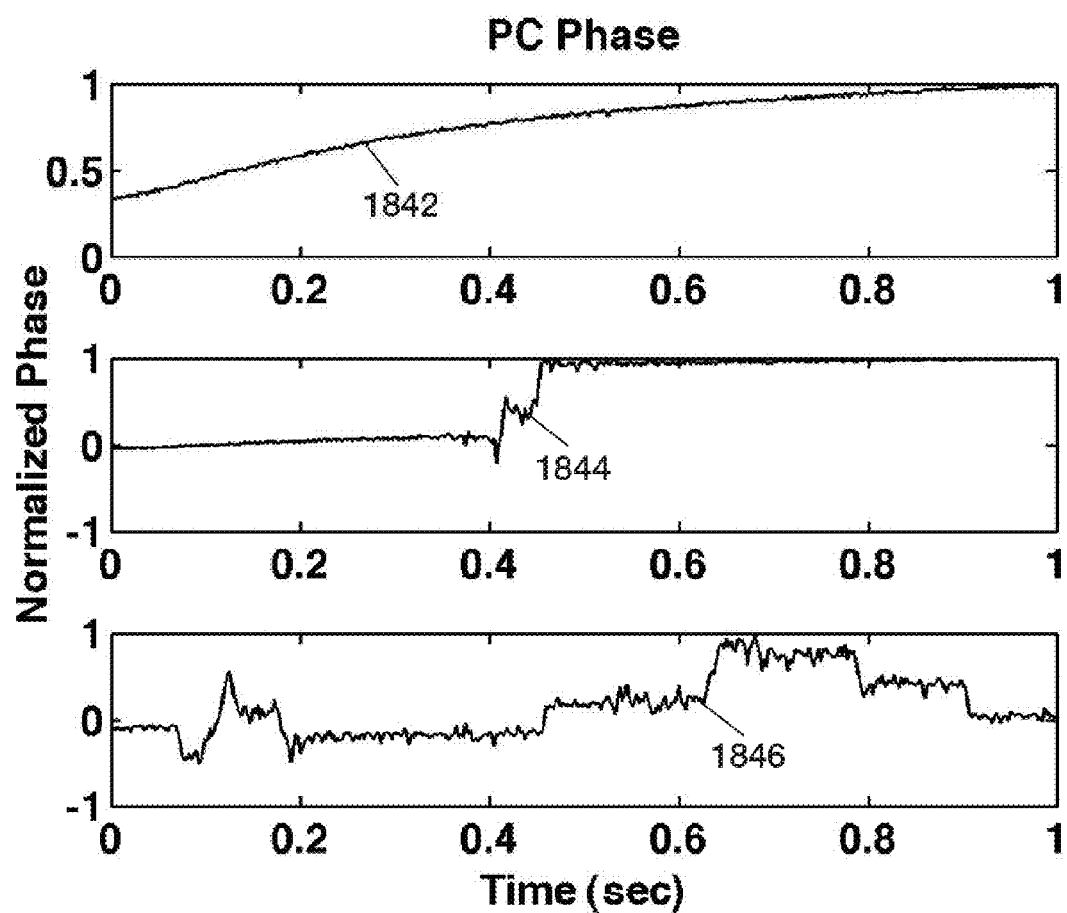
FIG. 18E shows that the first PC computed from the RF data is the only PC with the desired delay characteristics.

The application of complex PCF to sonorheometry achieved superior performance over typical bandpass filtering. As shown in FIG. 18A, the average RF decorrelation over ten trials decreased by at least an order of magnitude under complex PCF results 1804 relative to bandpass filtering results 1802. For example, at two minutes after initiation of blood coagulation, correlation improved from 0.996 to 0.9999. Example displacement profiles, illustrated in FIG. 18B (displacement measured in units of microns (µm)), showed that PCF results 1824 exhibited much less noise and a more well-behaved response than that for bandpass filtering 1822. FIGS. 18C-18D show ensembles of RF signal data from which the displacement profiles of FIG. 18B were calculated. The RF ensemble 1834 displayed less decorrelation and noise under PCF filtering that the RF ensemble 1832 produced by bandpass filtering. Following the simulation trends, FIG. 18E shows that the first PC 1842 computed from the RF data is the only PC with the desired delay characteristics, and therefore the second and third PCs 1844 and 1846 were not used in calculating the displacement estimation.

Figure 19A:
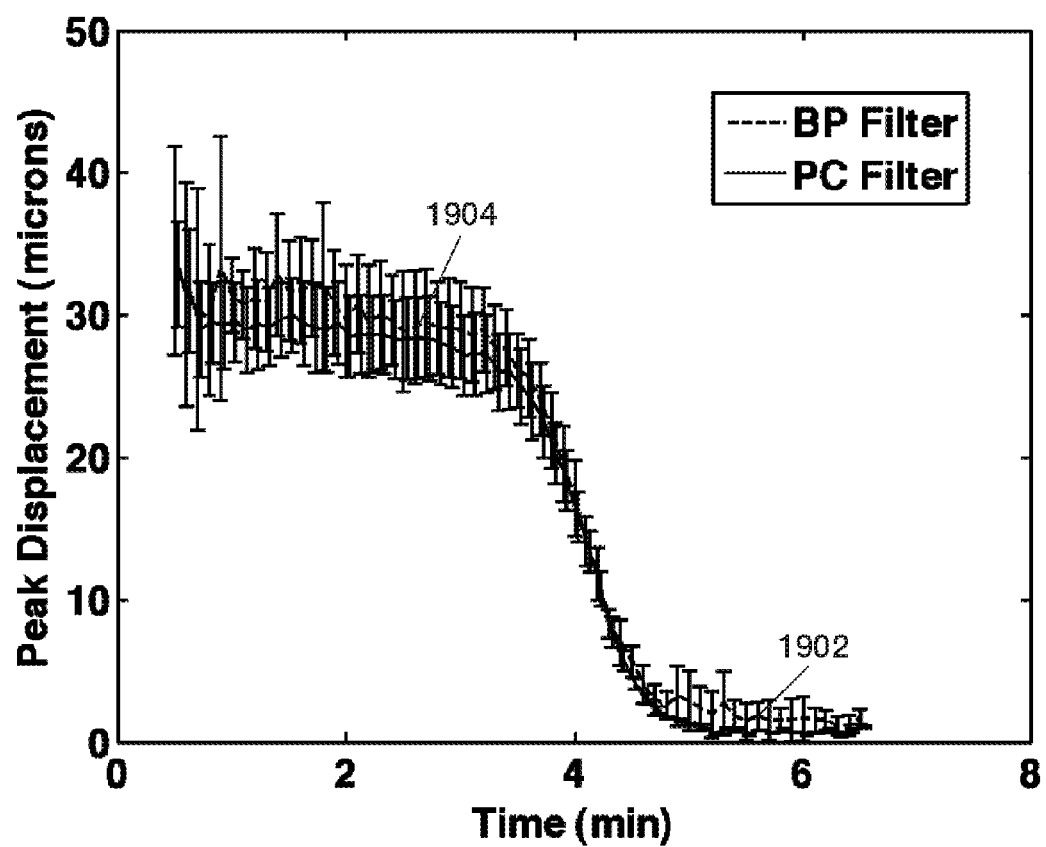
FIG. 19A, shows the average peak displacement from ten displacement profiles rendered across a 2 mm window in depth.
Figure 19B:
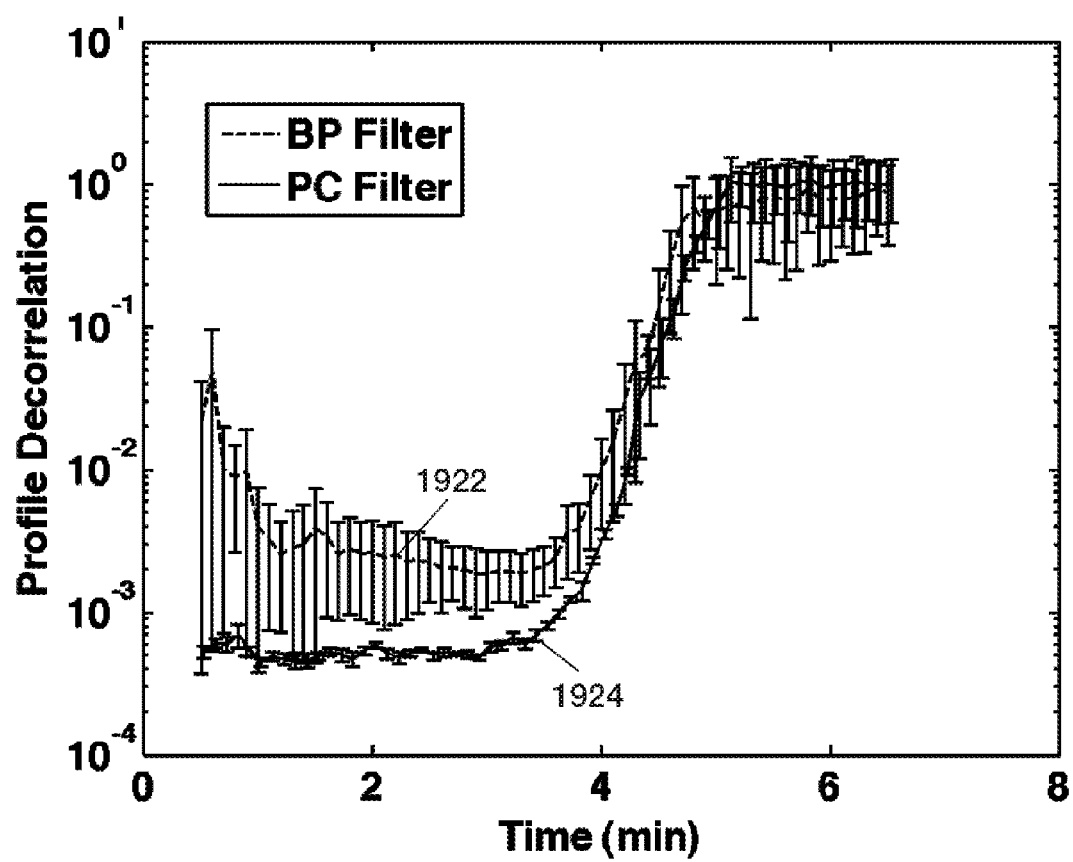
FIG. 19B shows average decorrelation values (one minus correlation) between the displacement profiles and a viscoelastic Voigt model with added mass.
Figure 19C:
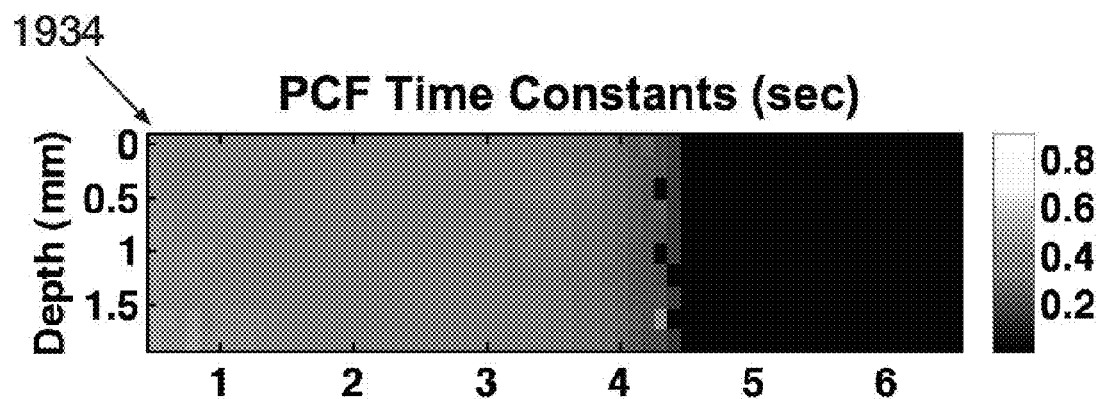
FIGS. 19C-19F show images rendered across a 2 mm window of the blood sample.
Figure 19D:
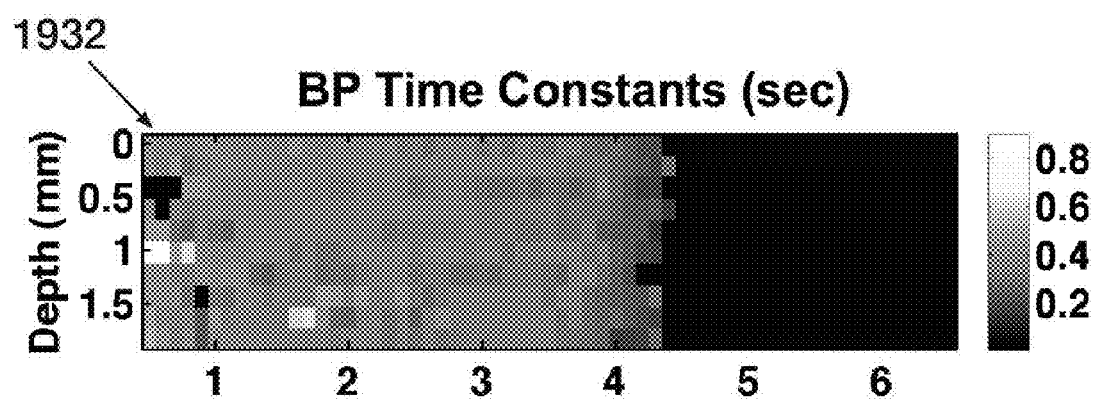
Figure 19E:
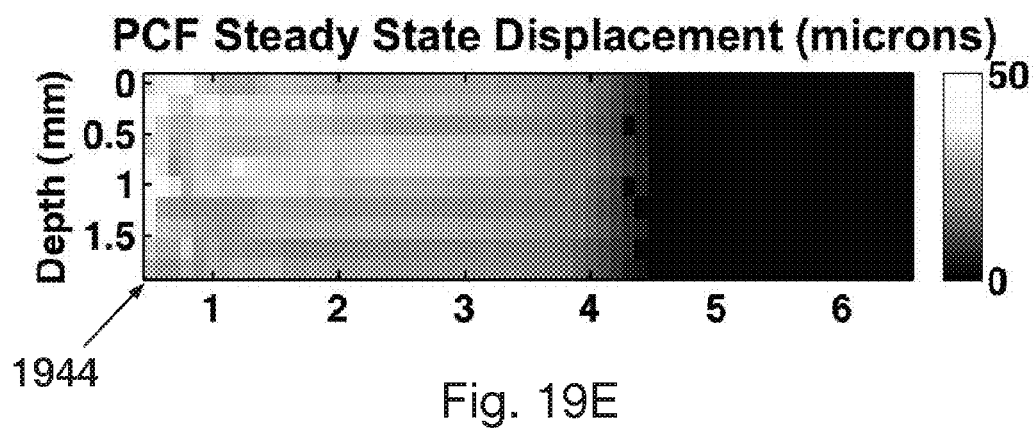
Figure 19F:
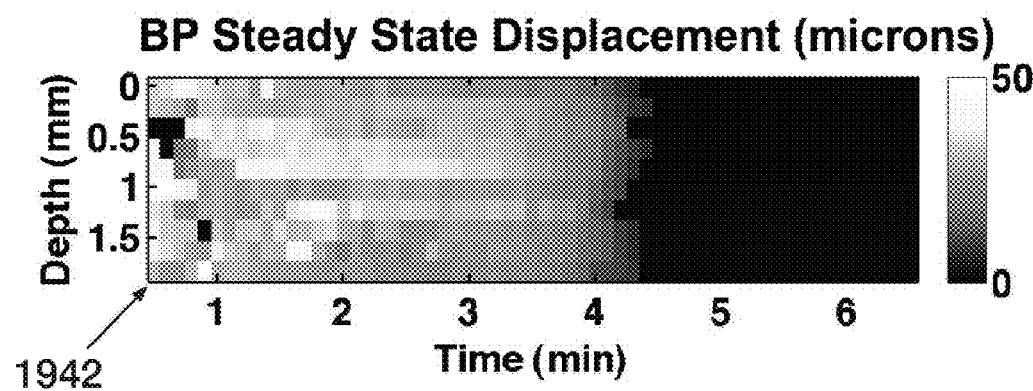

In FIG. 19A, the average peak displacement from ten displacement profiles rendered across a 2 mm window in depth are displayed. Average peak displacements are shown for each sonorheometry interrogation, which occurred every 6 seconds and are displayed from 0.5 minutes to 6.5 minutes, Results illustrate the peak displacement values obtained via bandpass filtering (BP Filter) 1902 versus complex PCF (PC Filter) 1904 of the RF data prior to TDE. Error bars indicate the standard deviation added to (top) or subtracted from (bottom) of the average over ten ranges. Average decorrelation values (one minus correlation) between the displacement profiles and a viscoelastic Voigt model with added mass are illustrated in FIG. 19B, where error bars indicate the mean plus or minus the standard deviation over ten depths. The average decorrelation values using bandpass filtering are shown at 1922 and the average decorrelation values using PCF are shown at 1924. Images are rendered across a 2 mm window of the blood sample for time constants, see image 1934 for PCF filtering in 19C and image 1932 for bandpass filtering in FIG. 19D. Images are rendered across a 2 mm window of the blood sample for steady state displacement, see image 1944 for PCF filtering in 19E and image 1942 for bandpass filtering in FIG. 19F. Thus viscoelastic parameters determined after complex PCF are shown in FIGS. 19C and 19E and viscoelastic parameters derived parameters after bandpass filtering are shown in FIGS. 19D and 19F. Parameter values in FIGS. 19C-19F were masked when the displacement profile fit the viscoelastic model with less than 0.95 correlation.

In 19A, the peak displacement values obtained with PCF 1904 showed a much smoother response that those obtained with bandpass filtering 1902. Further, the results in FIG. 19B illustrate that PCF yields a better fit between displacement profiles and the viscoelastic model. This trend was especially true prior to blood clotting, which occurred at approximately four minutes. After blood clotted, there was no displacement, and therefore, the correlation between the estimated displacement profile and the viscoelastic model tends toward zero. Results from FIG. 19C-19E show much more consistent results when viscoelastic parameters were extracted from PC filtered displacement profiles versus bandpass filtered profiles.

Example 3

Complex PCF for Improved Blood Velocity Estimation

Complex PCF was also applied to M-mode (where "M" stands for "motion") RF data obtained in the left carotid artery of a twenty-three year old healthy male subject. In this experimental setting, ensembles of raw RF echo data were collected at a sampling frequency of 40 Mhz, PRF of 10 kHz, and a center frequency of 5 MHz using an Ultrasonix Sonix PP scanner and a L14-5 linear array transducer (Ultrasonix, Vancouver, BC, Canada). The scanner was modified to acquire an ensemble of one hundred fifty six A-lines from transmitted pulses with a fractional bandwidth of approximately twenty-five percent. Returning echoes from the carotid artery were arranged into thirteen ensembles with twelve A-lines per ensemble. Wall filtering was performed across the slow time dimension with a 50 tap, digital FIR high pass filter that had a cutoff frequency of 120 Hz. The ensembles were then processed using a conventional blood velocity estimation technique that included a bandpass filter and the Loupas TDE algorithm as described in Loupas et al., "Experimental evaluation of velocity and power estimation for ultrasound blood flow imaging, by means of a two-dimensional autocorrelation approach", IEEE Trans Ultrason Ferroelect Freq Contr 1995; 42:689-699, which is hereby incorporated herein, in its entirety, by reference thereto. This method was compared to the PCF method of the present invention using the same Loupas TDE algorithm. In the PCF instance, the PCF kernel window length corresponded to 5 periods. A TDE kernel length corresponding to 1.5 periods was utilized in both bandpass and PCF instances. Because the center frequency in blood flow experiments (5 Mhz) was half of the center frequency used for sonorheometry (10 Mhz), the spatial extent of the PCF kernel window corresponded to approximately 1.5 mm in both instances. Just as there are tradeoffs to consider when choosing kernel lengths for time delay estimation, there exist similar tradeoffs between PCF performance and spatial sensitivity when choosing the appropriate PCF kernel length. These tradeoffs are further discussed below.

Figure 20A:
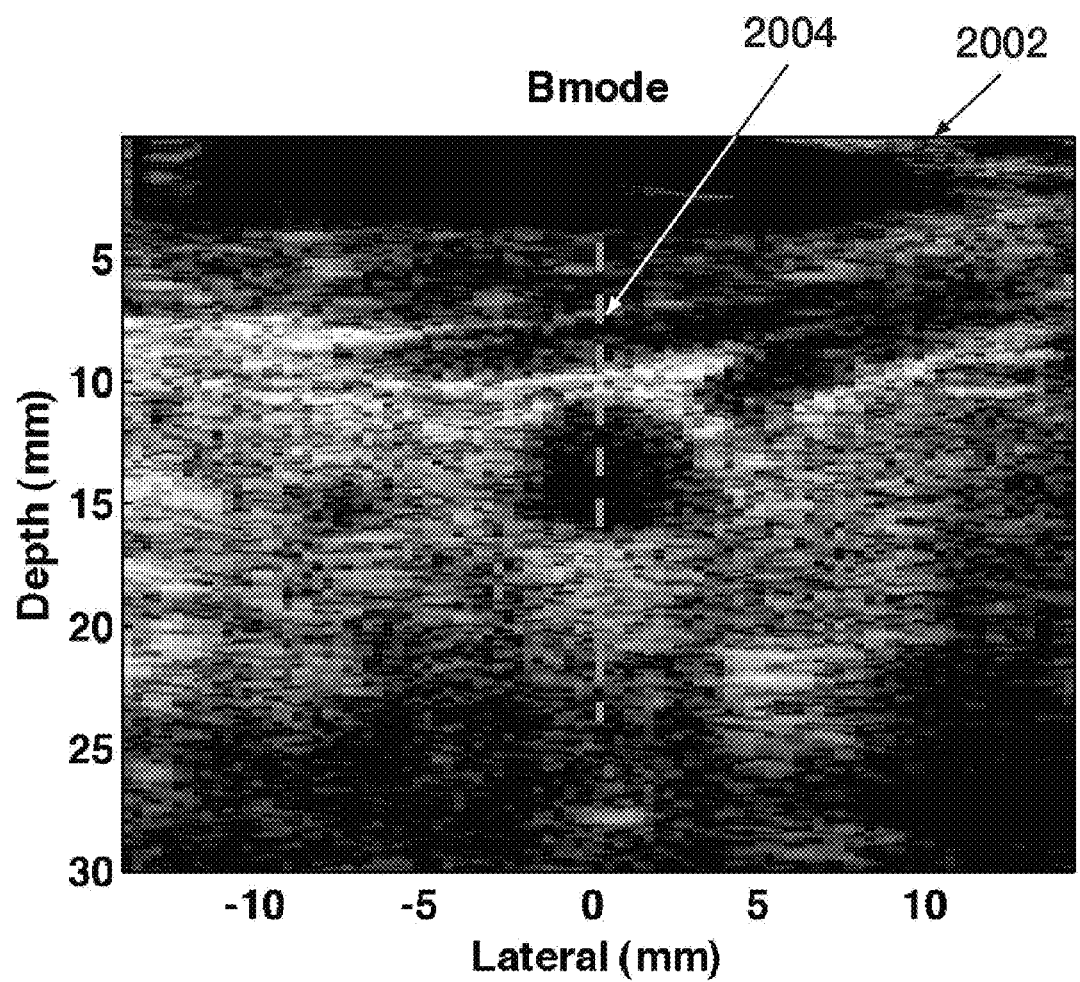
FIG. 20A shows a B-mode image taken of the left carotid artery of a twenty-three year old male volunteer.
Figure 20B:
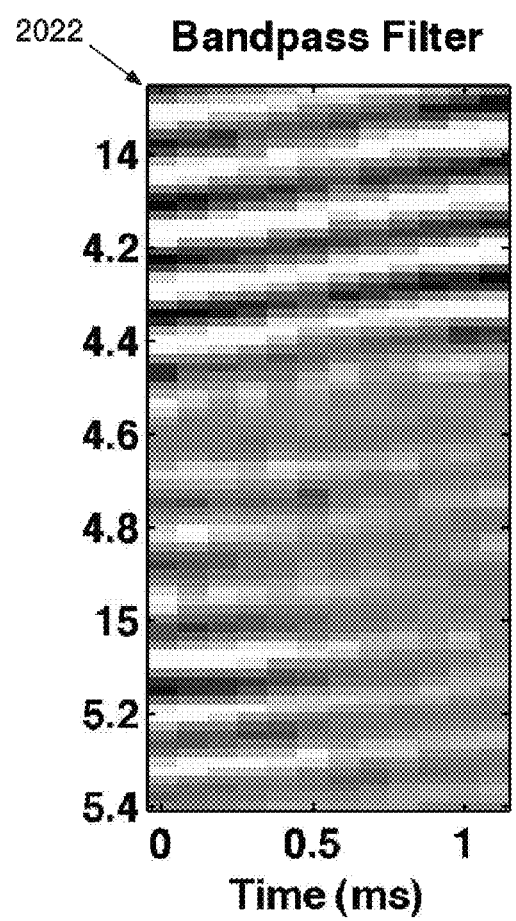
FIGS. 20B and 20C show a PC filtered RF ensemble and a bandpass filtered RF ensemble, respectively.
Figure 20C:
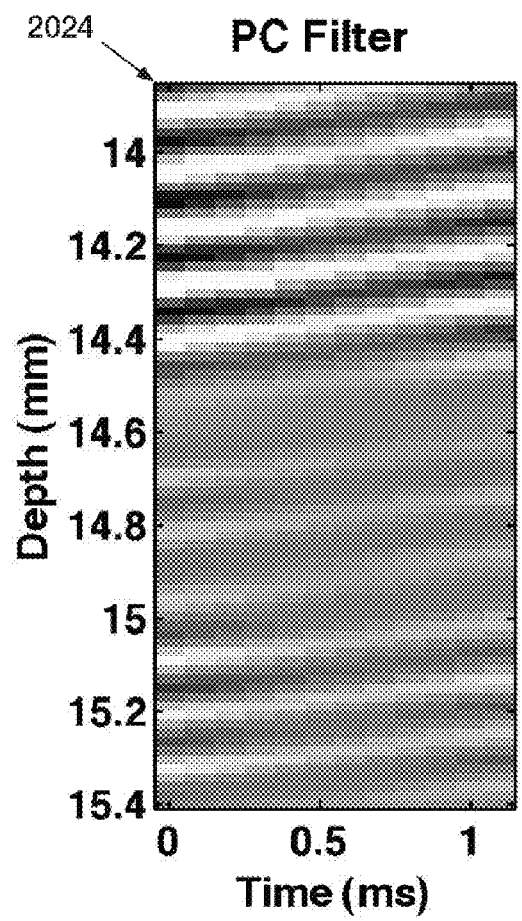

In clinical blood velocity estimation, complex PCF was applied to ensembles of twelve interrogations with a $T_{PCF}$ length of five periods. A B-mode image 2002 from the left carotid artery of the twenty-three year old male volunteer is shown in FIG. 20A. The dotted line 2004 marks the line of interrogation for the M-mode RF data that was that was acquired, as discussed above. In this setting, complex PCF improved RF correlation and provided apparently less noisy velocity profiles. The dramatic improvement in correlation is illustrated in FIGS. 20B and 20C where the PC filtered RF ensemble 2024 of FIG. 20C shows a marked reduction in data corruption from decorrelation, compared to the bandpass filtered RF ensemble 2022 in FIG. 20B.

Figure 20D:
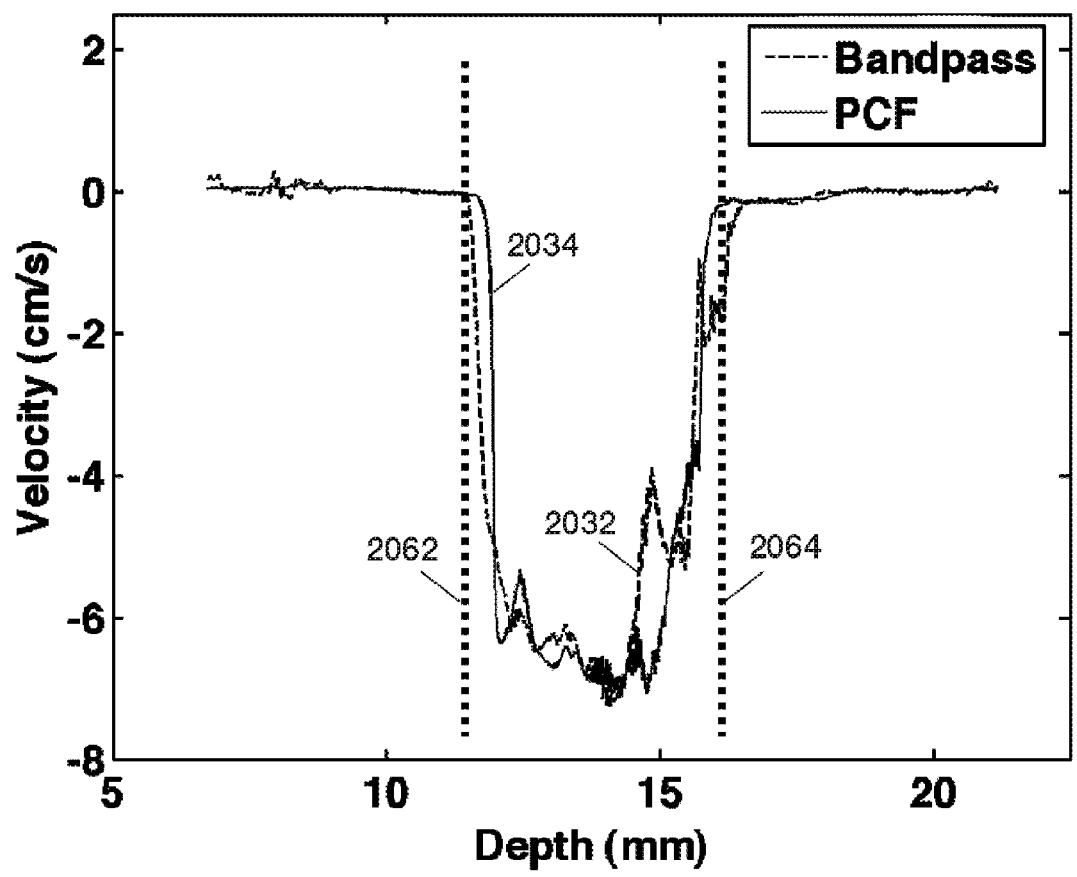
FIG. 20D shows velocity profiles from both bandpass and Loupas or PCF and Loupas methods.
Figure 20E:
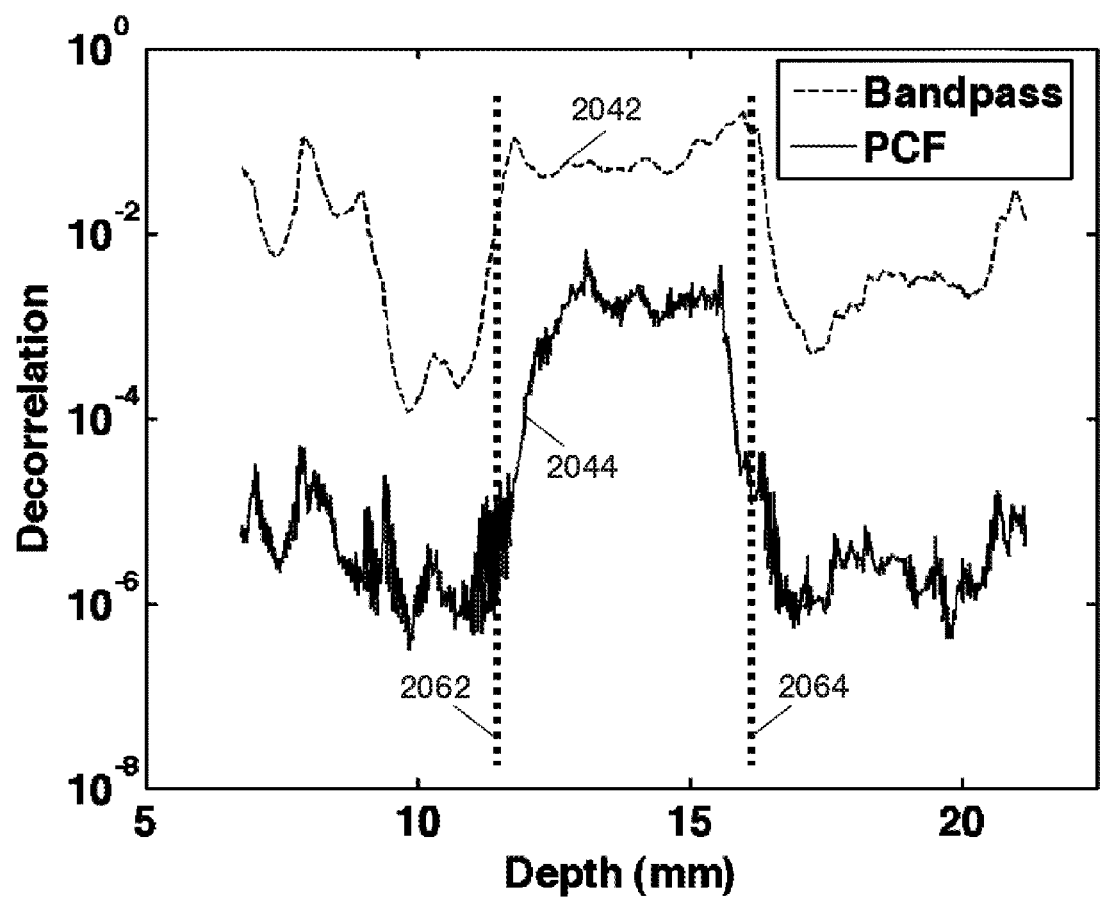
FIG. 20E shows the reduction in decorrelation across interrogation depth for both the bandpass and Loupas method, and the PCF and Loupas method.

Further, FIG. 20E illustrates the reduction in decorrelation across interrogation depth for both the bandpass and Loupas method 2042 and the PCF and Loupas method 2044, and FIG. 20D displays velocity profiles from both bandpass and Loupas 2032 or PCF and Loupas 2034 methods. In both FIGS. 20D and 20E, the dotted lines 2062 and 2064 indicate the depths at which the proximal and distal left carotid artery walls were located. At the peak velocity depth of approximately 14 cm as displayed in FIG. 20D, correlation between echoes N and N−1 improved from an average of 0.94 with bandpass filtering to an average of 0.998 with complex PCF. Since the interrogation angle was not factored into the blood velocity measurements, the values reported in FIG. 20D do not represent the true blood velocity in the carotid. Instead, it is likely that these velocities are underestimated.

Thus, if the angle of interrogation between the transducer and the vessel wall was assumed to be 15 degrees, then the calculated measurements would represent blood velocities in the carotid artery of approximately 27 cm/s. FIG. 20D shows that the PCF and Loupas technique produced cleaner velocity profiles, which appeared more physiologically accurate. This included a peak velocity near the center of the vessel and decreasing velocity toward the vessel walls. In contrast, the bandpass and Loupas method showed a velocity profile with a much rougher response through depth and an unanticipated hump in the velocity profile near 15 mm in depth.

In contrast to the sonorheometry application, the highest energy signal in blood flow estimation was not necessarily the desired signal from blood. If the received echo data was corrupted by clutter or reverberation signal that was higher in amplitude than signal from the blood, then complex PCF would not capture the blood velocity characteristics with the first PC. Instead the first PC would reflect the higher energy signal from reverberations or clutter. This problem was avoided by applying a wall filter prior to performing complex PCF, so that, upon performing complex PCF, the first PC could be reliably used to capture the blood velocity characteristics. A similar assumption of clutter rejection applies to the Loupas algorithm. However, this assumption of the highest energy signal corresponding to signal from blood is not necessary for complex PCF to operate in blood flow estimation. For instance, if there is no wall filter applied to the echo data, then complex PCF could be applied to blood velocity estimation by retaining only the second PC, which would correspond to the next highest energy signal or blood in this example.

Example 4

Simulation Methods—PCDE

Simulations were performed by generating synthetic ultrasound data in MATLAB. A-lines were formed by convolving the acoustic targets, modeled as Gaussian white noise, with the PSF of the ultrasound pulse, which was represented as a Gaussian enveloped sinusoid. In order to produce known subsample or sample delays between a reference and delayed echo signal, simulated data were oversampled by a factor of forty. These signals were then decimated starting at different samples to produce reference and delayed signals with a know delay. Gaussian white noise was added to the reference and shifted signals to produce a desired SNR and two sources of decorrelation were introduced to test the robustness of the various algorithms, Default simulation parameters are listed in Table 2.

TABLE 2

| Parameter | Value |
| --- | --- |
| Center frequency ($f_0$) | 8 MHz |
| Sampling frequency ($f_s$) | 40 MHz |
| Signal-to-Noise Ratio (SNR) | 25 dB |
| Fractional Bandwidth (BW) | 50% |
| Kernel Length | 3 periods |
| Speckle Correlation ($\rho$) | 0.98 |
| Differential Motion Weighting ($\alpha$) | 1 |
| $\Delta\tau_1:\Delta\tau_2:\Delta\tau_3$ | $1:\frac{1}{2}:\frac{1}{4}$ samples |
| $w_1:w_2:w_3$ | $1:1/\sqrt{2}:\frac{1}{2}$ samples |

As expressed by the Cramer-Rao lower-bound (e.g., see equation (1), decorrelation is a major limitation on motion estimation performance. In general, there are two classifications of decorrelation based upon their respective physical sources. One source of decorrelation arises from new acoustic targets moving in and out of the acoustic beam through time. This type of decorrelation is most characteristic of applications with large displacements such as in elastography and blood flow estimation. This classification of decorrelation is referred to herein as "speckle decorrelation" since the underlying speckle pattern is decorrelated through time. Speckle decorrelation was modeled in the simulations by specifying a correlation value and using Cholesky factorization, e.g., see Viola et al. "A spline-based algorithm for continuous time-delay estimation using sampled data", IEEE Trans Ultrason Ferroelect Freq Contr. 52(1):80-93, 2005; and Walker W., "The significance of correlation in ultrasound signal processing", SPIE Medical Imaging Proceedings 2000, both of which are hereby incorporated herein, in their entireties, by reference thereto.

Another source of decorrelation originates from a gradient of displacements across the lateral and elevational point spread function (PSF) of the acoustic beam. This is a fundamentally different source of decorrelation from the aforementioned speckle decorrelation since the underlying acoustic targets do not necessarily leave or enter the acoustic beam through acquisition time, they rather only exhibit differential axial displacement with respect to one another. While all motion estimation applications are subject to this type of differential motion across the PSF, acoustic radiation force imaging applications are especially susceptible.

Figure 21A:
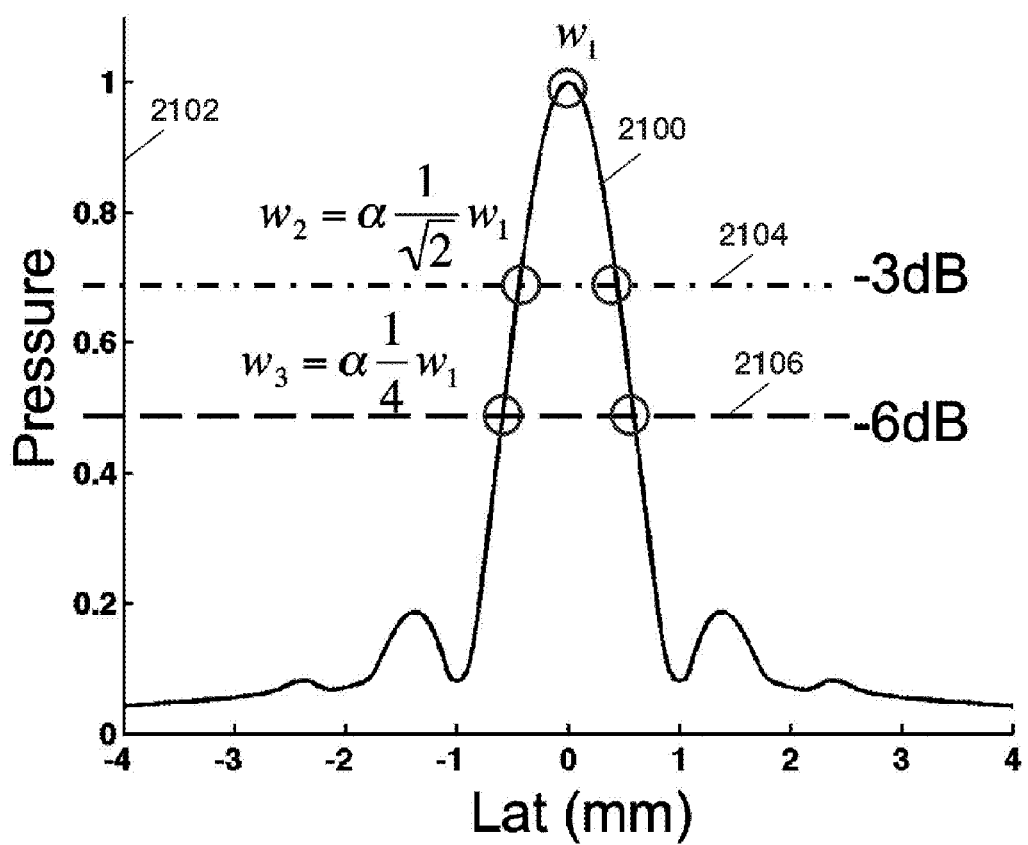
FIGS. 21A-21B illustrate modeling of decorrelation originating from a gradient of displacements across the lateral and elevational point spread function (PSF) of the acoustic beam in the simulations.
Figure 21B:
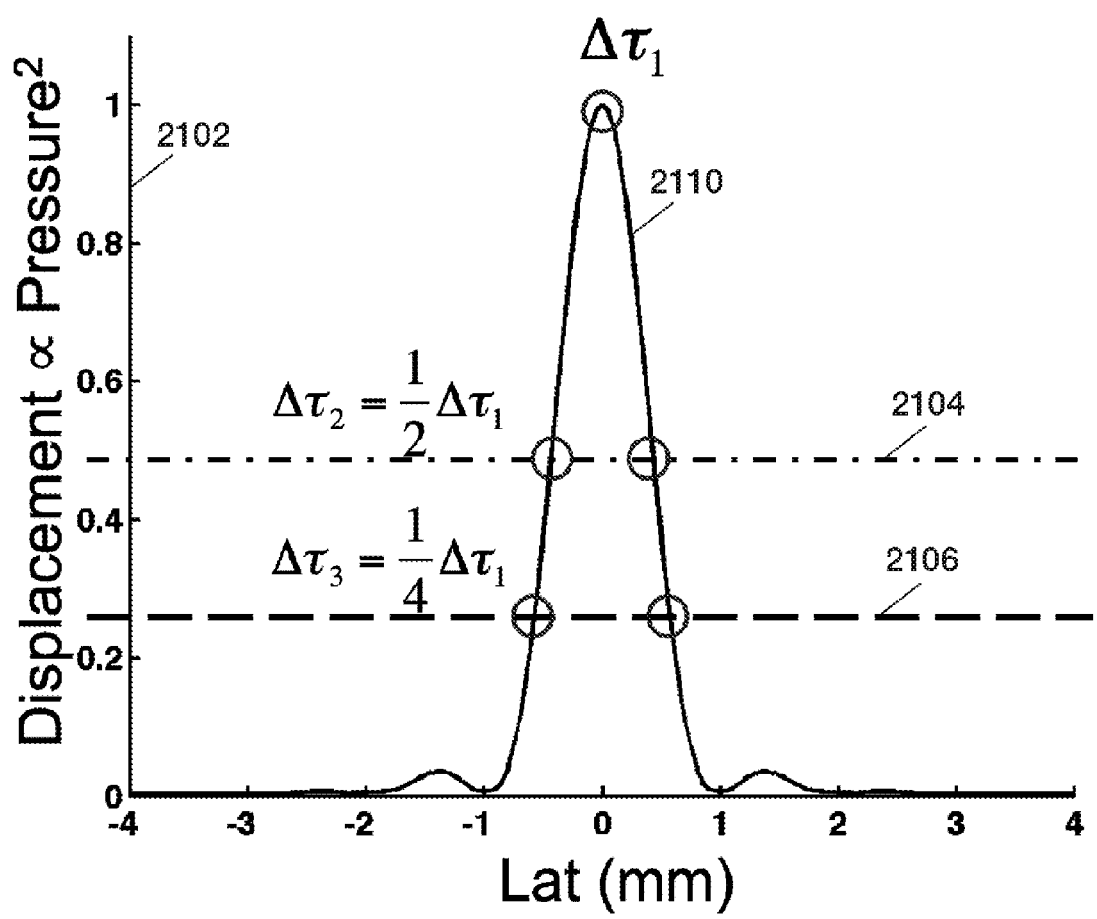

FIGS. 21A-21B illustrate modeling of decorrelation originating from a gradient of displacements across the lateral and elevational point spread function (PSF) of the acoustic beam in the simulations by summing three independent signals, located at the 0 dB 2102, −3 dB 2104, and −6 dB 2106 locations of the lateral PSF. The simulated ensemble of echo data $S_T$, is modeled as the summation of three independent echo signals that correspond to locations at 0 dB, −3 dB and −6 dB:

$$s_T(\Delta\tau_T) = w_1 s_1(\Delta\tau_1) + \alpha \sum_{j=2}^{3} w_j s_j(\Delta\tau_j) \qquad (28)$$

The time delay, Δτ, (see FIG. 21B), corresponding to each echo signal was assumed to be proportional to intensity or squared pressure. The parameter, α, was varied in simulation to model a change in scaling of differential displacement signals to represent differential displacement signals that might have resulted from different f/#'s between pushing and tracking pulses. Neglecting mechanical coupling and assuming that displacement is proportional to intensity, the ratio of signal displacements, $\Delta\tau_1 = 2\Delta\tau_2 = 4\Delta\tau_3$, was represented as the squared pressure value at each lateral location of the PSF 2110 (FIG. 21B). The ratio of weighting values for each independent signal component, $w_1 = \sqrt{2}w_2 = 2w_3$, were assigned according to the ratio of pressures at the 0 dB, −3 dB, and 6 dB locations of the PSF 2100 (FIG. 21A). The attenuation parameter, α was varied in simulation to decimate or intensify decorrelation originating from differential motion signal components $s_2$ and $s_3$. In practice, differential motion decorrelation may vary due to non-uniform mechanical properties across the span of the PSF or by changing f/#'s used for pushing and tracking pulses.

Figure 22A:
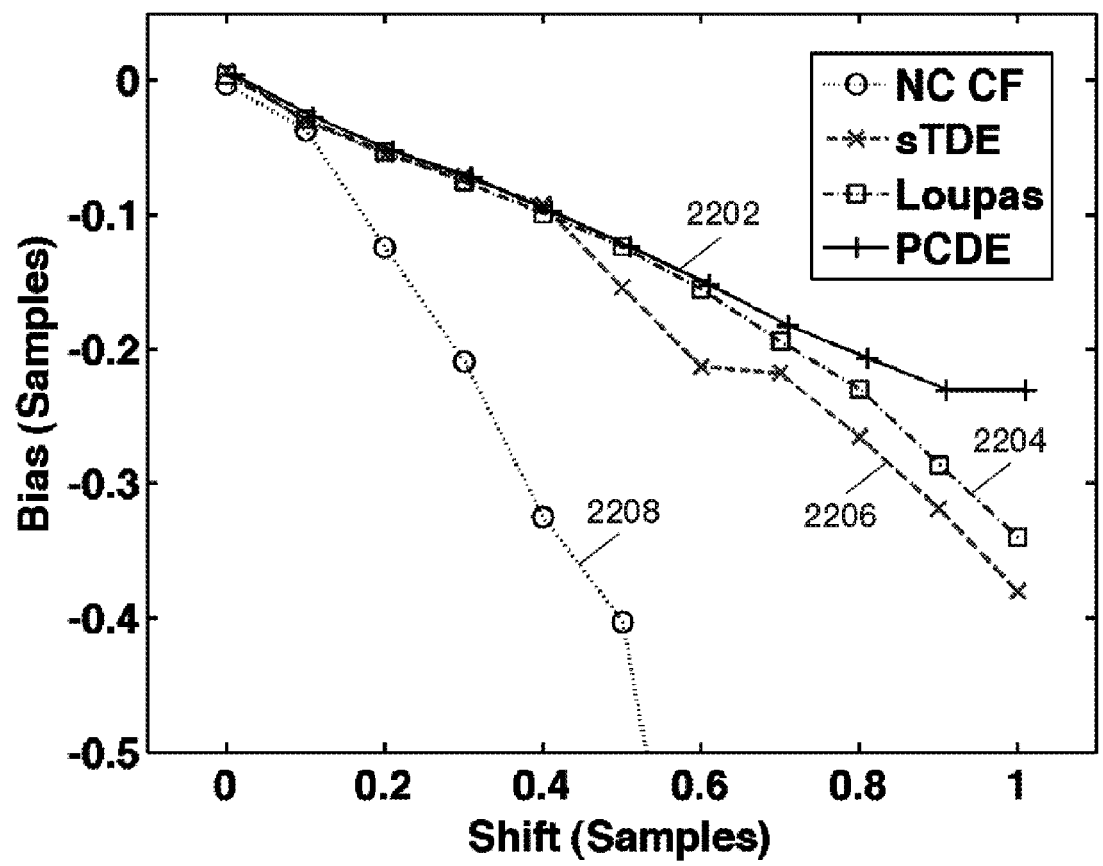
FIG. 22A shows average bias over one thousand trial runs for PCDE, Loupas, sTDE, and normalized cross-correlation with cosine fitting (NC CF) where subsample shifts were varied between zero and one samples.
Figure 22B:
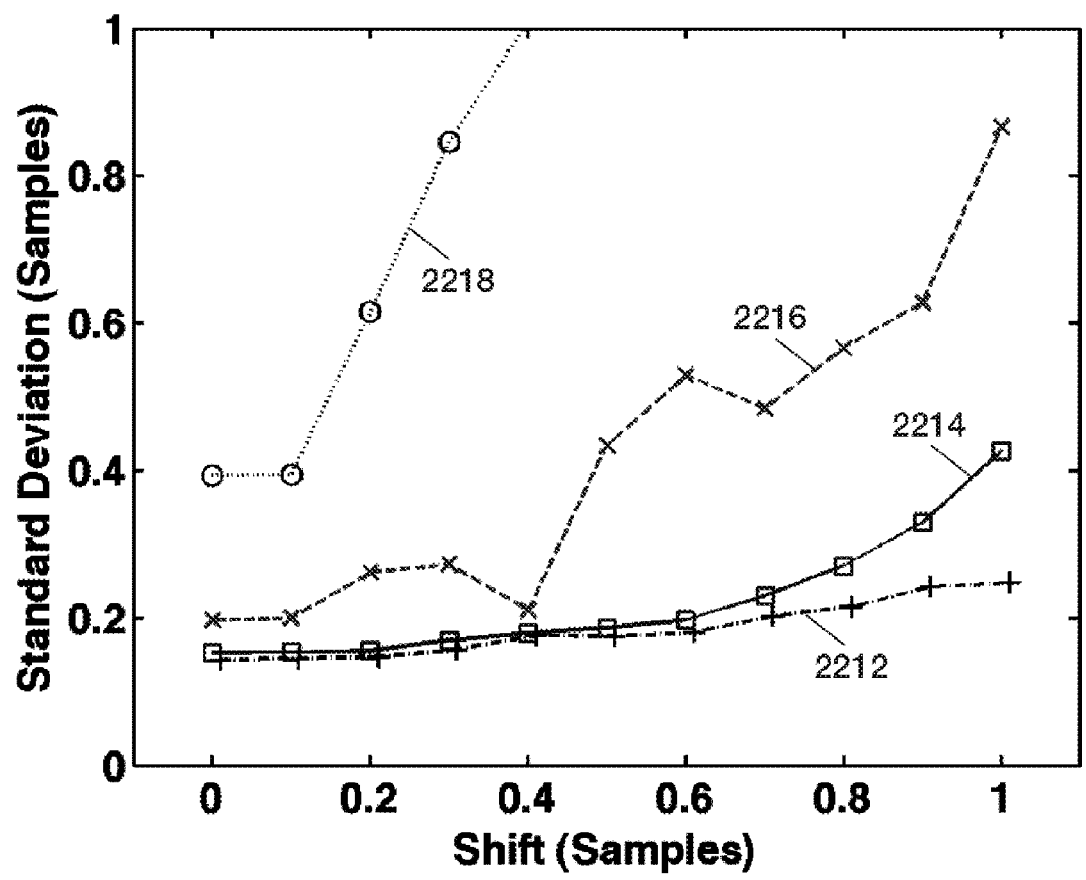
FIG. 22B shows standard deviation values for PCDE, Loupas, sTDE, and NC CF where subsample shifts were varied between zero and one samples.

FIG. 22A shows average bias over one thousand trial runs for PCDE 2202, Loupas 2204, sTDE 2206, and normalized cross-correlation with cosine fitting (NC CF) 2208, another known technique, where, for each technique, subsample shifts were varied between zero and one samples. FIG. 22B shows standard deviation values for PCDE 2212, Loupas 2214, sTDE 2216, and NC CF 2218 where subsample shifts were varied between zero and one samples.

Figure 23A:
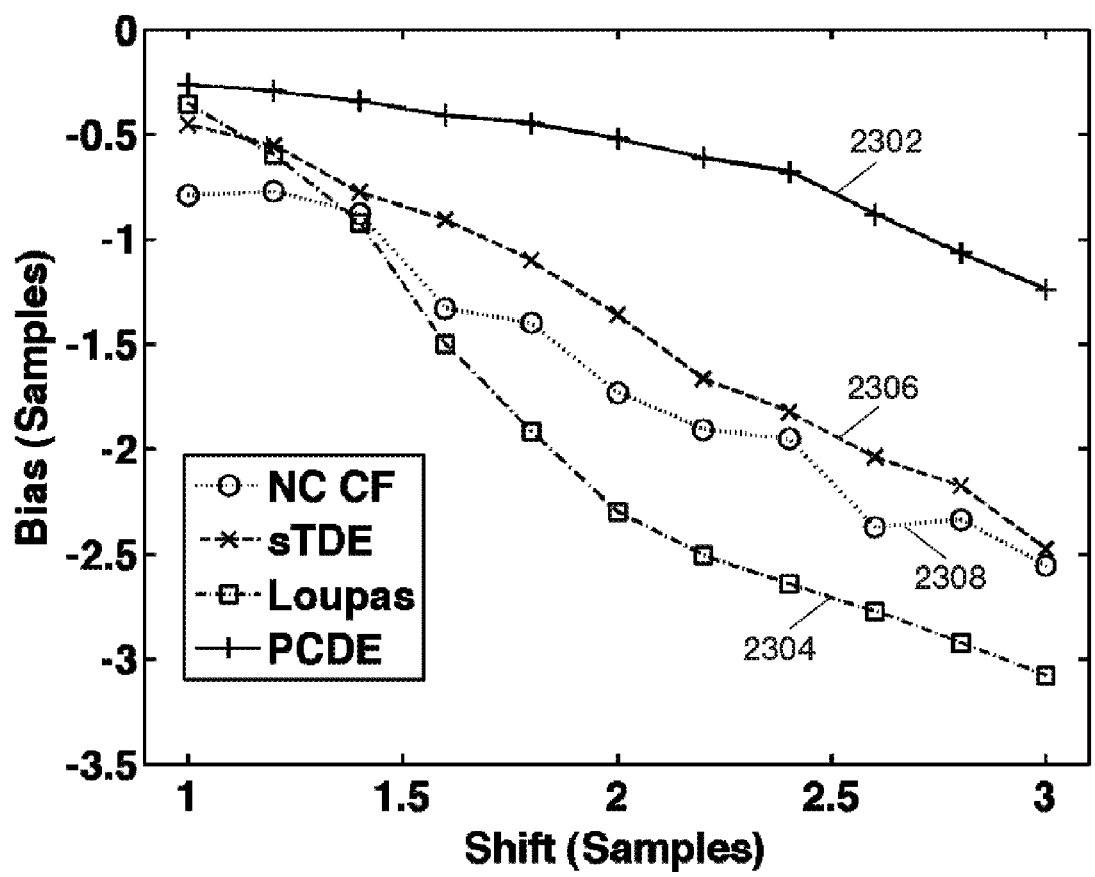
FIG. 23A shows average bias over one thousand trial runs for PCDE, Loupas, sTDE, and NC CF where subsample shifts were varied between one and three samples.
Figure 23B:
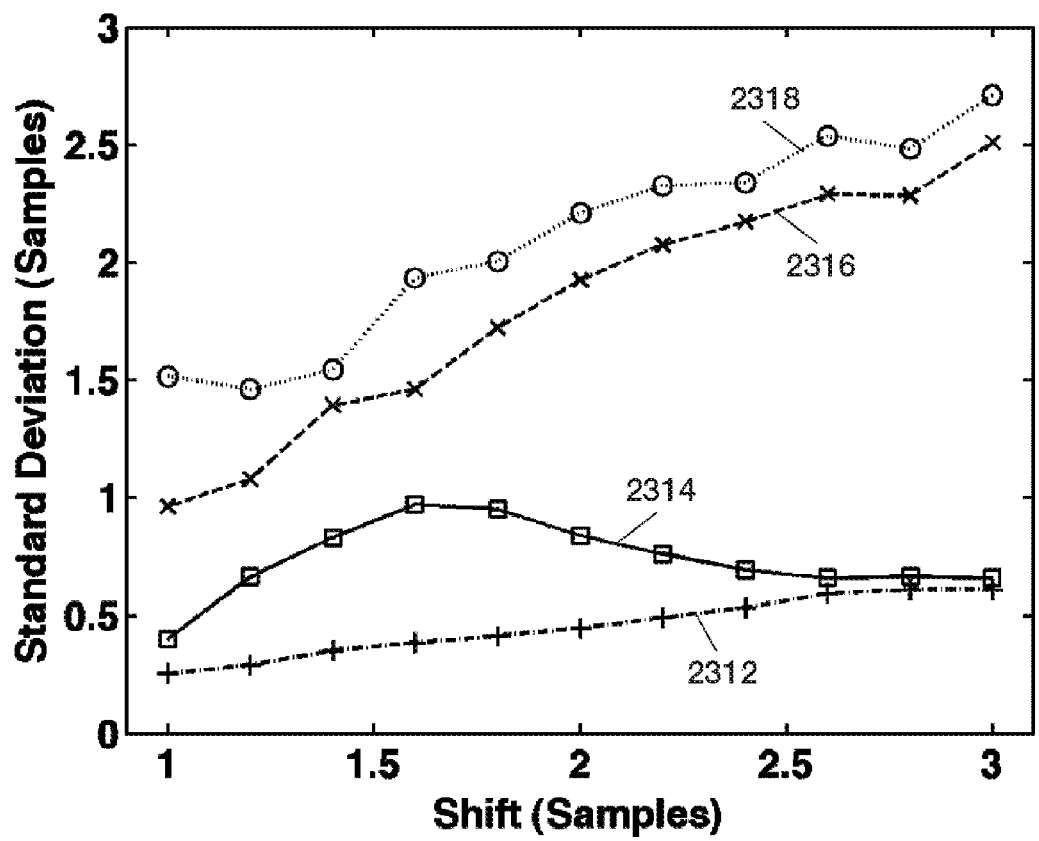
FIG. 23B shows standard deviation values for PCDE, Loupas, sTDE, and NC CF where subsample shifts were varied between one and three samples.

FIG. 23A shows average bias over one thousand trial runs for PCDE 2302, Loupas 2304, sTDE 2306, and NC CF 2308 where subsample shifts were varied between one and three samples. FIG. 23B shows standard deviation values for PCDE 2312, Loupas 2314, sTDE 2316, and NC CF 2318 where subsample shifts were varied between one and three samples.

Figure 24A:
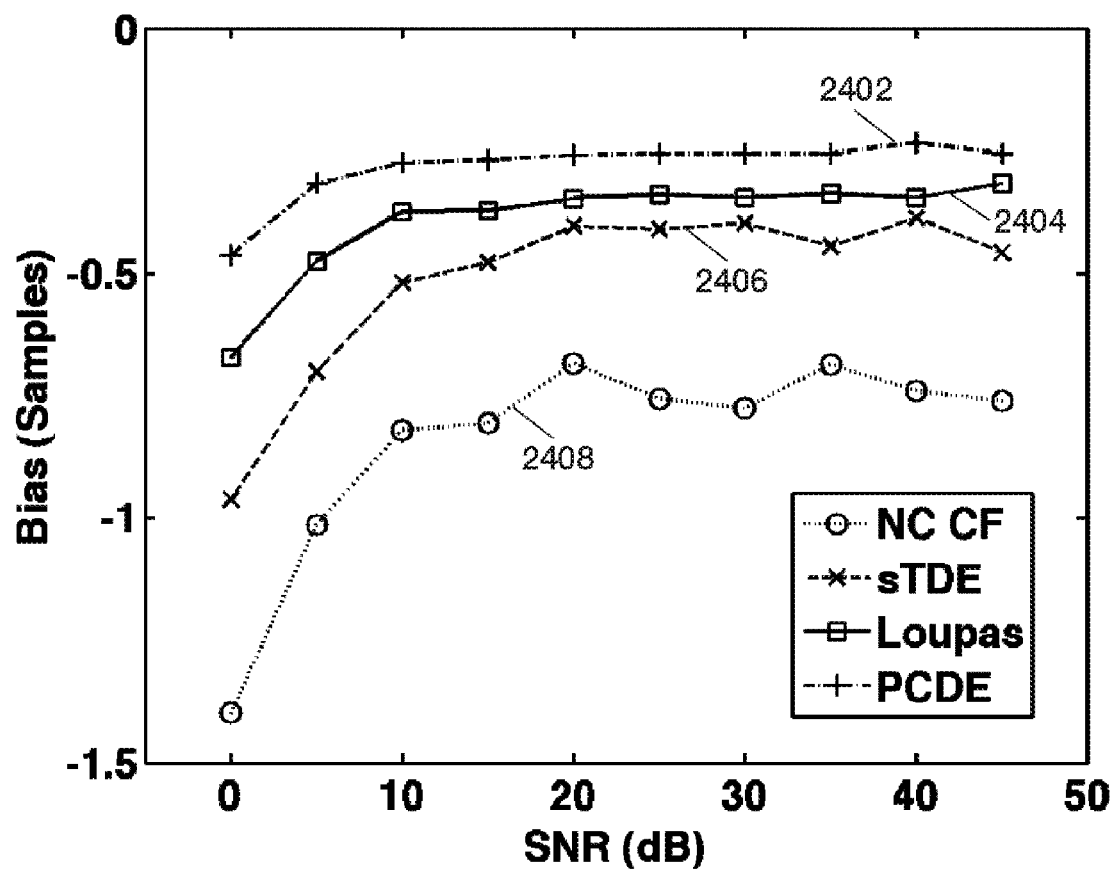
FIG. 24A shows average bias over one thousand trial runs for PCDE, Loupas, sTDE, and NC CF where SNR was varied between 0 dB and 45 dB.
Figure 24B:
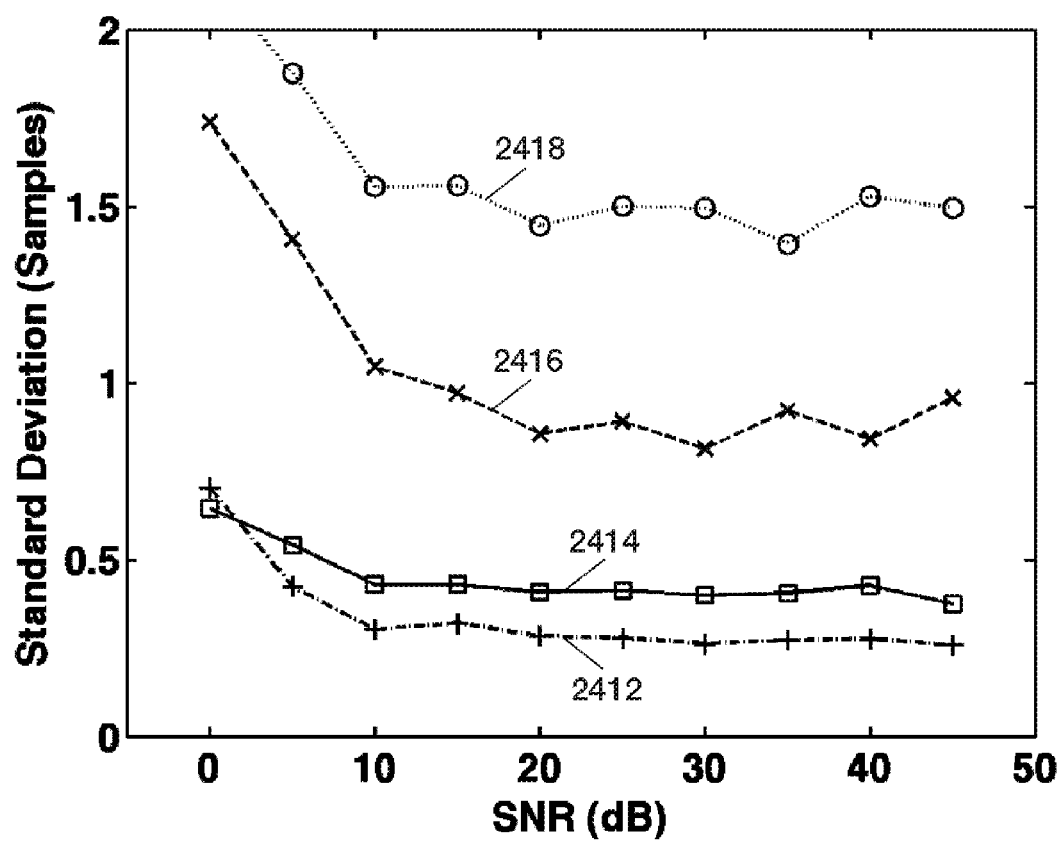
FIG. 24B shows standard deviation values for PCDE, Loupas, sTDE, and NC CF where SNR was varied between 0 dB and 45 dB.

FIG. 24A shows average bias over one thousand trial runs for PCDE 2402, Loupas 2404, sTDE 2406, and NC CF 2408 where SNR was varied between 0 dB and 45 dB. FIG. 24B shows standard deviation values for PCDE 2412, Loupas 2414, sTDE 2416, and NC CF 2418 where SNR was varied between 0 dB and 45 dB.

Figure 25A:
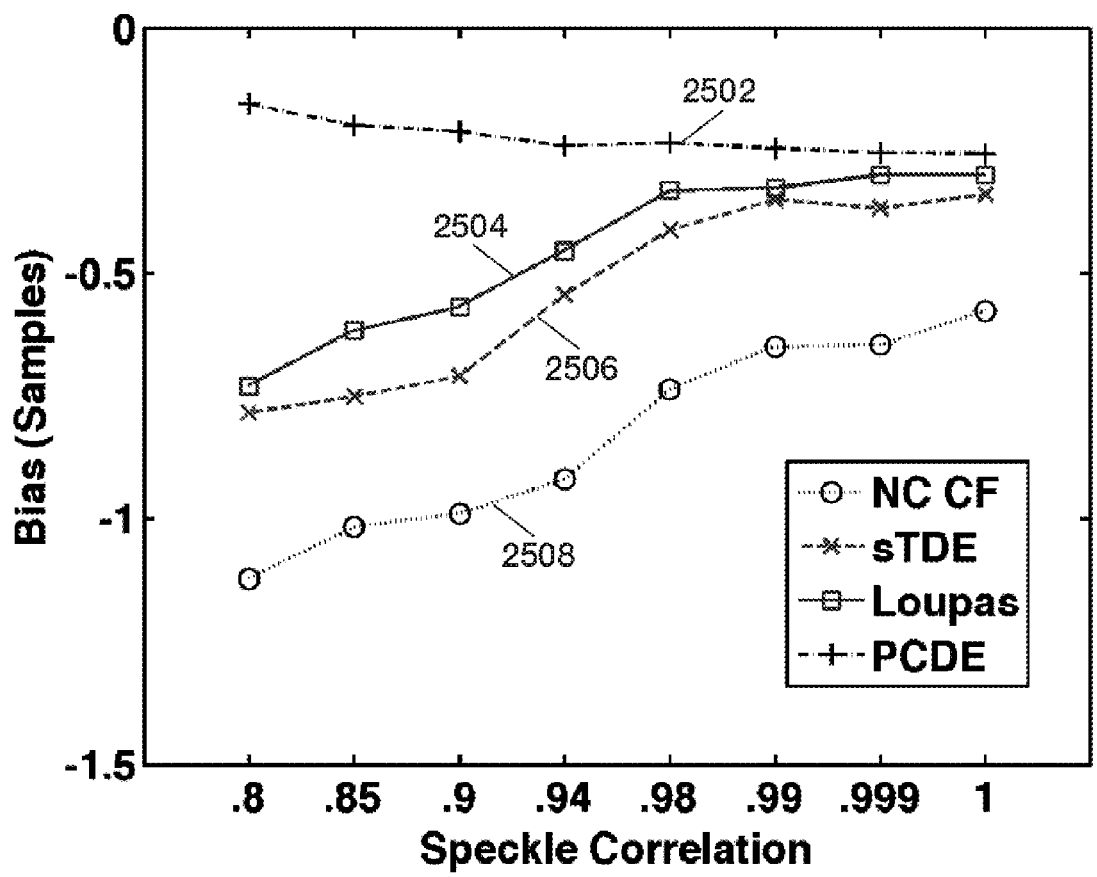
FIG. 25A shows average bias over one thousand trial runs for PCDE, Loupas, sTDE, and NC CF where speckle decorrelation was varied between 0.80 and 1.0.
Figure 25B:
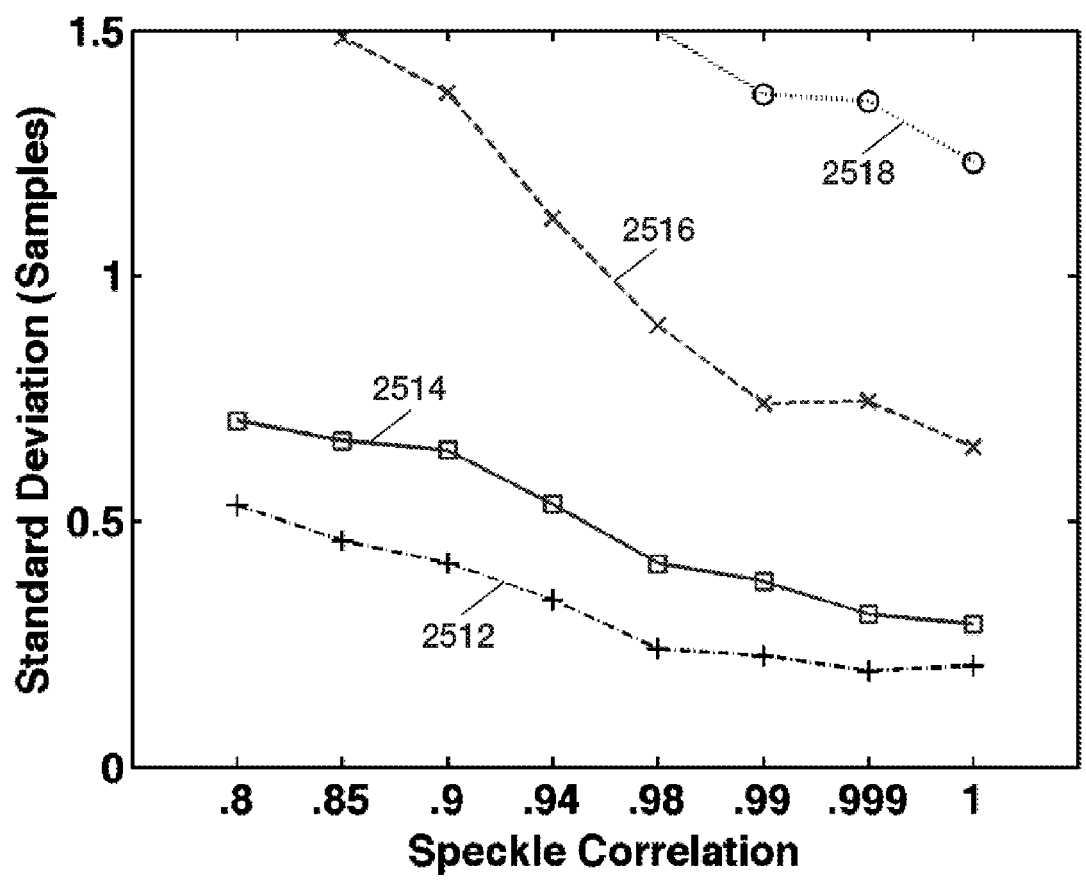
FIG. 25B shows standard deviation values for PCDE, Loupas, sTDE, and NC CF where speckle decorrelation was varied between 0.80 and 1.0

FIG. 25A shows average bias over one thousand trial runs for PCDE 2502, Loupas 2504, sTDE 2506, and NC CF 2508 where speckle decorrelation was varied between 0.80 and 1.0. For illustrative purposes, the X-axis is not drawn to scale. FIG. 25B shows standard deviation values for PCDE 2512, Loupas 2514, sTDE 2516, and NC CF 2518 where speckle decorrelation was varied between 0.80 and 1.0. For illustrative purposes, the X-axis is not drawn to scale.

Figure 26A:
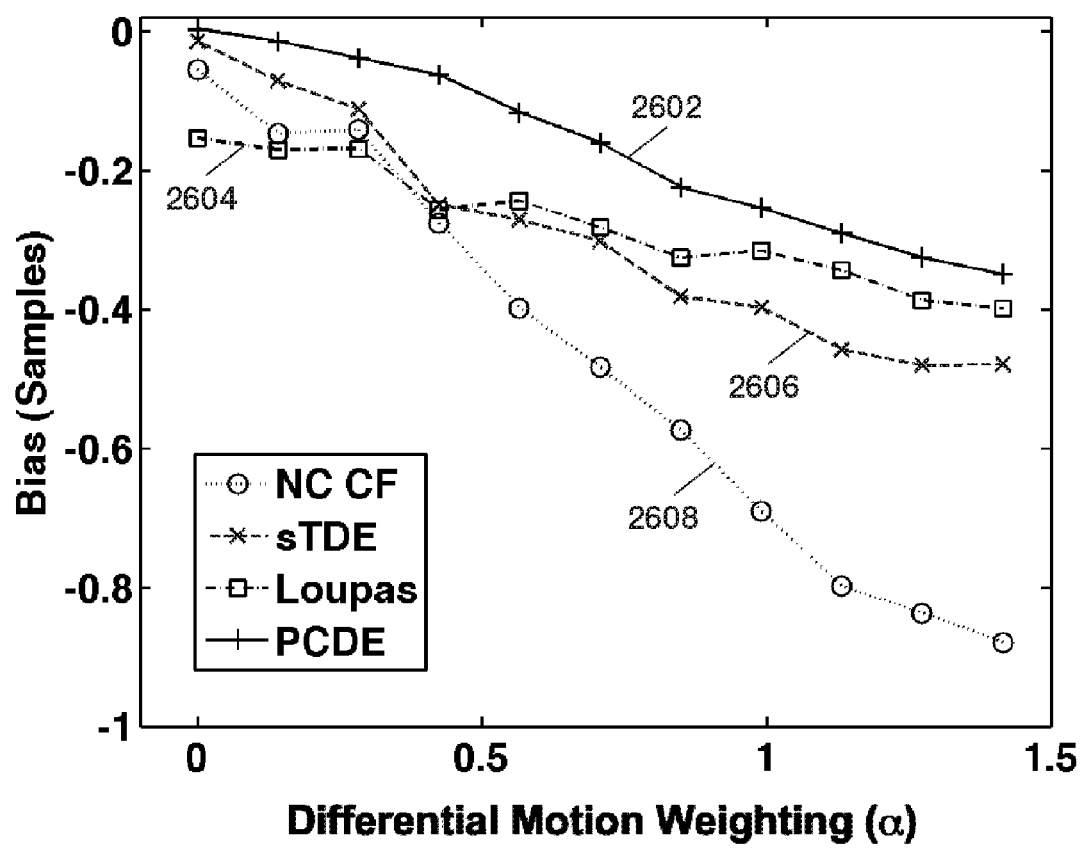
FIG. 26A shows average bias over one thousand trial runs for PCDE, Loupas, sTDE, and NC CF where the differential motion weighting parameter, $\alpha$, was varied between 0 and 1.4.
Figure 26B:
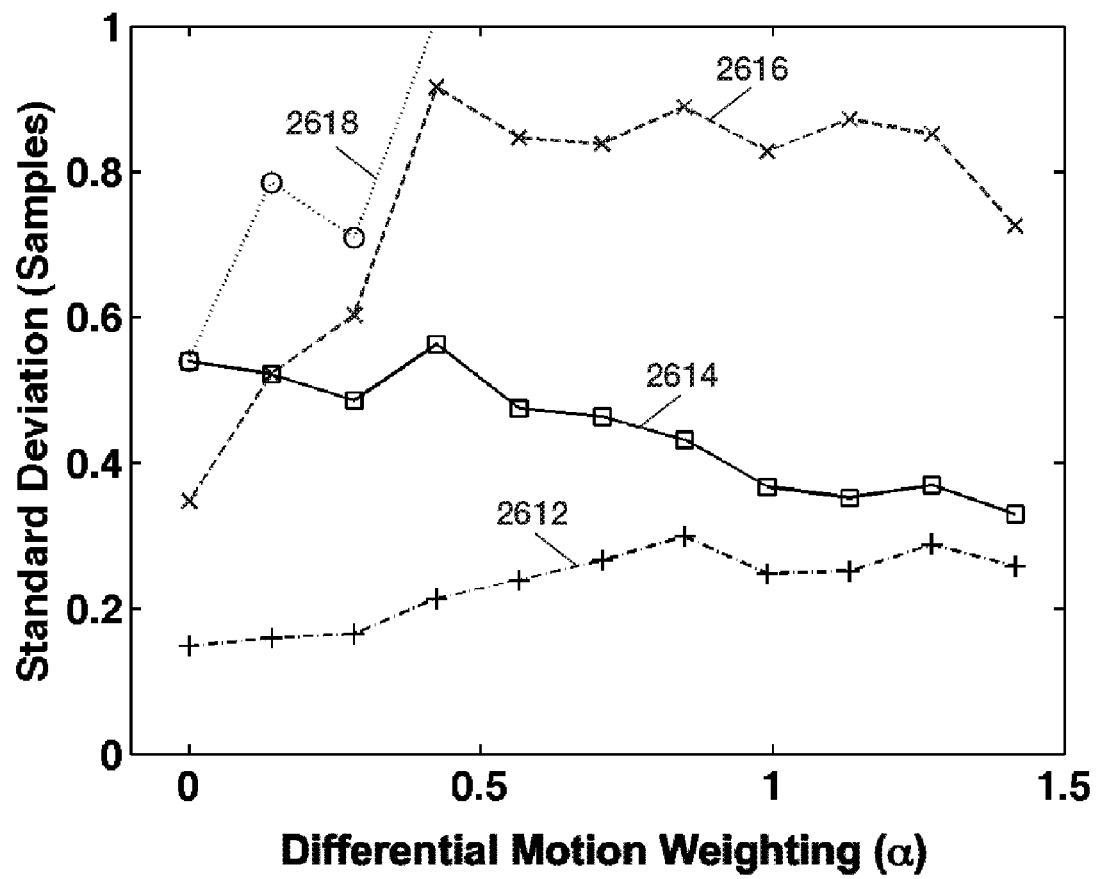
FIG. 26B shows standard deviation values for PCDE, Loupas, sTDE, and NC CF where the differential motion weighting parameter, $\alpha$, was varied between 0 and 1.4.

FIG. 26A shows average bias over one thousand trial runs for PCDE 2602, Loupas 2604, sTDE 2606, and NC CF 2608 where the differential motion weighting parameter, α, was varied between 0 and 1.4. FIG. 26B shows standard deviation values for PCDE 2612, Loupas 2614, sTDE 2616, and NC CF 2618 where the differential motion weighting parameter, α, was varied between 0 and 1.4.

Figure 27A:
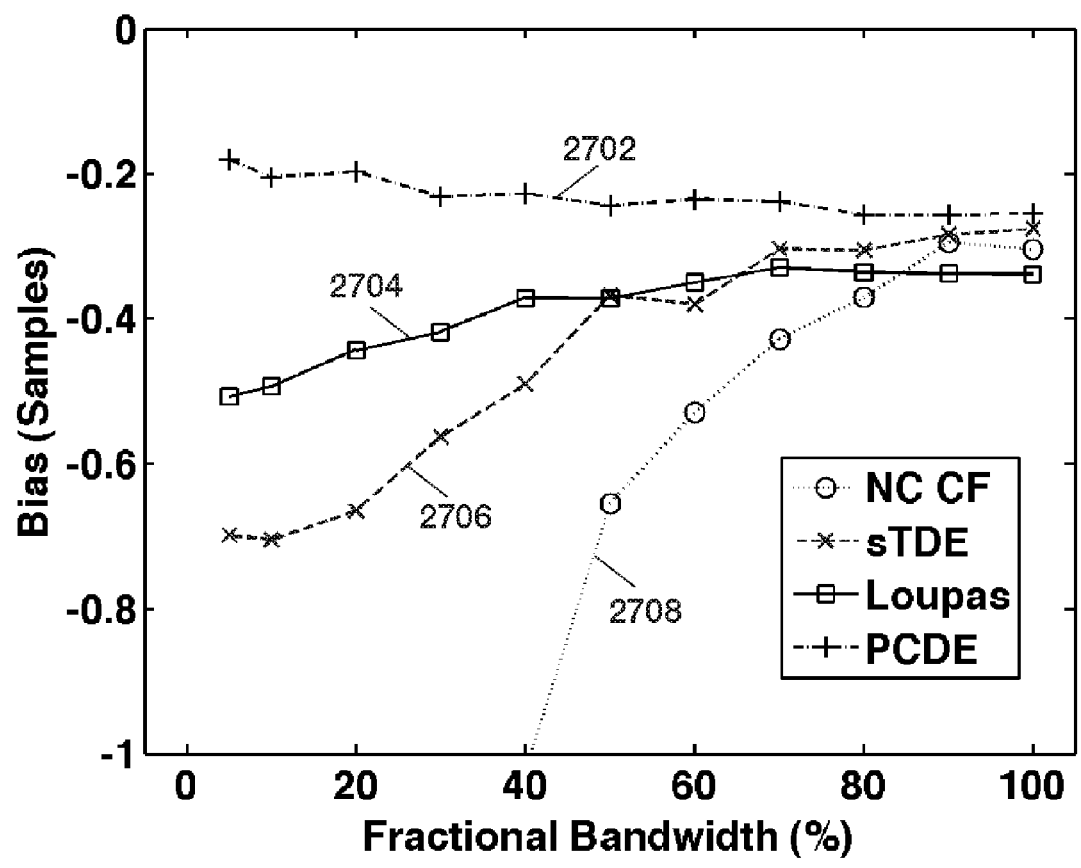
FIG. 27A shows average bias over one thousand trial runs for PCDE, Loupas, sTDE, and NC CF where the fractional bandwidth was varied between 5% and 100%.
Figure 27B:
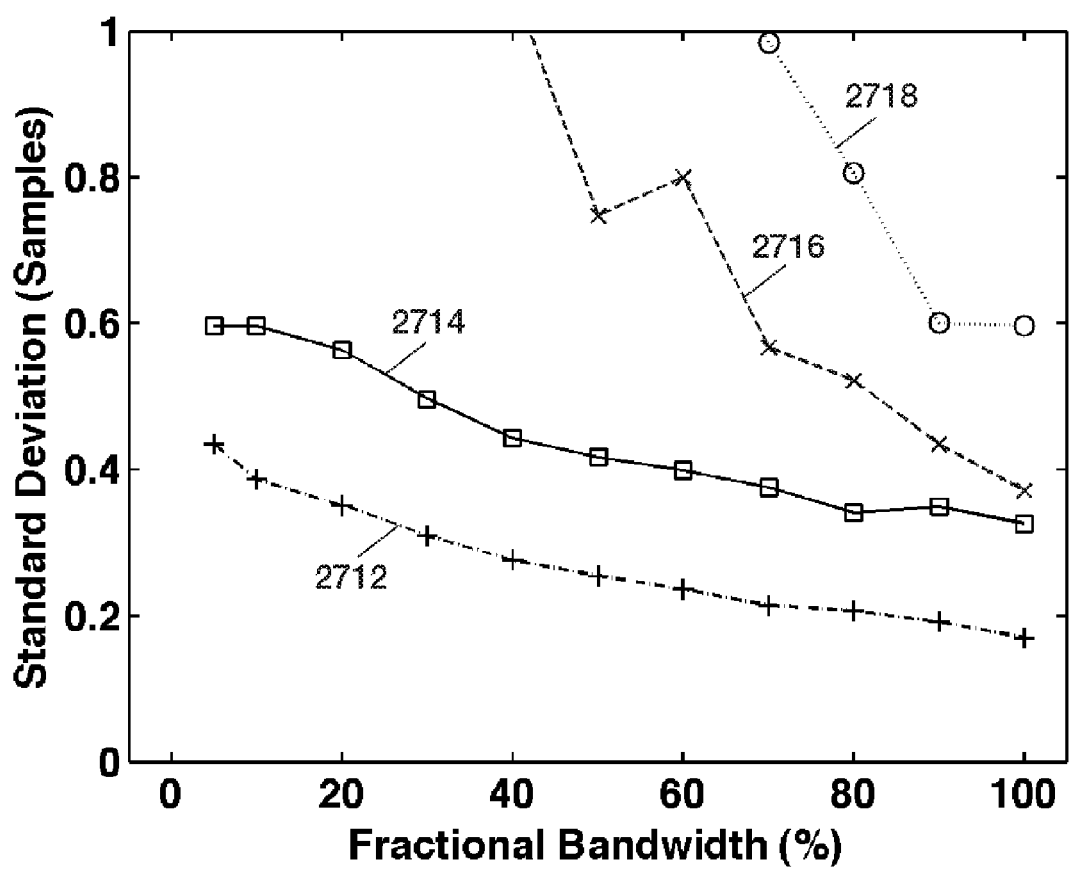
FIG. 27B shows standard deviation values for PCDE, Loupas, sTDE, and NC CF where the fractional bandwidth was varied between 5% and 100%.

FIG. 27A shows average bias over one thousand trial runs for PCDE 2702, Loupas 2704, sTDE 2706, and NC CF 2708 where the fractional bandwidth was varied between 5% and 100%. FIG. 27B shows standard deviation values for PCDE 2712, Loupas 2714, sTDE 2716, and NC CF 2718 where the fractional bandwidth was varied between 5% and 100%.

Figure 28A:
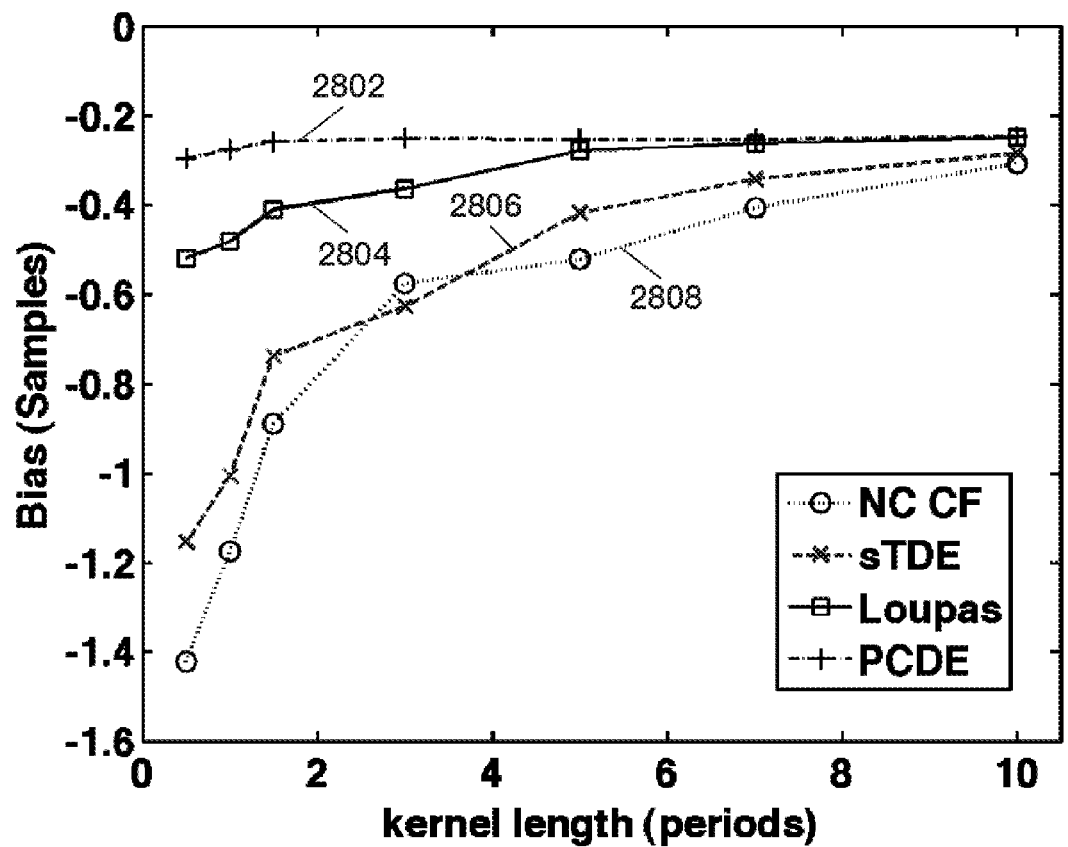
FIG. 28A shows average bias over one thousand trial runs for PCDE, Loupas, sTDE, and NC CF where the kernel length was varied between 0.5 and 10 periods.
Figure 28B:
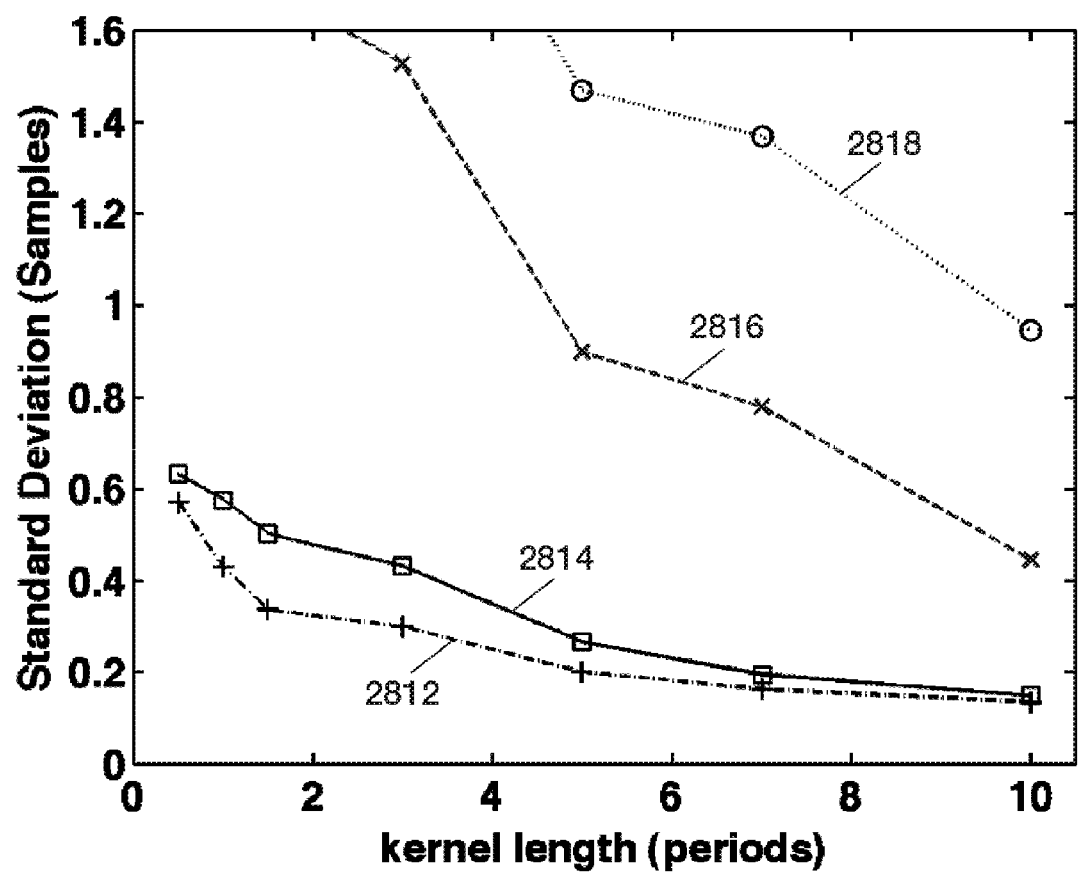
FIG. 28B shows standard deviation values for PCDE, Loupas, sTDE, and NC CF where the kernel length was varied between 0.5 and 10 periods.

FIG. 28A shows average bias over one thousand trial runs for PCDE 2802, Loupas 2804, sTDE 2806, and NC CF 2808 where the kernel length was varied between 0.5 and 10 periods. FIG. 28B shows standard deviation values for PCDE 2812, Loupas 2814, sTDE 2816, and NC CF 2818 where the kernel length was varied between 0.5 and 10 periods.

Simulation results in FIG. 22A-28B illustrate that PCDE exhibits superior estimation performance in terms of bias and standard deviation when compared to NC CF, the Loupas method, and sTDE over a wide range of simulation conditions. Outperformance of PCDE over Loupas is especially apparent at larger displacements such as in FIGS. 23A-23B. This was likely due to the susceptibility of Loupas to aliasing, or shifts larger than half the pulse length, which occurred at 2.5 samples in this instance. The simulation results show that PCDE is very robust to a number of error sources with outperformance over the other algorithms tested, in the presence of random noise (FIGS. 24A-24B), speckle decorrelation (FIGS. 25A-25B), differential motion decorrelation (FIGS. 26A-26B), low fractional bandwidth (FIGS. 27A-27B), and small kernel window lengths (FIGS. 28A-28B). The only condition under which Loupas exhibited slightly better performance was at 0 dB SNR. While PCDE bias still remained significantly lower than Loupas, the standard deviation of PCDE was slightly higher in that instance. Since PCDE relies on the signal of interest exhibiting the greatest energy, it is likely that noise was introduced into the first PC at 0 dB and some of the desired signal was pushed into the second PC thus resulting in poorer performance.

Example 5

Elastography
Elastography Experiments

An acrylamide phantom was constructed using gel concentrations that produced a cylindrical lesion with Young's Modulus of approximately 16 kPa and a background. Young's Modulus of approximately 4 kPa as described in Patil et al., "3D prostate elastography: algorithm, simulations and experiments", Phys Med Biol 2007; 52(12):3643-3663, which is hereby incorporated herein, in its entirety, by reference thereto. Ten frames of elastography data were acquired using a "I-Beam" transducer having 192 elements, operating at 12 MHz, 40% fractional bandwidth ultrasound. Experimental parameters that were used are listed in Table 3:

TABLE 3

| Elastography Parameters | |
|---|---|
| Parameter | Value |
| Center frequency ($f_0$) | 12 MHz |
| Sampling frequency ($f_s$) | 80 MHz |
| Fractional Bandwidth (BW) | 40% |
| Elastogram Frames | 10 |
| Median Filter Window | 0.70 mm × 0.68 mm |
| Kernel Window Length | 3 periods or 175 μm |
| Search Window Length | 6 periods or 350 μm |
| Kernel Window Overlap | 50% |
| Staggered Strain Filter Width | 1.5 mm |

Figure 29A:
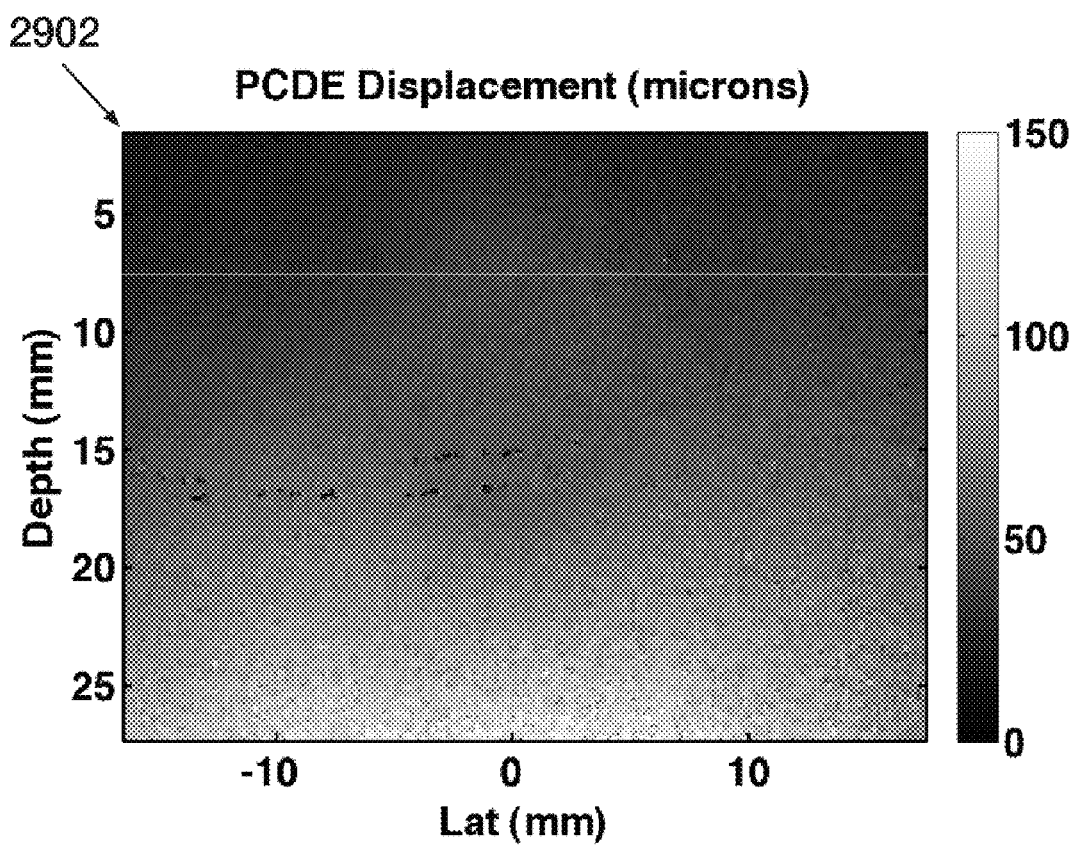
FIGS. 29A-29D show displacement data for PCDE, sTDE, normalized cross-correlation with cosine fitting (NC CF), and 2-D autocorrelation (Loupas), respectively.
Figure 29B:
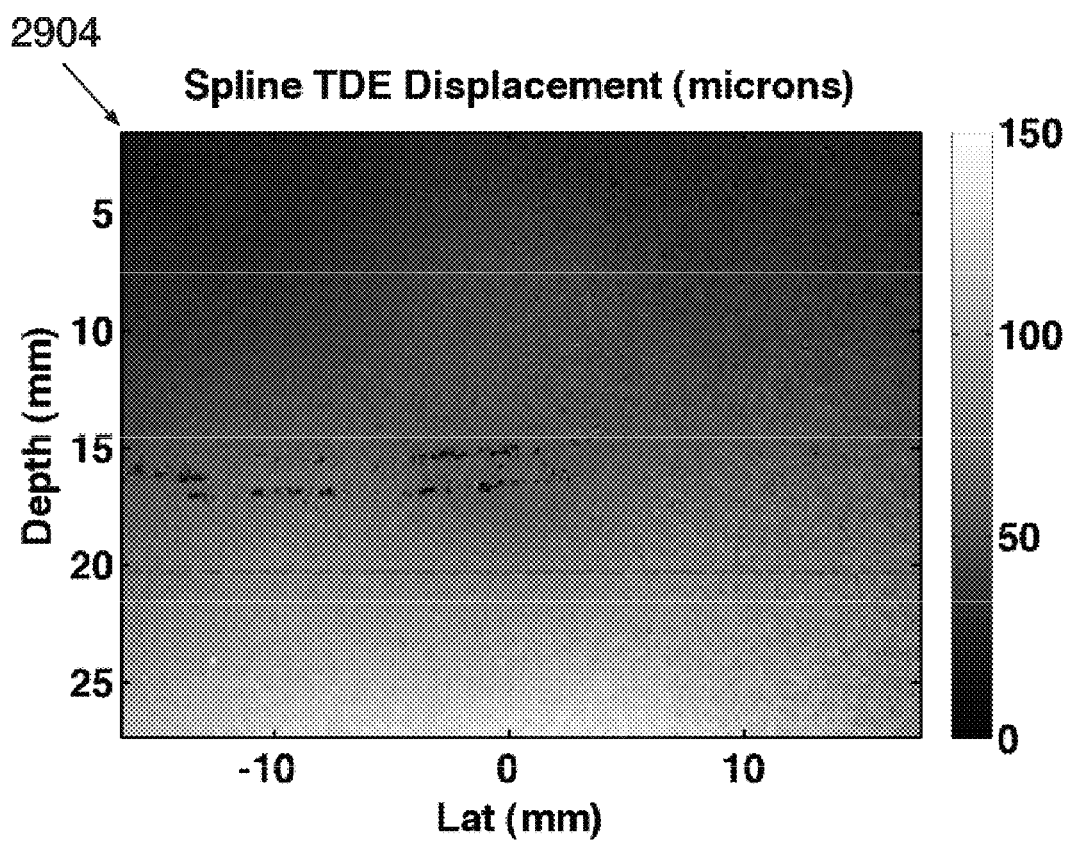
Figure 29C:
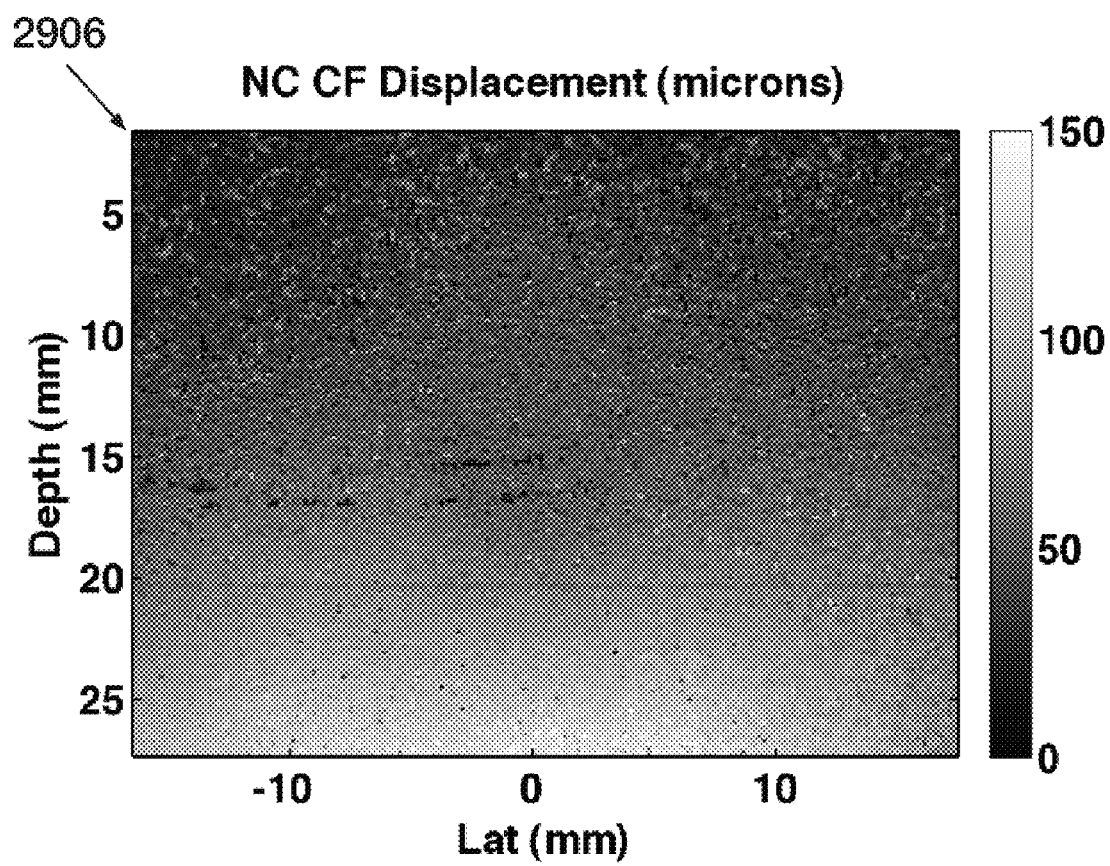
Figure 29D:
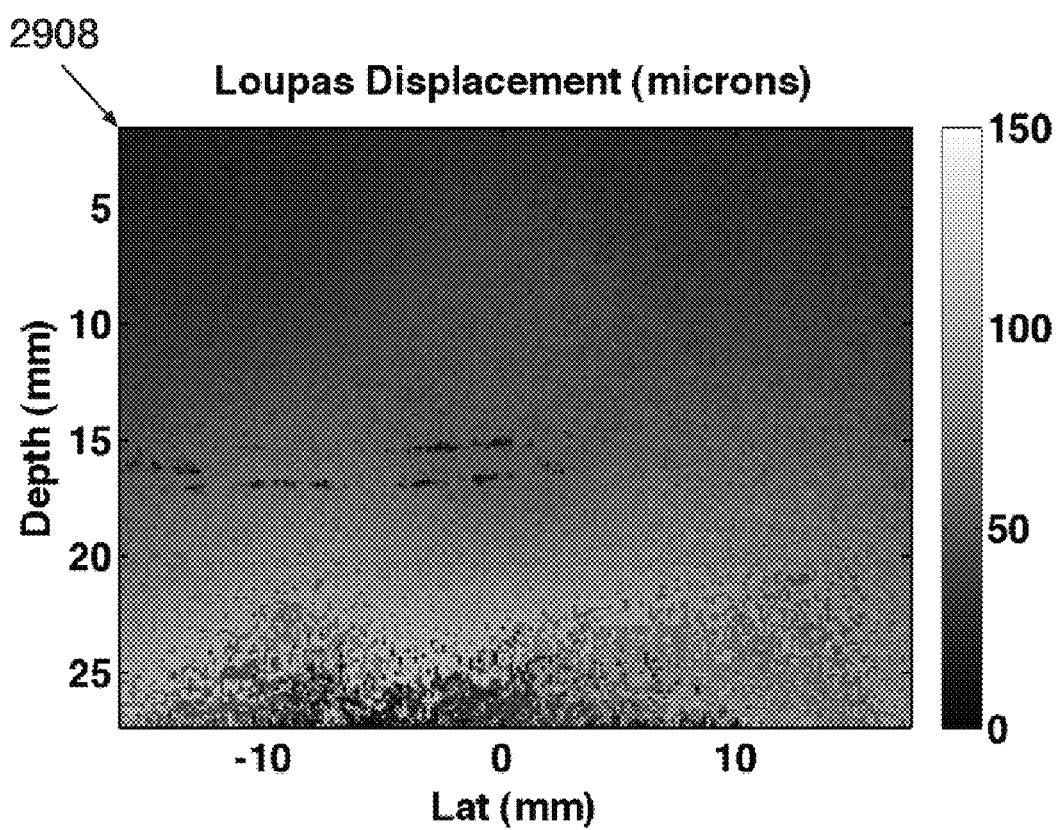

Displacements were computed across the 10 frames of echo data using the using the PCDE method of the present invention, as well as with Loupas, sTDE, and NC CF algorithms. Strains were rendered from the displacement data at frame 10 using a staggered strain filter of length 1.5 mm, in a manner described in more detail in Srinivasan et al., "Elastographic imaging using staggered strain estimates", Ultrasonic imaging 2002; 25:229-245, which is hereby incorporated herein, in its entirety, by reference thereto. Performance of the PCDE method as well as the other algorithms was assessed by first manually selecting a region of interest (ROI) inside and outside of the lesion. These regions were equal in area and located at the same depth. Contrast to noise ratio (CNR) and SNR inside and outside of the lesion were computed for each strain image. CNR and SNR were defined as follows:

$$CNR = \frac{|\mu_{IN} - \mu_{OUT}|}{\sqrt{\sigma_{IN}^2 + \sigma_{OUT}^2}} \quad (29)$$

$$SNR = \frac{\mu}{\sigma} \quad (30)$$

where $\mu$ is the mean strain value and $\sigma$ is the standard deviation of strain values within the region of interest Displacement data shown in FIGS. 29A-29D by displacement maps 2902, 2904, 2906 and 2908 in FIGS. 29A, 29B, 29C and 29D, respectively for PCDE, sTDE, normalized cross-correlation with cosine fitting (NC CF), and 2-D autocorrelation (Loupas), respectively, illustrate a dramatic reduction in decorrelation artifacts from PCDE (2902, FIG. 29A) over other methods (sTDE 2904, FIG. 29B, NC CF 2906, FIG. 29C; and Loupas 2908, FIG. 29D). The low displacement streaks at approximately 15 mm are much less apparent in PCDE and the horizontal steak at 20 mm is not visible. Loupas 2908 suffers from aliasing especially in the larger displacement regions below 20 mm.

Figure 30A:
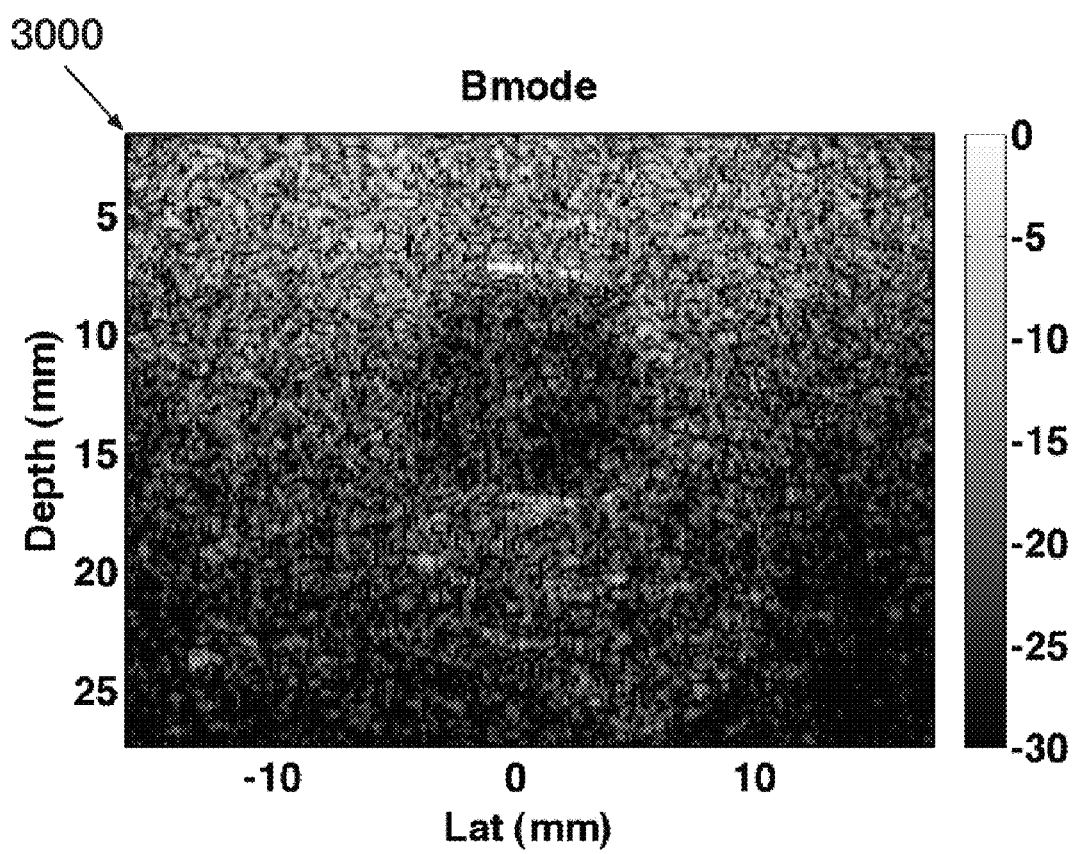
FIG. 30A shows a B-mode image of an ultrasound phantom.

Images of strain, from 0 to 1%, are illustrated in FIGS. 30B-30E along with a corresponding B-mode image of the ultrasound phantom (FIG. 30A). Elastograms were produced from the displacement data by applying a 0.70 mm×0.68 mm median filter and then a 1.5 mm staggered strain linear filter. CNR and SNR values inside and outside of the lesion are reported in Table 4.

Figure 30B:
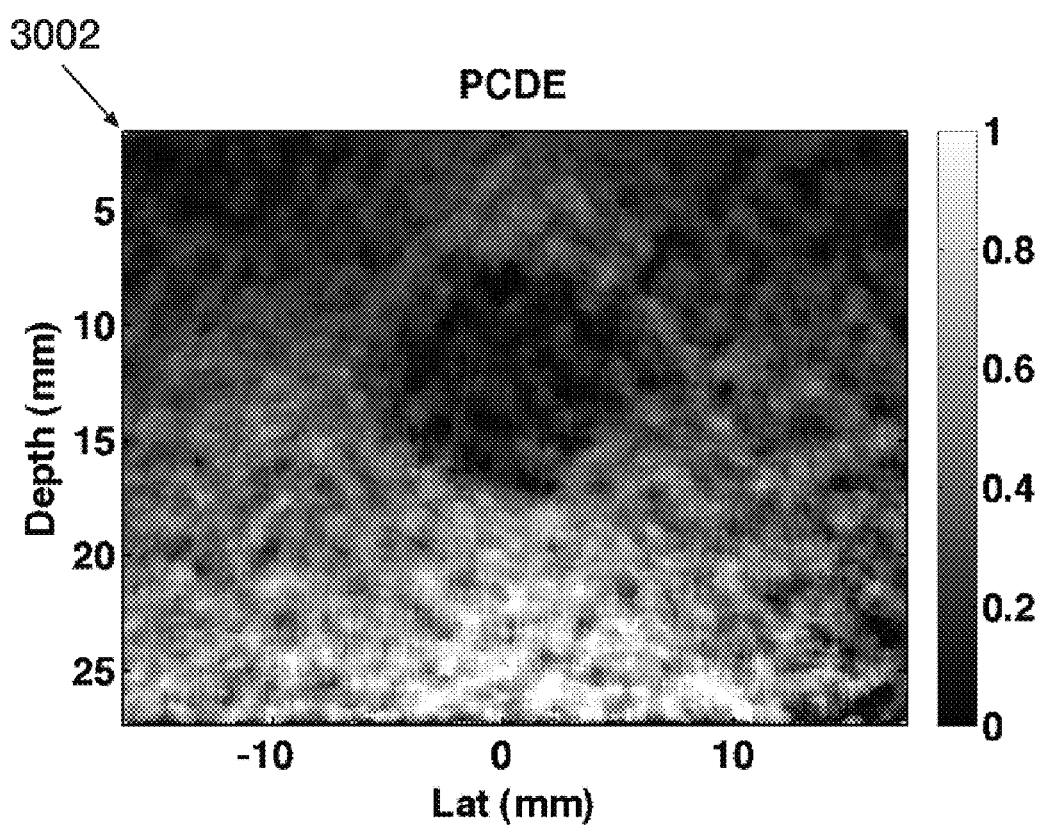
FIGS. 30B-30E show elastogram images associated with the B-mode image of FIG. 30A.
Figure 30C:
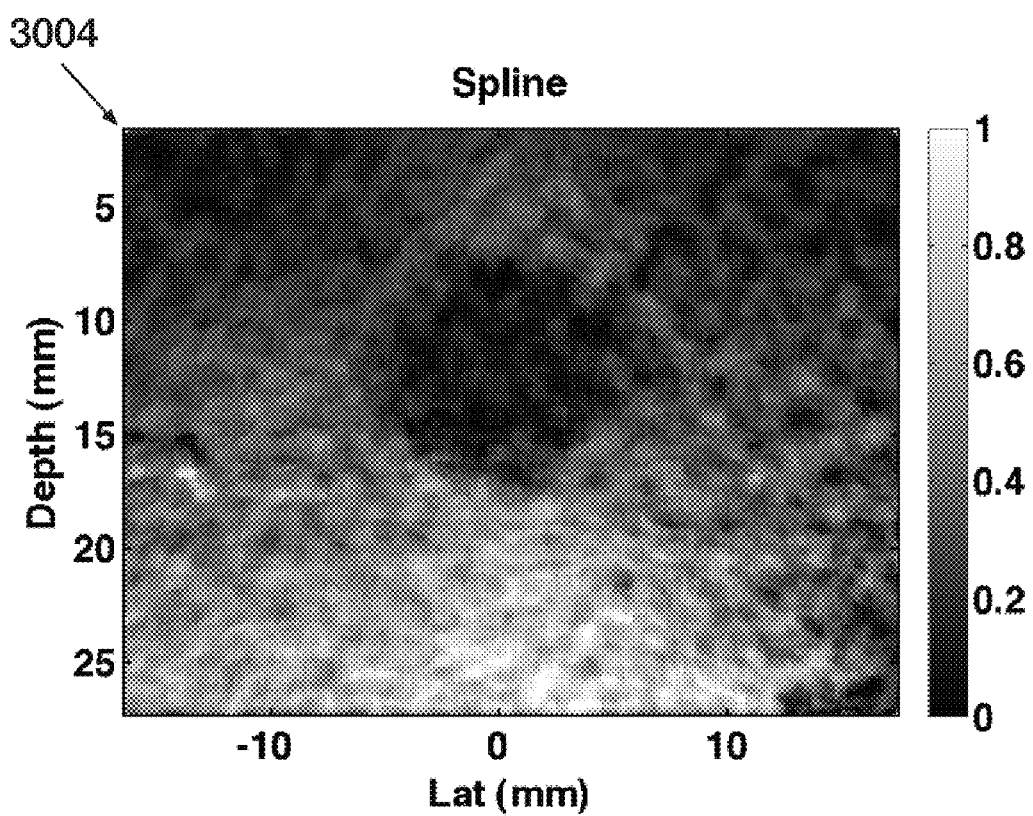
Figure 30D:
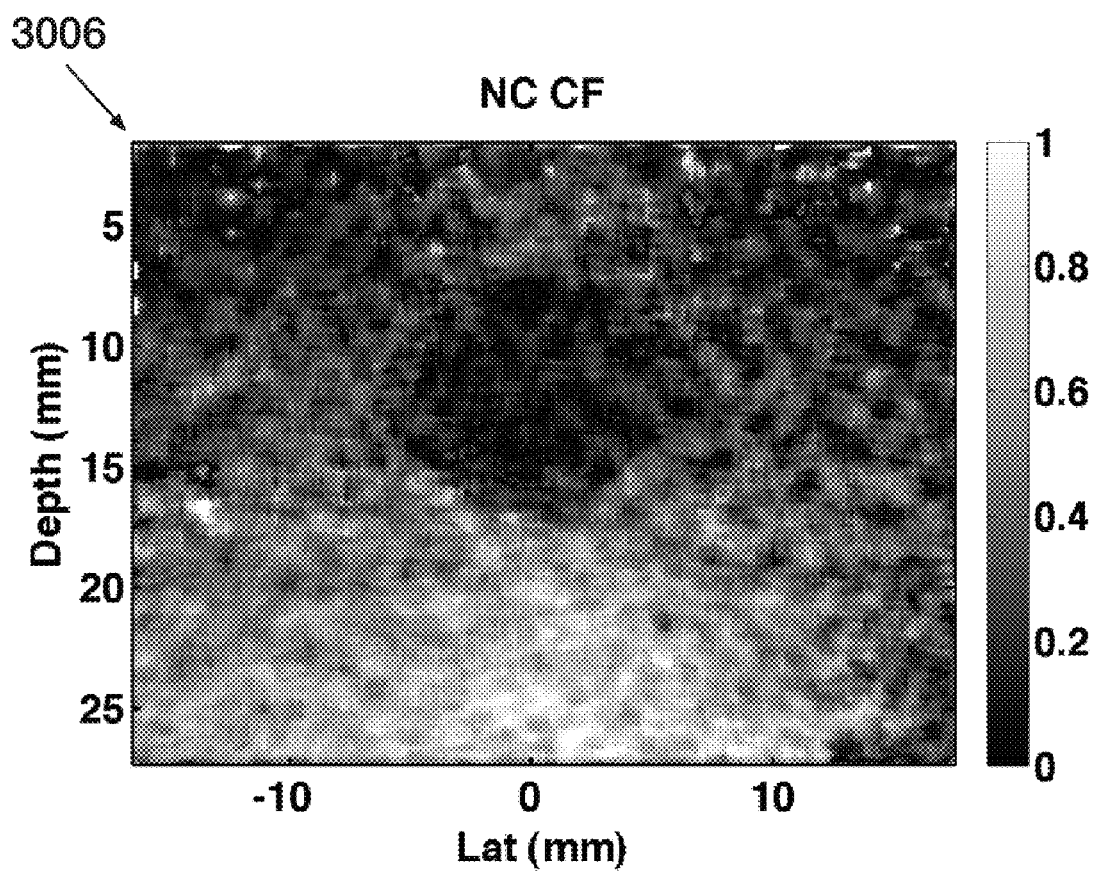
Figure 30E:
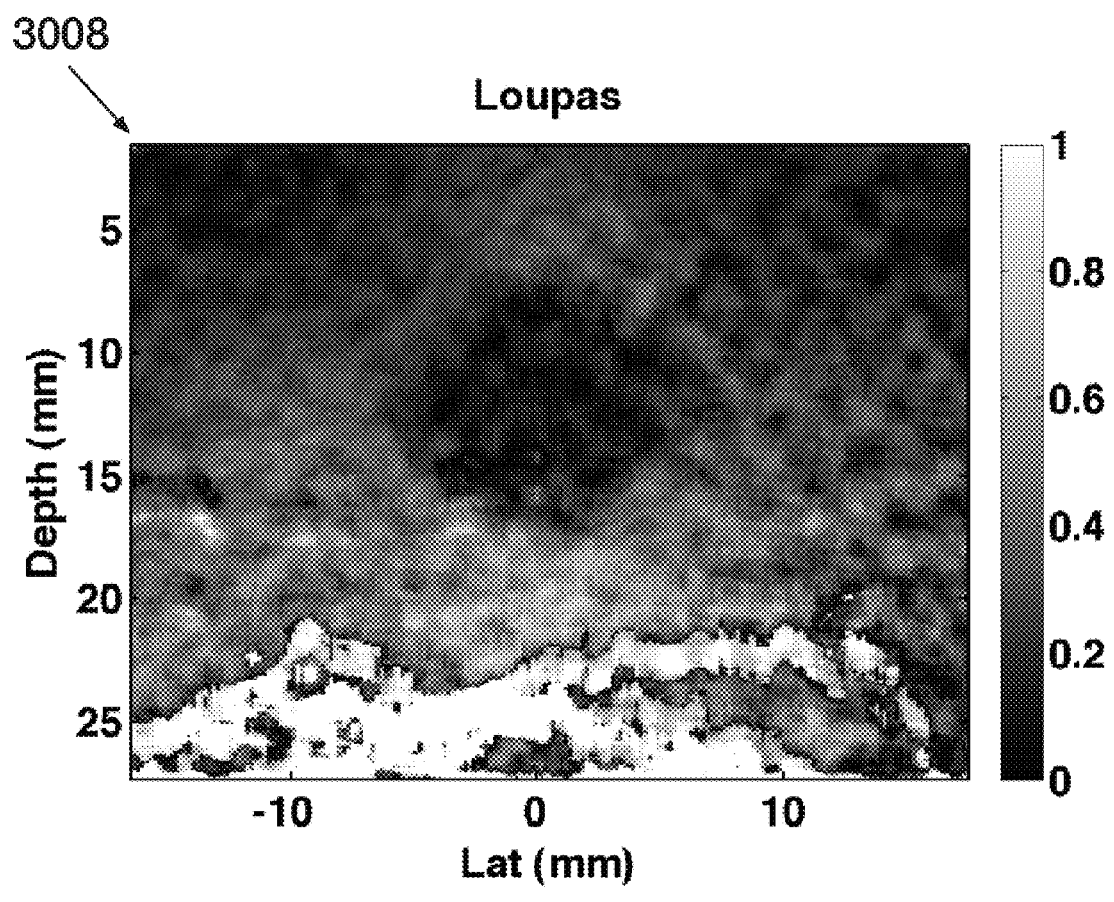

Similar trends are visualized in the elastogram images associated with the B-mode image 3000 in FIG. 30A, where decorrelation artifacts are dramatically reduced in the PCDE rendering 3002, FIG. 30B, relative to the sTDE rendering 3004, FIG. 30C; the NC CF rendering 3006, FIG. 30D and the Loupas rendering 3008, FIG. 30E. Image quality statistics are quantified in Table 4 and confirm that PCDE outperforms other methods by at least 12% in terms of CNR and SNR.

TABLE 4

Elastography Performance Metrics

| Algorithm | CNR | $SNR_{IN}$ | $SNR_{OUT}$ |
|---|---|---|---|
| PCDE | 6.6 dB | 5.5 dB | 12.2 dB |
| Spline TDE | 5.5 dB | 4.9 dB | 10.4 dB |
| Loupas | 4.7 dB | 3.8 dB | 9.7 dB |
| NC CF | 1.4 dB | 1.0 dB | 6.2 dB |

While the present invention has been described with reference to the specific embodiments thereof, it should be understood by those skilled in the art that various changes may be made and equivalents may be substituted without departing from the true spirit and scope of the invention. For example, the PCF and PCDE methods described herein have been described with regard to examples for estimating axial displacement. However, the present invention, including methods described herein can also be used for estimating lateral displacement. For example, the present invention can be applied as alternative methods for estimating later velocity vectors or for estimating multi-dimensional velocity alternative to the methods described in Jensen et al., "A New Method for Estimation of Velocity Vectors", IEEE Trans. Ultrasonics, Ferroelectrics and Freq. Control, Vol 45, NO 3, May 1998 and Anderson, "Multi-dimensional Velocity Estimation with Ultrasound Using Spatial Quadrature", IEEE Trans. Ultrasonics, Ferroelectrics and Freq. Control, Vol. 45, No. 3, 1998, both of which articles are hereby incorporated herein, in their entireties, by reference thereto. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A method of extracting information pertaining to at least one moving target, said method comprising:
   inputting to a principal components processor, a set of signal data comprising signal data corresponding to at least one waveform acquired from said at least one moving target;
   forming a complex representation of said set of signal data;
   windowing the signal data to provide a windowed substantially statistically-stationary complex representation;
   calculating, using a principal components processor, at least one complex principal component of said windowed substantially statistically-stationary complex representation;
   automatically selecting at least one of said at least one complex principal components; and
   applying each of said at least one automatically selected complex principal component to extract information about said at least one moving target.

2. The method of claim 1, wherein the calculating, using a principal components processor, the at least one complex principal component of said windowed substantially statistically-stationary complex representation includes determining a sample covariance of a mean-reduced complex representation of the signal data.

3. The method of claim 1, wherein said automatically selecting selects one complex principal component, wherein said one complex principal component is a most energetic principal component of all of said at least one complex principal components.

4. The method of claim 1, wherein a single complex principal component is automatically selected, said single complex principal component being a second most energetic principal component of all of said at least one complex principal components.

5. The method of claim 1, wherein a single complex principal component is automatically selected based on a phase shift property.

6. The method of claim 1, wherein said forming a complex representation is performed prior to said inputting a set of signal data, and wherein said inputting a set of signal data comprises inputting said set of signal data as said complex representation of said set of signal data.

7. The method of claim 1, wherein said automatically selecting and said applying reduce echo decorrelation for motion estimation.

8. The method of claim 1, wherein said applying comprises calculating one or more of time delay estimation values or phase delay estimation values based on said at least one selected principal component, relative to reference signals; and outputting motion estimation results based on said one or more of time delay estimation values or phase delay estimation values.

9. The method of claim 8, wherein said signal data comprises signal data from echoes reflected off said moving target from a plurality of different depths measured along a beam axis along which the waves are emitted from a transducer, and wherein said calculating principal components and said calculating time delay estimation values are performed for said signal data at a first depth of said plurality of depths, said method further comprising:
repeating said calculating principal components and said calculating time delay estimation values for signal data at another depth different from said first depth.

10. The method of claim 8, wherein said motion estimation is used in performing sonorheometery.

11. The method of claim 1, wherein said signal data is transduced from ultrasonic waves.

12. The method of claim 1, wherein said method comprises estimating blood velocity in a patient.

13. The method of claim 1 wherein said method is used in performing ultrasonic elastography.

14. The method of claim 1, wherein said inputting signal data is performed in real time using signal data transduced from waves reflected off or emitted from a moving target, and said method is performed in real time.

15. The method of claim 1, wherein said signal data is inputted from a computer memory storing said signal data generated from waves reflected off or emitted from a moving target.

16. A method of extracting information pertaining to at least one moving target, said method comprising:
inputting to a principal components processor, a set of signal data comprising signal data corresponding to at least one waveform acquired from said at least one moving target;
forming a complex representation of said set of signal data;
windowing the signal data to provide a windowed substantially statistically-stationary complex representation;
calculating, using a principal components processor, at least one complex principal component of said windowed substantially statistically-stationary complex representation; and
calculating an estimated value of a physical characteristic of said at least one moving target, using a phase of at least one of said at least one complex principal components.

17. The method of claim 16, wherein said physical characteristic is velocity.

18. The method of claim 16, wherein the calculating, using a principal components processor, the at least one complex principal component of said windowed substantially statistically-stationary complex representation includes determining a sample covariance of a mean-reduced complex representation of the signal data.

19. The method of claim 16, wherein estimated values of said physical characteristic are calculated, using a phase of at least two of said at least one complex principal components.

20. The method of claim 16, comprising automatically selecting at least one of said at least one complex principal component for use in said calculating an estimated value.

21. The method of claim 20, wherein a single complex principal component is automatically selected.

22. The method of claim 21, wherein said single complex principal component is automatically selected based on a phase shift property.

23. The method of claim 16, wherein said forming a complex representation is performed prior to said inputting a set of signal data, and wherein said inputting a set of signal data comprises inputting said set of signal data as said complex representation of said set of signal data.

24. The method of claim 16, wherein said signal data is transduced from ultrasonic waves.

25. The method of claim 16, wherein said estimated value is an estimated value used for motion estimation.

26. The method of 25, wherein said motion estimation is used in performing sonorheometry.

27. The method of claim 16, wherein said method comprises estimating blood velocity in a patient.

28. The method of claim 16, wherein said method is used in performing ultrasonic elastography.

29. The method of claim 16, wherein said inputting signal data is performed in real time using signal data transduced from waves reflected off or emitted from a moving target, and said method is performed in real time.

30. The method of claim 16, wherein said signal data is inputted from a computer memory storing said signal data generated from waves reflected off or emitted from a moving target.

31. A system for reducing echo decorrelation for a moving target, said system comprising:
a computer including an input device configured to input signal data to said computer,
a processor configured to transform the signal data from real data to complex data having an imaginary component, to window the complex data to provide windowed substantially statistically-stationary complex data, to automatically calculate at least one principal component of said windowed substantially statistically-stationary complex data, to automatically select at least one calculated principal component, and to extract parameters from said at least one automatically selected principal component to estimate a property of the target.

32. The system of claim 31, wherein said property comprises motion.

33. The system of claim 31, further comprising
an output device configured to receive signals from said processor and to output property estimate results.

34. The system of claim 31, further comprising an array of transducers configured to receive said input signal data and to input said input signal data to said computer.

35. The system of claim 34, wherein said array of transducers is further configured to emit signals toward an object, wherein the emitted signals reflect off said object and are received by said array of transducers.

36. The system of claim 31, wherein the processor is configured to automatically calculate at least one principal component of said windowed substantially statistically-stationary complex data via determining a sample covariance of a mean-reduced complex representation of the signal data.

37. A computer readable medium that provides instructions, which when executed on a processor, cause the processor to perform a method comprising:
accessing a set of signal data, wherein said signal data is generated from waves reflected off or emitted from a moving target;
forming a complex representation of said set of signal data;
windowing the complex representation of the set of signal data to provide a windowed substantially statistically-stationary complex representation;
calculating, using a principal components processor, at least one complex principal component of said windowed substantially statistically-stationary complex representation including determining a sample covariance of a mean-reduced complex representation of the signal data;

automatically selecting at least one of said at least one complex principal components; and applying each of said at least one automatically selected complex principal component to extract information about said at least one moving target.

38. A computer readable medium that provides instructions, which when executed on a processor, cause the processor to perform a method comprising:

accessing a set of signal data, wherein said signal data is generated from waves reflected off or emitted from a moving target;

forming a complex representation of said set of signal data;

windowing the complex representation of the set of signal data to provide a windowed substantially statistically-stationary complex representation;

calculating, using a principal components processor, at least one complex principal component of said windowed substantially statistically-stationary complex representation including determining a sample covariance of a mean-reduced complex representation of the signal data; and calculating an estimated value of a physical characteristic of said at least one moving target, using a phase of at least one of said at least one complex principal components.

* * * * *